(12) United States Patent
Kongtcheu

(10) Patent No.: US 7,933,824 B2
(45) Date of Patent: Apr. 26, 2011

(54) METHODS, SYSTEMS AND COMPUTER PROGRAM PRODUCTS TO FACILITATE THE PRICING, RISK MANAGEMENT AND TRADING OF DERIVATIVES CONTRACTS

(75) Inventor: Phil Kongtcheu, Jersey City, NJ (US)

(73) Assignee: Philibert F. Kongtcheu, New York, NY (US)

( * ) Notice: Subject to any disclaimer, the term of this patent is extended or adjusted under 35 U.S.C. 154(b) by 1278 days.

(21) Appl. No.: 10/518,823

(22) PCT Filed: Jun. 18, 2003

(86) PCT No.: PCT/US03/19179
§ 371 (c)(1),
(2), (4) Date: Sep. 14, 2005

(87) PCT Pub. No.: WO03/107137
PCT Pub. Date: Dec. 24, 2003

(65) Prior Publication Data
US 2007/0162373 A1 Jul. 12, 2007

Related U.S. Application Data

(60) Provisional application No. 60/389,730, filed on Jun. 18, 2002.

(51) Int. Cl.
*G06Q 40/00* (2006.01)
(52) U.S. Cl. .......................... 705/36 R; 705/35; 705/37
(58) Field of Classification Search .................. 705/35, 705/36 R, 37
See application file for complete search history.

(56) References Cited

U.S. PATENT DOCUMENTS

| | | | |
|---|---|---|---|
| 4,642,768 A | 2/1987 | Roberts |
| 4,903,201 A | 2/1990 | Wagner |
| 5,029,119 A | 7/1991 | Konno |
| 5,129,035 A | 7/1992 | Saji |
| 5,159,687 A | 10/1992 | Richburg |
| 5,408,638 A | 4/1995 | Sagawa |
| 5,444,819 A | 8/1995 | Negishi |
| 5,461,699 A | 10/1995 | Arbabi |
| 5,485,601 A | 1/1996 | Ching |
| 5,557,517 A | 9/1996 | Daughterty, III |
| 5,692,233 A | 11/1997 | Garman |
| 5,699,271 A | 12/1997 | Sagawa |
| 5,699,310 A | 12/1997 | Garloff |
| 5,761,442 A | 6/1998 | Barr |
| 5,799,287 A | 8/1998 | Dembo |
| 5,815,717 A | 9/1998 | Stack |
| 5,920,717 A | 7/1999 | Noda |
| 5,940,810 A | 8/1999 | Traub |
| 6,016,483 A | 1/2000 | Rickard |
| 6,058,377 A | 5/2000 | Traub |
| 6,061,662 A | 5/2000 | Makivic |

(Continued)

OTHER PUBLICATIONS

Hyer, T. Lipton-Lifschitz, T and Pugachevsky, D Passport to success; (Sep. 1997), Risk 10., No. 9., PPL27-31.

(Continued)

*Primary Examiner* — Jagdish N Patel
*Assistant Examiner* — Sara Chandler

(57) ABSTRACT

This invention relates to methods, systems and computer program products to facilitate the pricing trading and risk management of derivatives contracts on one or more underlying via the introduction of Basis instrument Contracts (BICs). Such pricing trading and risk management may be done in organized exchanges or in over-the-counter (OTC) markets.

18 Claims, 20 Drawing Sheets

Structure of preferred embodiments for the invention

U.S. PATENT DOCUMENTS

| | | | |
|---|---|---|---|
| 6,098,051 A | 8/2000 | Lupien | |
| 6,112,189 A | 8/2000 | Rickard | |
| 6,134,536 A | 10/2000 | Shepherd | |
| 6,173,276 B1 | 1/2001 | Kant | |
| 6,278,981 B1 | 8/2001 | Dembo | |
| 6,321,212 B1 | 11/2001 | Lange | |
| 6,421,653 B1* | 7/2002 | May | 705/36 R |
| 6,618,707 B1* | 9/2003 | Gary | 705/36 R |
| 2001/0011243 A1 | 8/2001 | Dembo | |
| 2001/0032168 A1* | 10/2001 | Adamson et al. | 705/37 |
| 2002/0010667 A1 | 1/2002 | Kant | |
| 2002/0103738 A1 | 8/2002 | Griebel | |
| 2003/0115128 A1* | 6/2003 | Lange et al. | 705/37 |
| 2003/0154153 A1* | 8/2003 | Steidlmayer et al. | 705/37 |
| 2003/0177077 A1* | 9/2003 | Norman | 705/35 |

OTHER PUBLICATIONS

Hyungsok, A. Penaud, A. and Wilmott, P. Various passport opt ions and their valuation; 1999 OCIAM Oxford University Working paper.

Jackwerth, J. C. and Rubinstein, M. Recovering probability Distributions from contemporaneous security prices; Journal of Finance, Dec. 1996 51: 5 1611-1631.

* cited by examiner

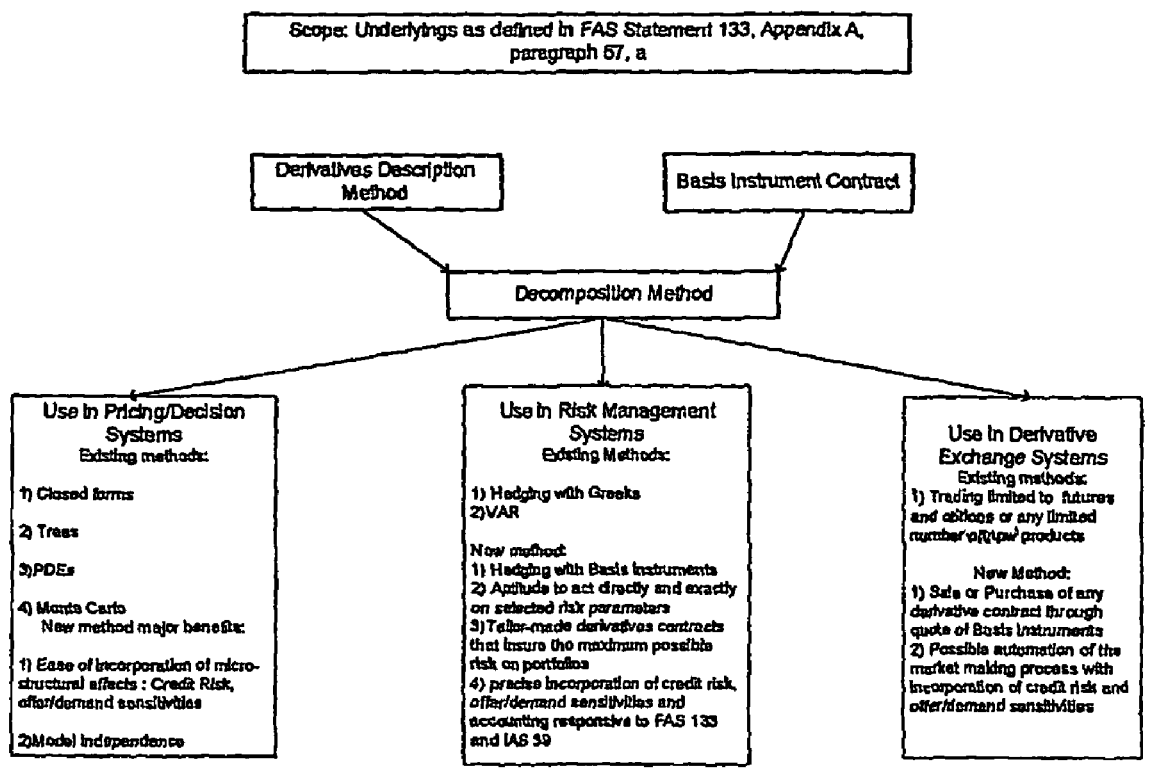
Figure 1: Structure of preferred embodiments for the invention

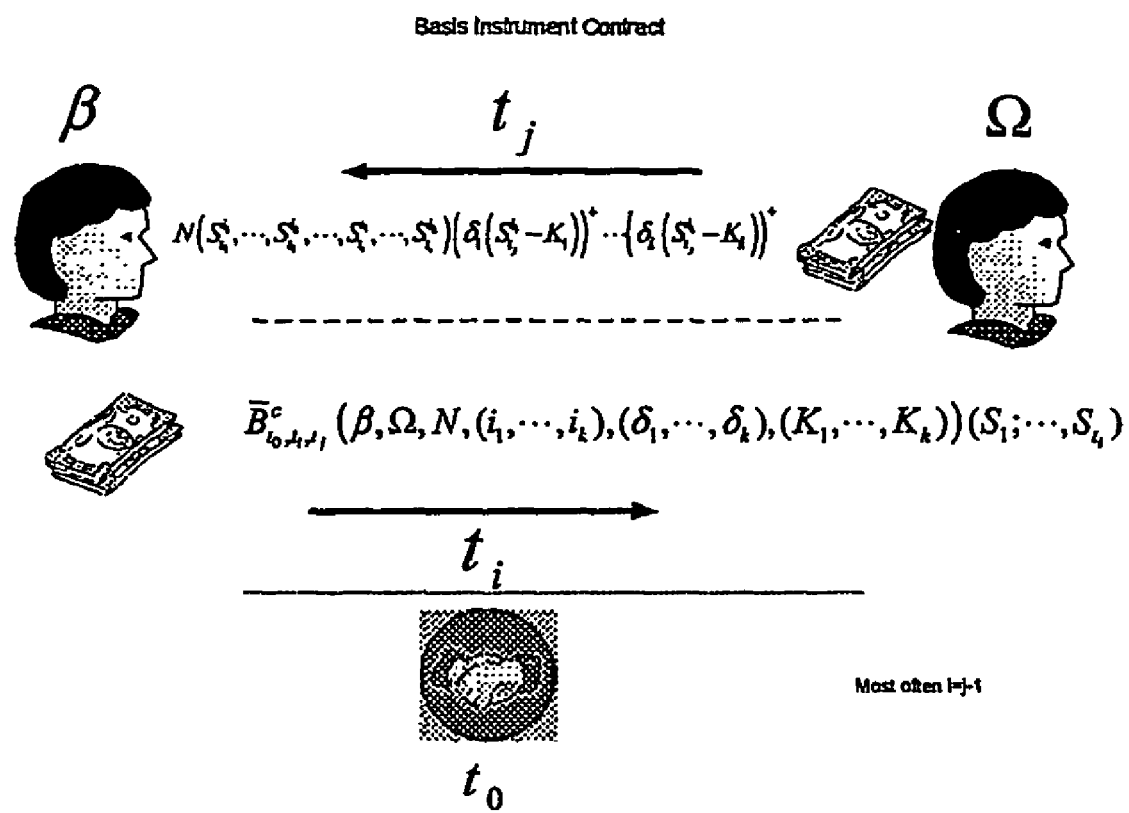
Figure 2: Definition of Basis Instruments Contracts

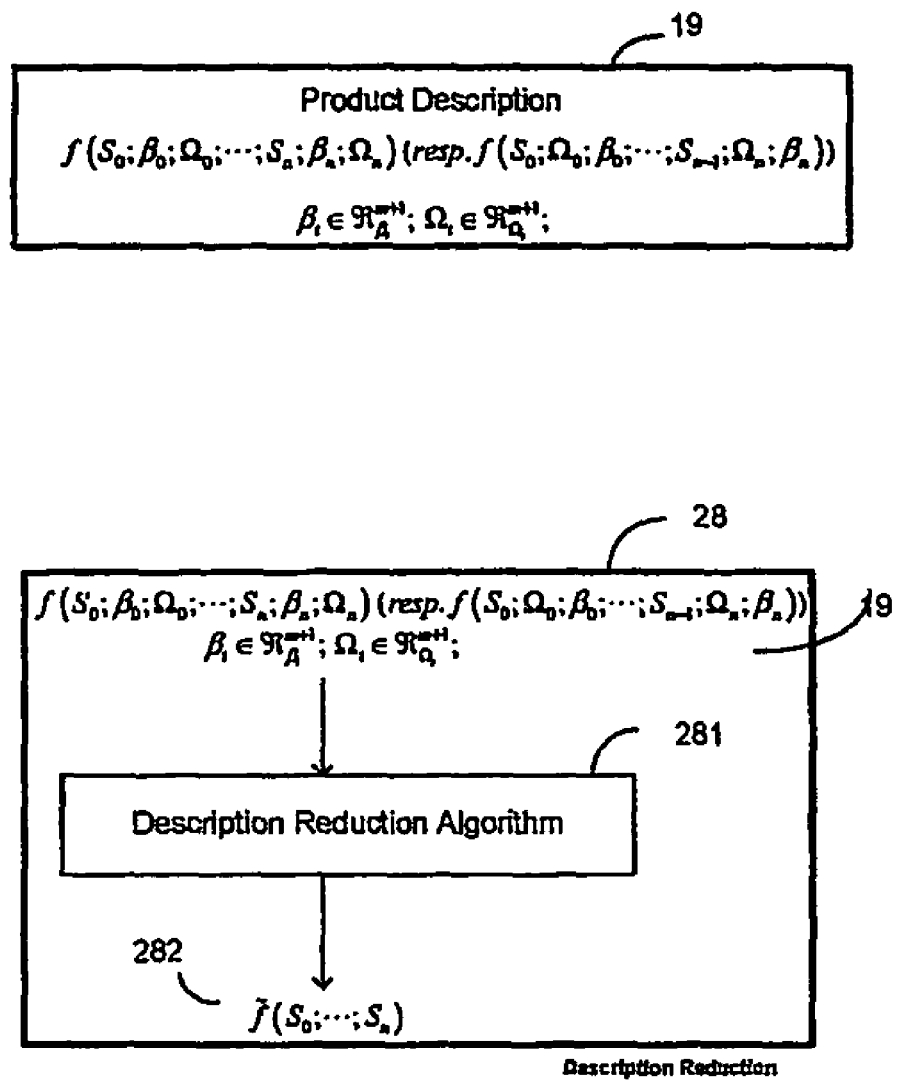
Figure 3: Derivatives Reduction

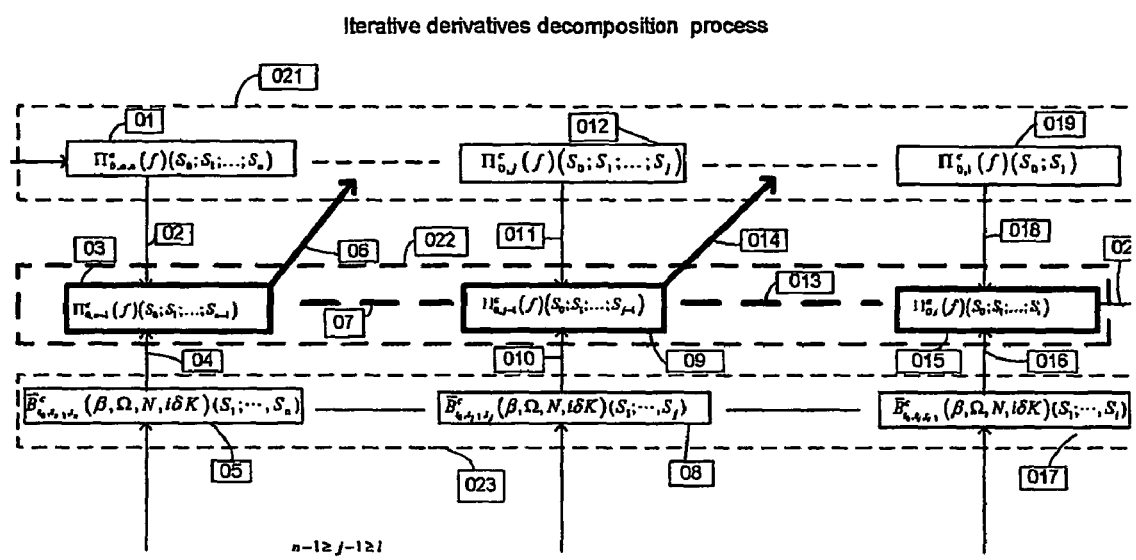
Figure 4: Iterative Derivatives Decomposition Process

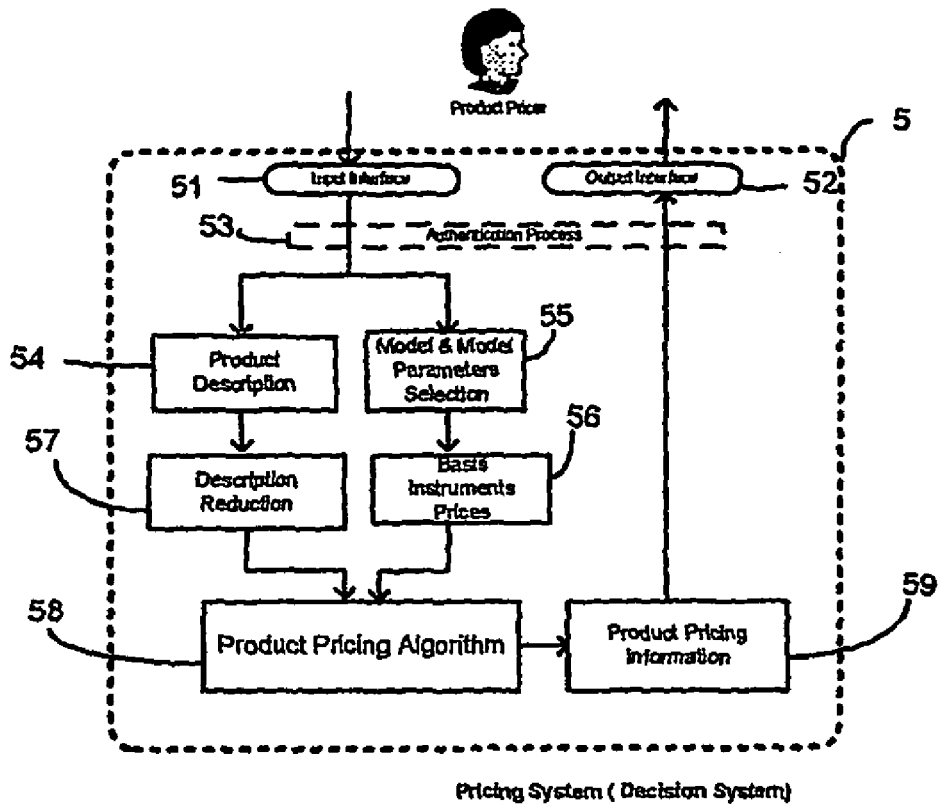
Figure 5: Pricing system

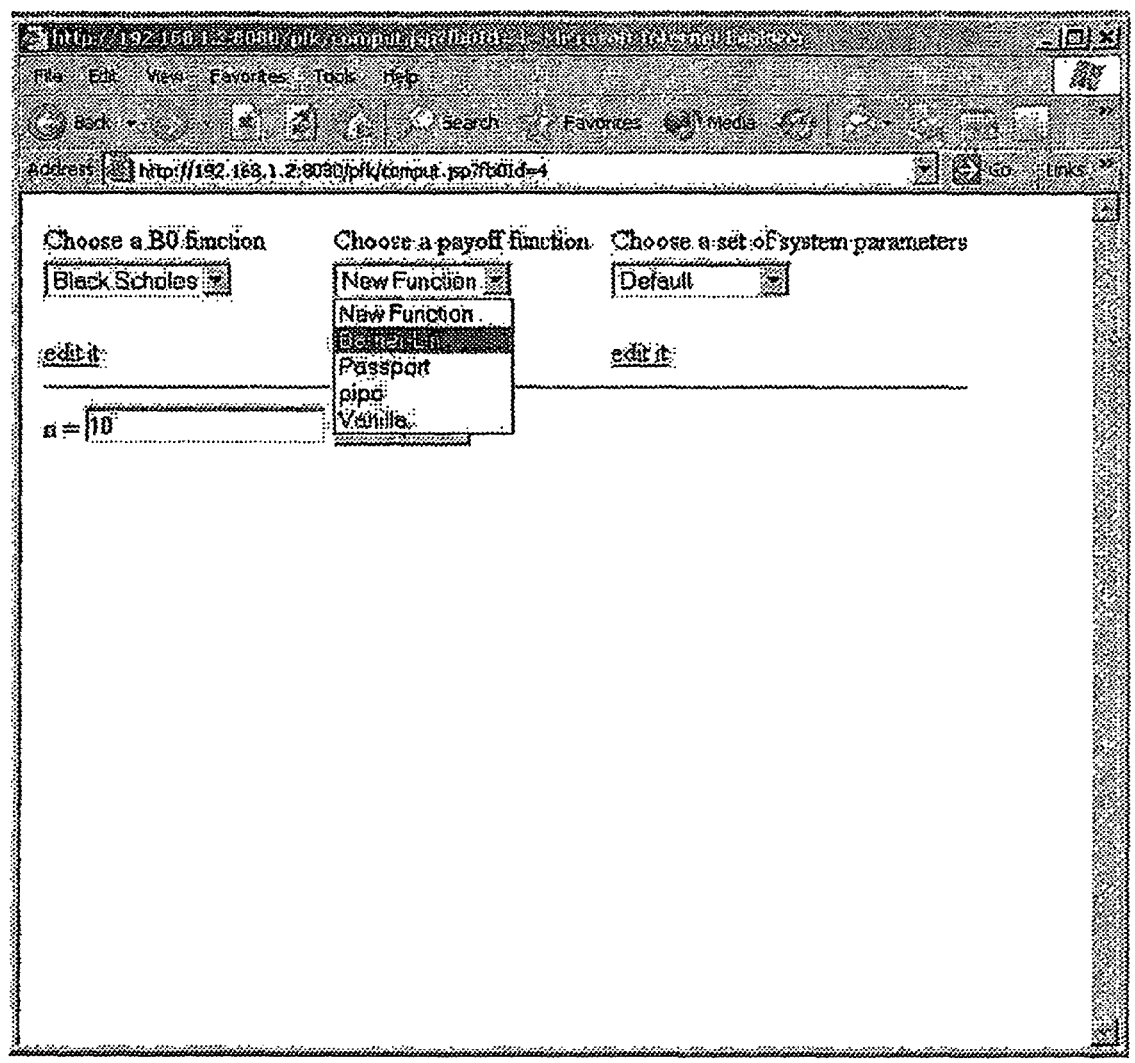
Figure 6: Web Interface : Main screen

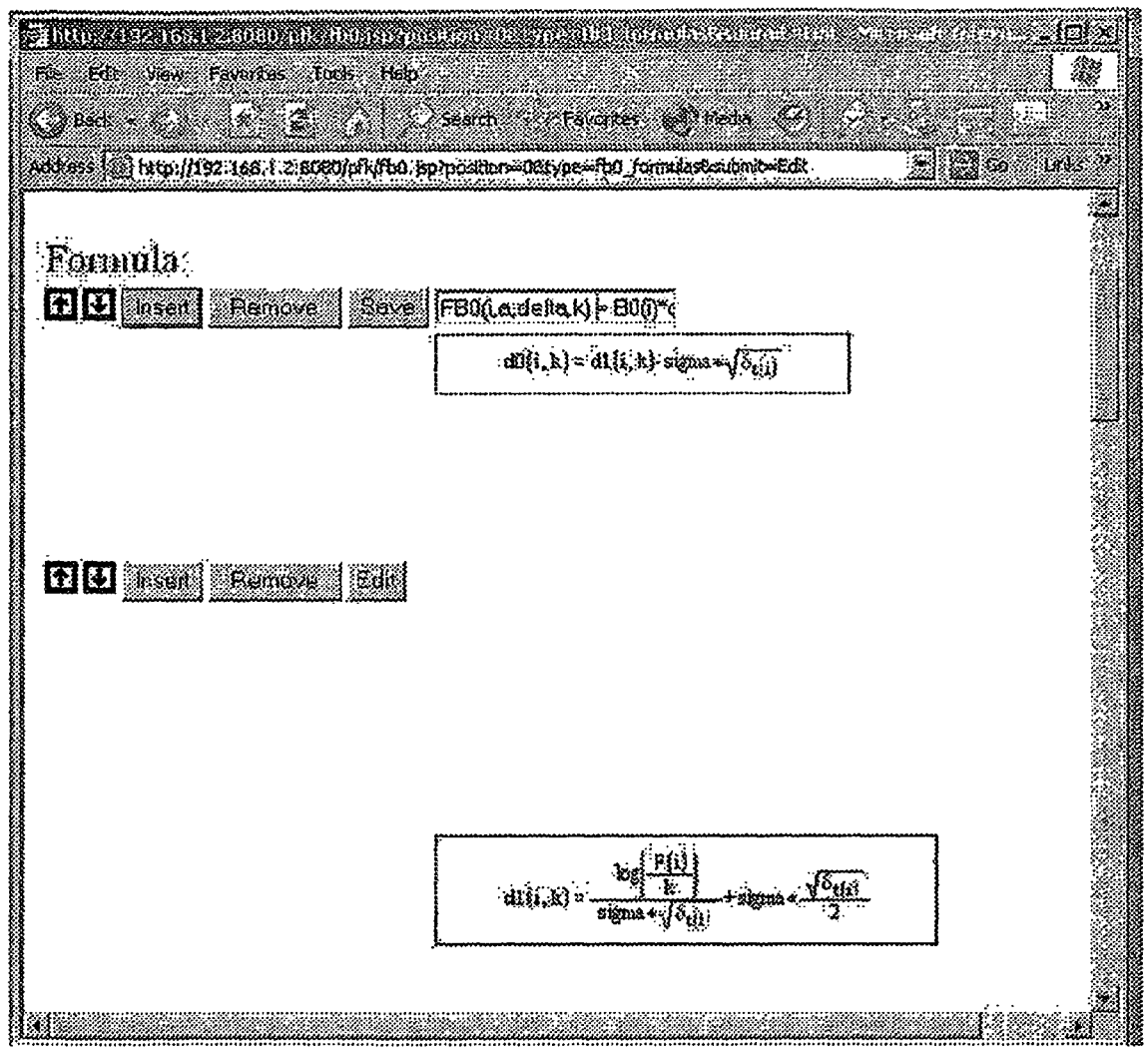
Figure 7: Web Interface : Basis Instrument Input

Figure 8: Web Interface : Payoff Function Input

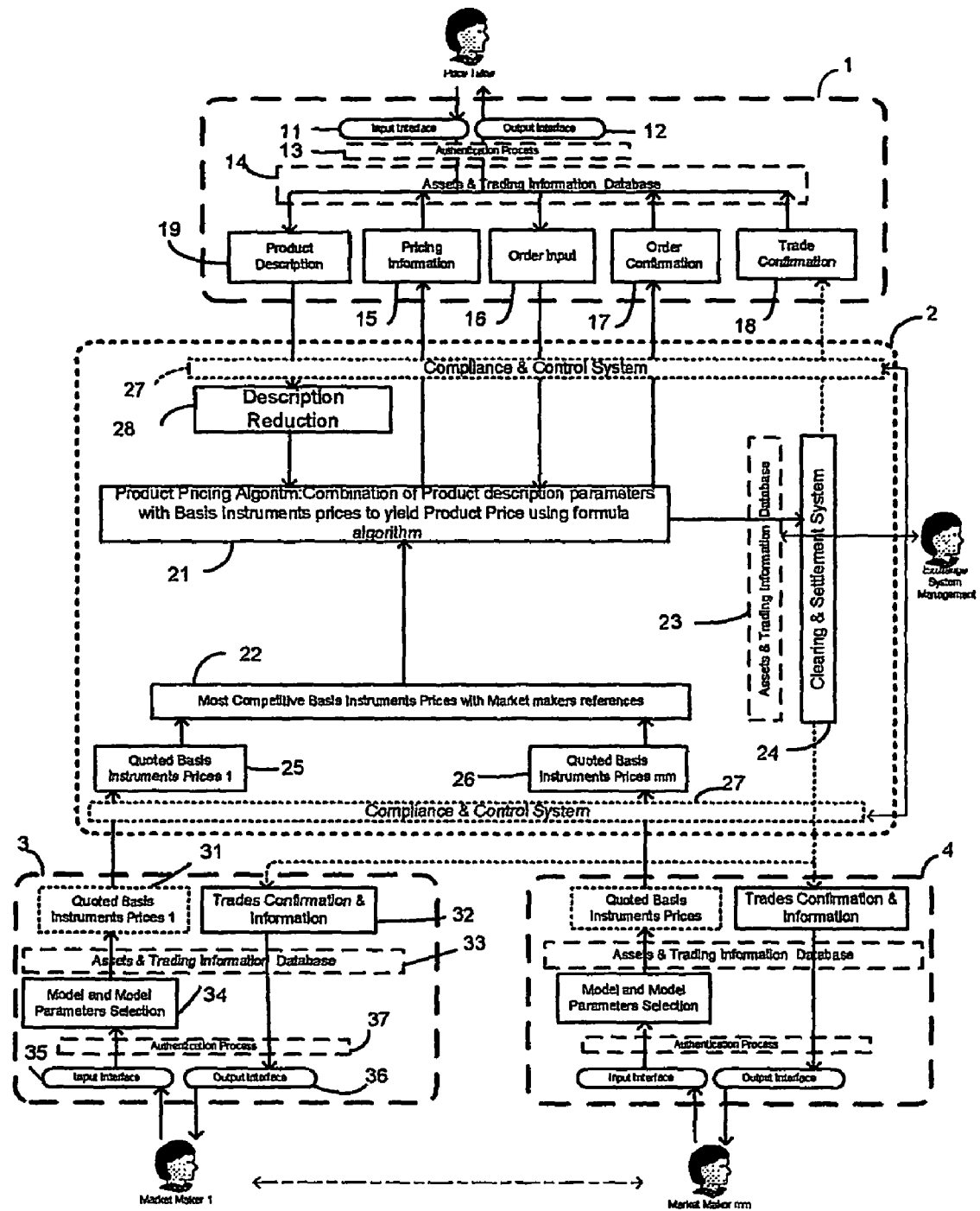
Figure 9: Exchange trading system

16

Order Input
(1) Product Description Reference
or
(2) Product Description and Quoted Price Reference

17

Order Confirmation

(1) Acknowledgement of order input/cancellation with pricing and timing references Figure 10: Exchange Order Input & Confirmation

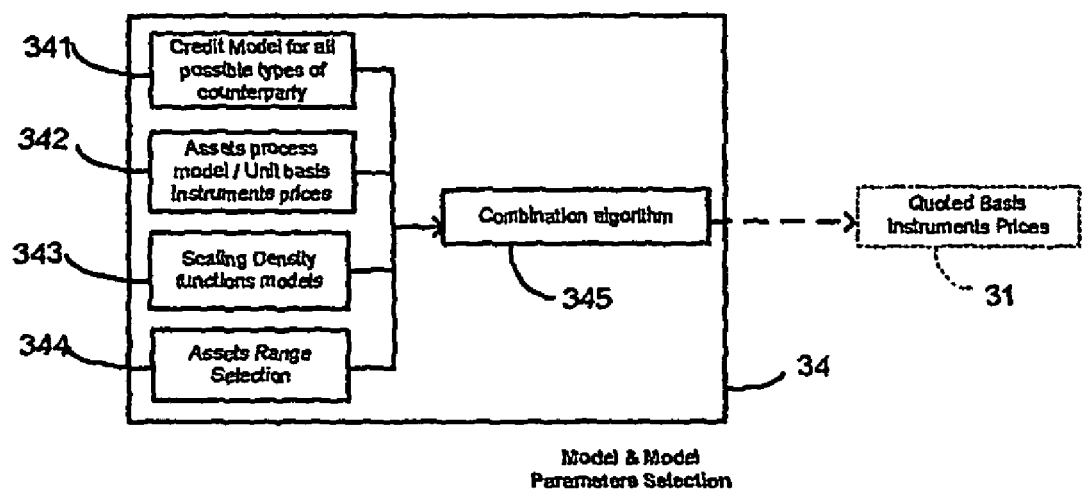
Figure 11: Model & Parameter selection

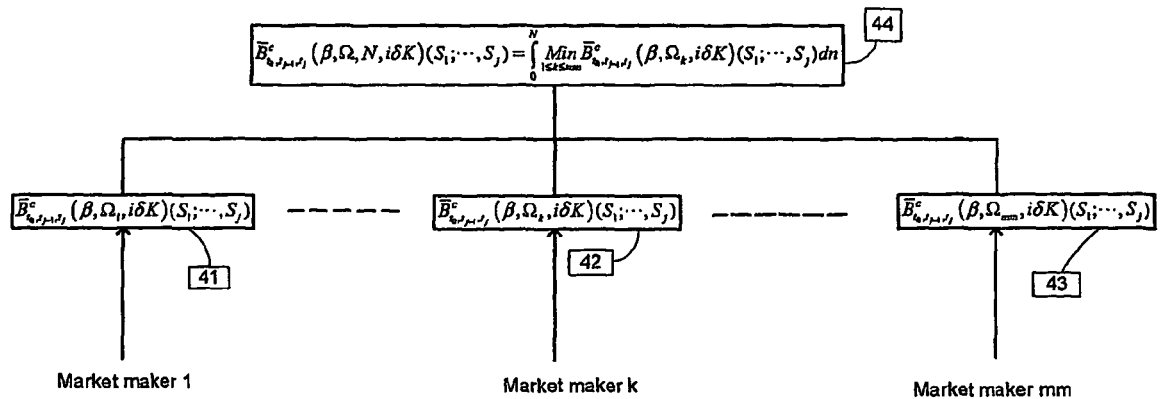
Figure 12: Basis instruments price selection process

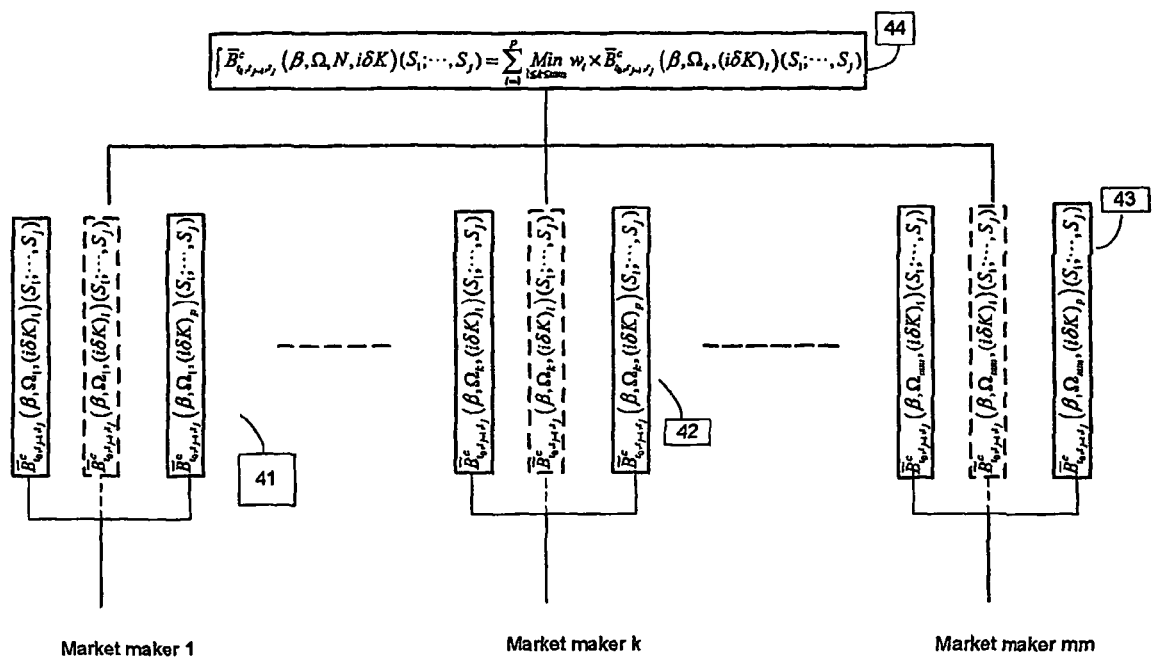
Figure 13: Derivatives Pricing Approximation Process by selecting block units

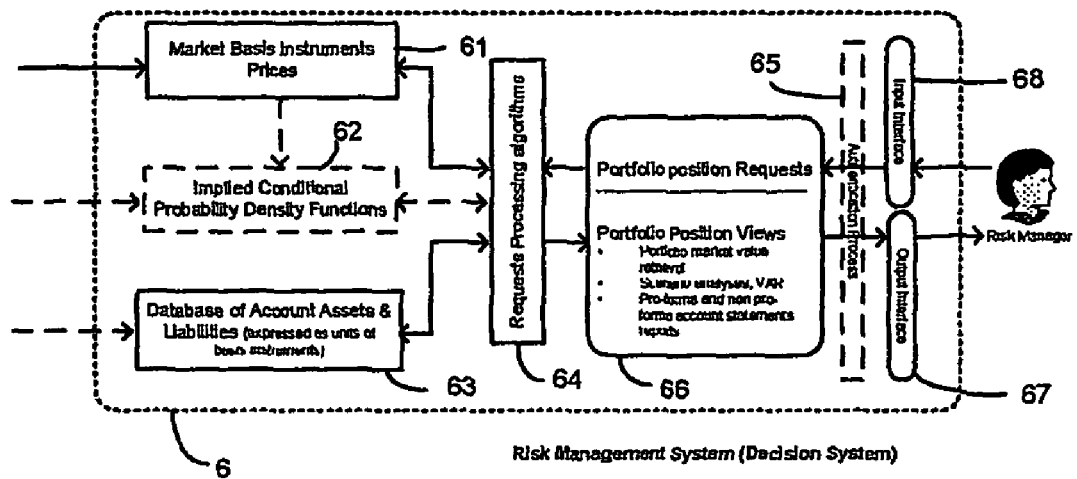
Figure 14: Risk Management system

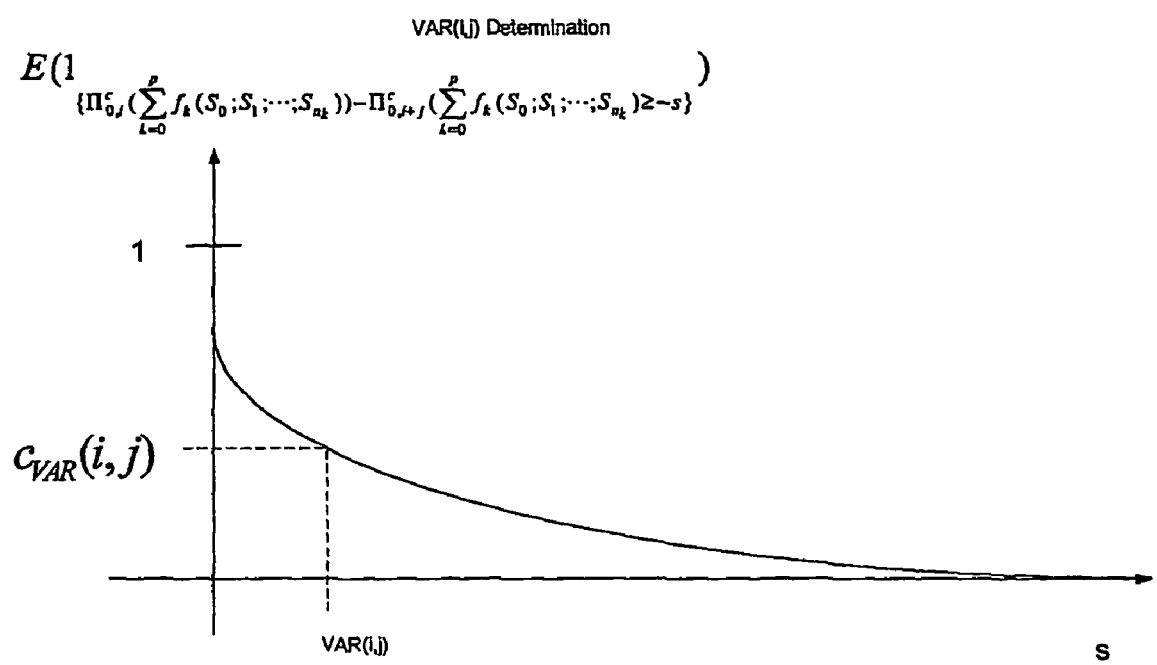
Figure 15: Risk Management, VAR Method

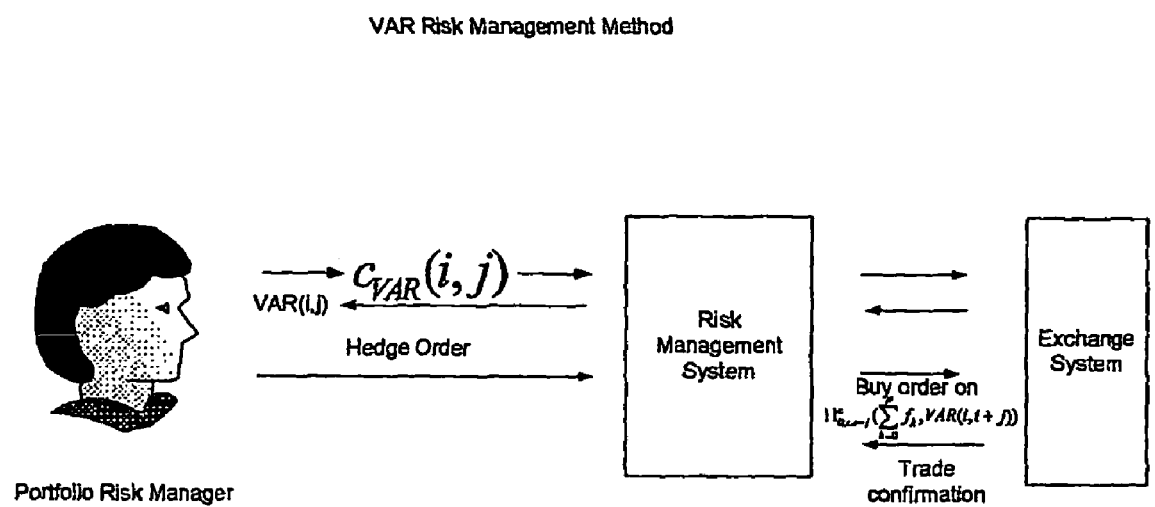
Figure 16: Risk Management, VAR Method

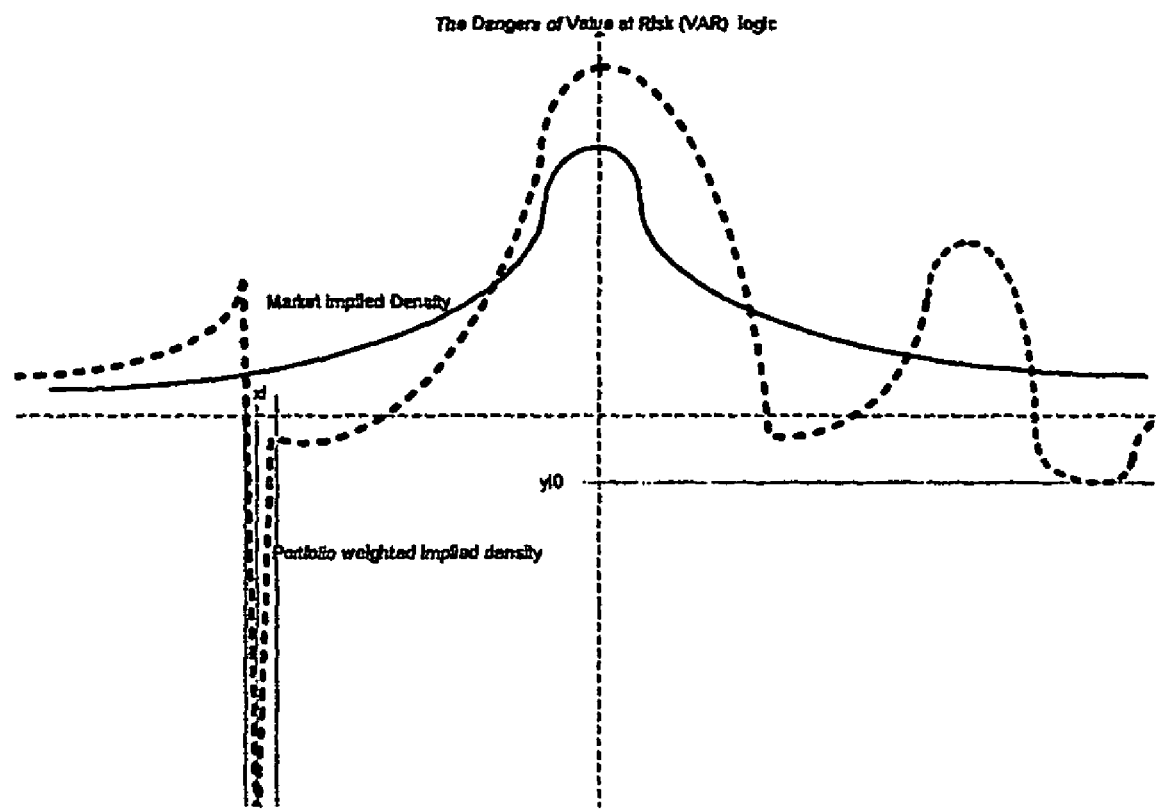
Figure 17: Risk Management, VAR danger.

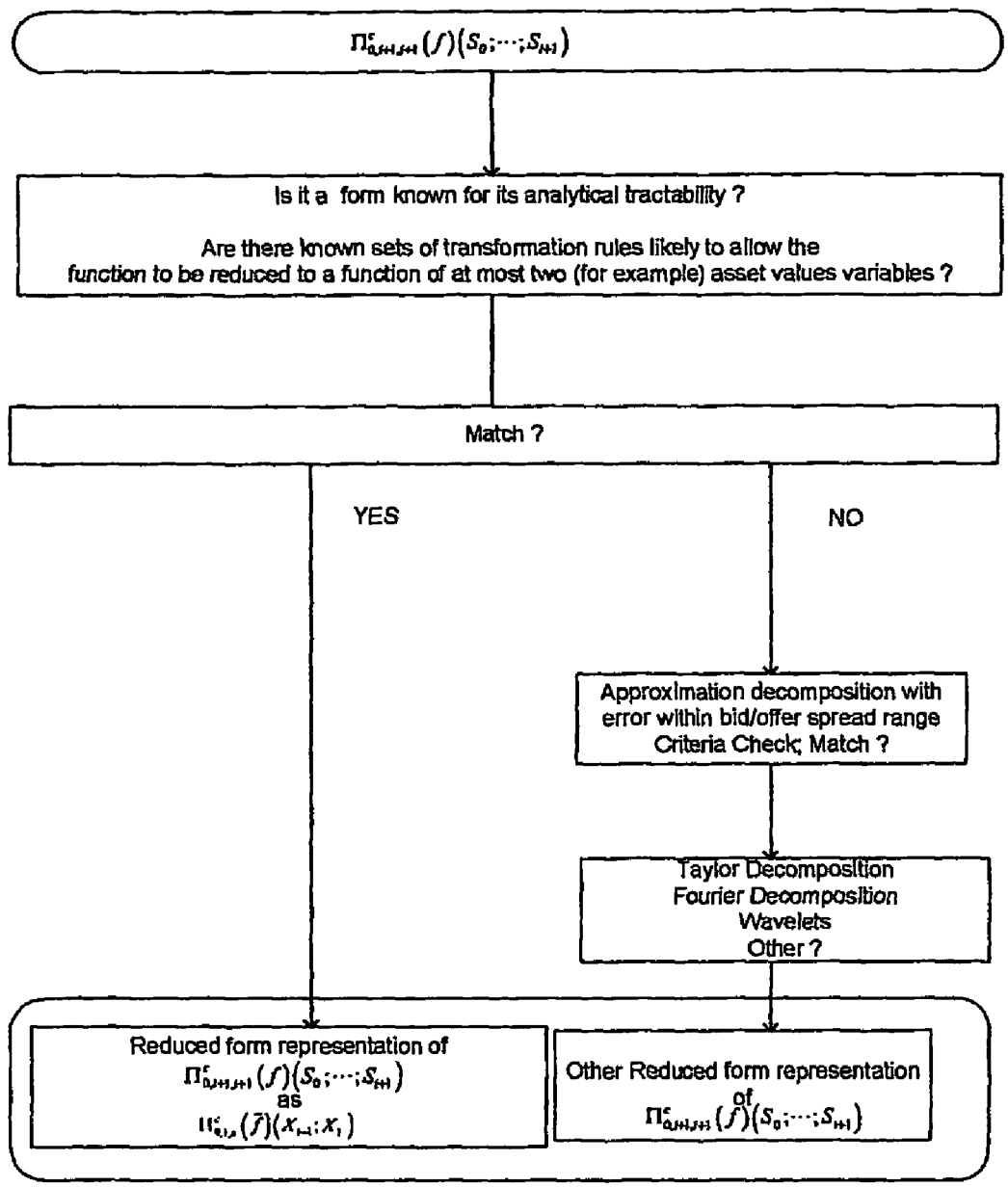
Figure 18: Compression to reduced form of Derivatives

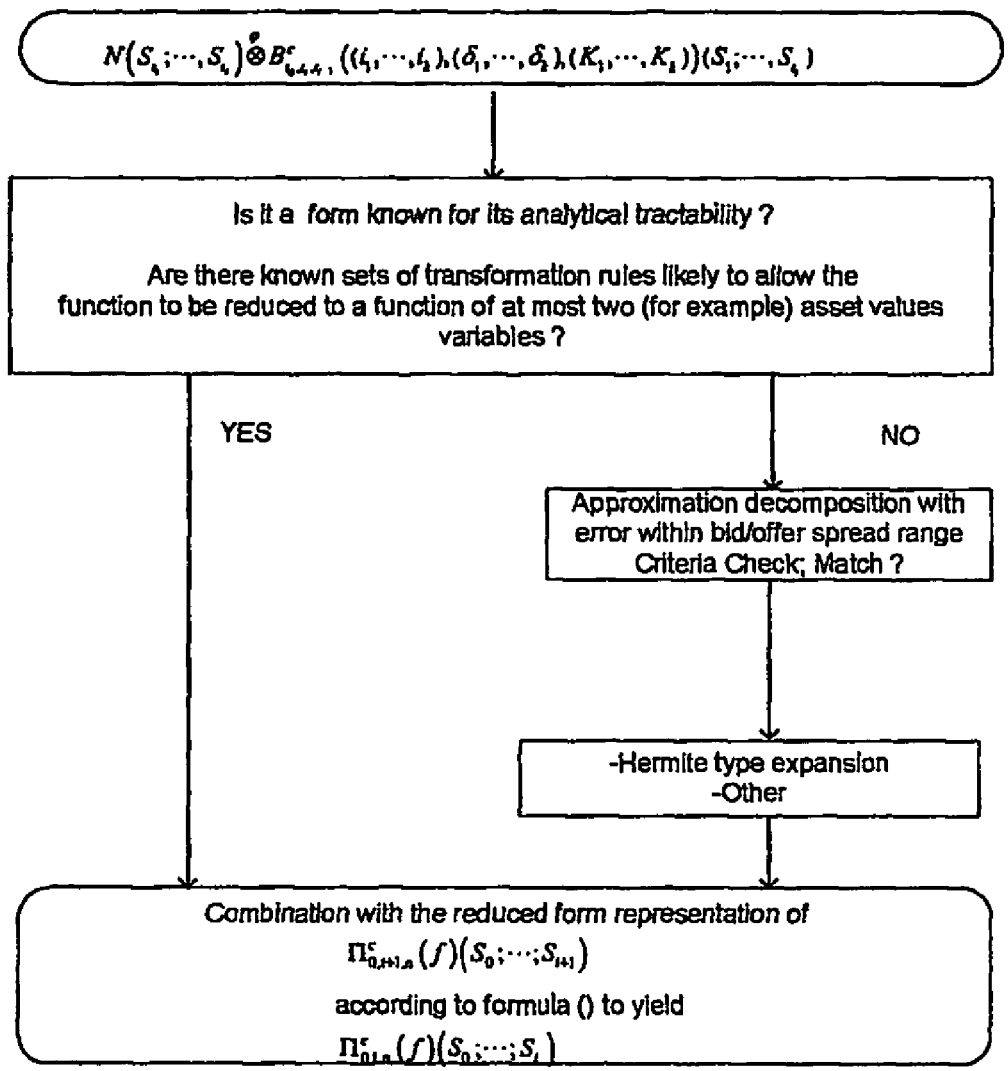
Figure 19: Compression to reduced form of Basis Instruments

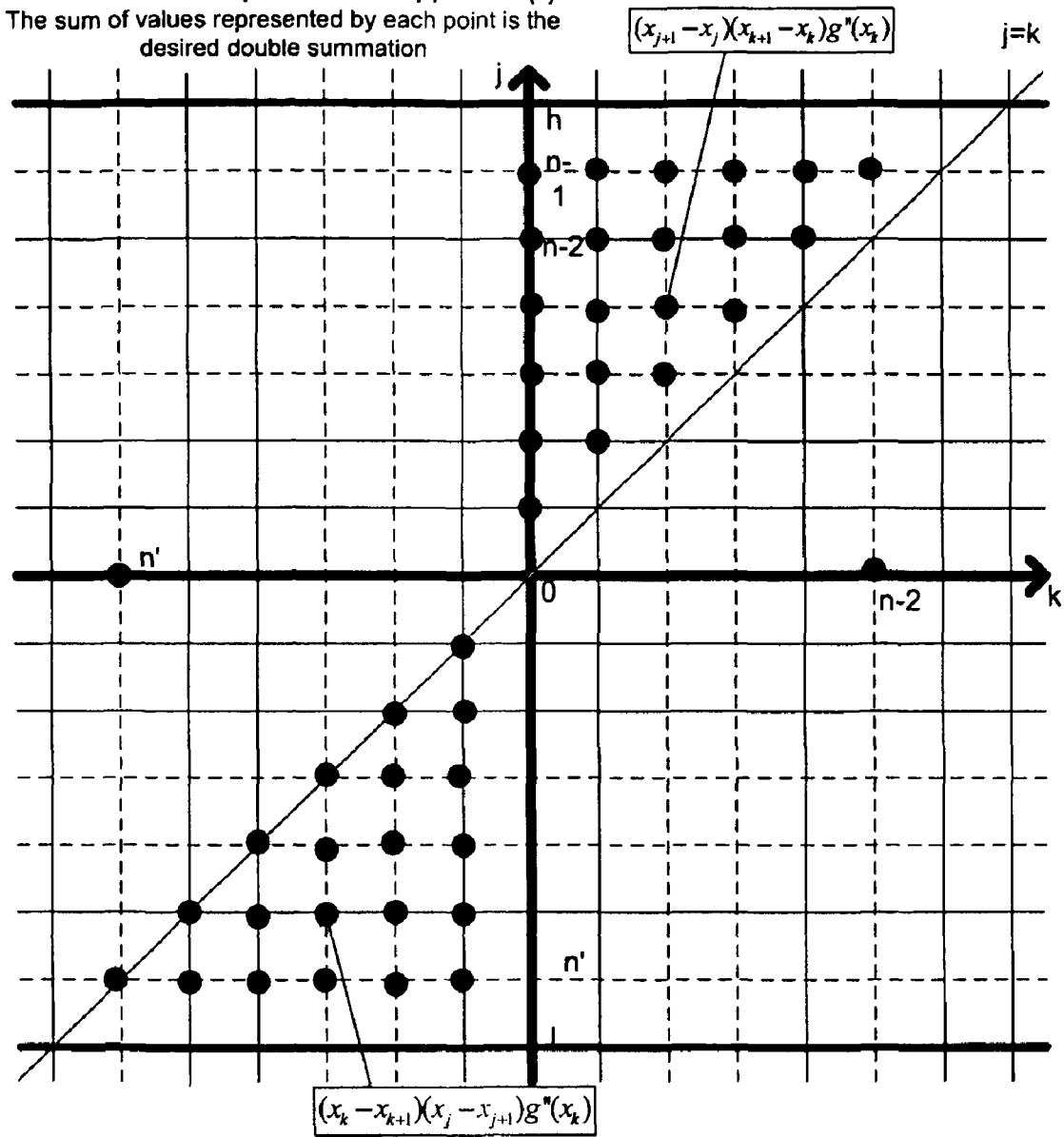
Figure 20: Appendix Illustration    Case 2: m variables m>1

METHODS, SYSTEMS AND COMPUTER PROGRAM PRODUCTS TO FACILITATE THE PRICING, RISK MANAGEMENT AND TRADING OF DERIVATIVES CONTRACTS

BACKGROUND OF THE INVENTION

Financial derivatives, also known as contingent claims, are special types of contracts used by financial risk managers to hedge against the fluctuations of more basic underlyings throughout time. Throughout this document, the term underlying is defined as in FAS Statement 133, appendix A, paragraph 57, a. In the recent years, derivatives have become increasingly important in the field of finance. According to the latest report from the Bank for Internationals Settlements (BIS) on Derivatives activity, the notional amount on all derivatives positions held by trading institutions stood at over 187 trillion dollars at the end of year 2000 (this value represents the sum of contracts traded through exchanges and over the counter). The financial industry has responded to this growth in the derivatives market by developing new methods and systems to price and hedge derivatives contracts and to facilitate trading in derivatives contracts.

The following problems are known to limit the accuracy in present approaches to price and hedge derivatives contracts, hence the ability to most efficiently and effectively trade derivatives contracts:
a) a) The current approaches to valuing derivatives make the assumption that hedging is done in continuous time, while in practice, participants hedge their positions in discrete time increments. Therefore, the existing approaches used in the financial industry or suggested by the academic community do not accurately account for this inherent discrepancy and are limited in accuracy when applied to real markets and the pricing of derivatives.
b) Current approaches to valuing derivatives assume that markets are frictionless—bid/offer spreads are reduced to zero, order size does not affect price or inventory, slippage effects and credit risk are non-existent. In reality, however, markets are not frictionless. While theoretical methods have been suggested to address this problem, they still inadequately reflect real market situations. This forces practitioners to use sub-optimally efficient methods.
c) The current methods for derivatives pricing and hedging depend on the dynamic of underlyings model, thus creating a model risk that can be very costly if not accounted for in practice.
d) The current methods for derivatives hedging use parameters known as Greeks. Greeks are obtained by differentiating price with respect to various other model parameters. The implicit assumption behind using Greeks is that derivatives prices are polynomial functions of these other model parameters. This is not true and therefore the use of Greeks in hedging creates an additional source of approximation error that can be costly in practice.
e) The current methods for derivatives pricing and hedging assume that the underlyings move in infinitely small increments while in practice for all markets there is a minimum increment size often referred to as a tick or a pip.
f) When not assuming continuous time, the current methods for derivatives pricing deal only with a single future period or single underlying scenario. In reality, there are multiple periods and underlyings to consider.
g) The existing methods that do attempt to address all these shortcomings are intractable in practice and thus fail to provide the benefits they were set up to yield.

A vivid example of the potential cost and risk to the financial system of the inaccuracies discussed above is the collapse of the hedge fund Long Term Capital Management (LTCM), where the Nobel Prize winning fund managers relied on a model from which the market deviated. The real market deviation from the model led to an exposure of about one trillion dollars, prompting the federal reserve to engineer a bailout to avert a failure that would have otherwise disrupted the whole U.S. financial system and could have easily have extended to all international markets (See for example "When Genius Failed: The Rise and Fall of Long-Term Capital Management" by Roger Lowenstein ISBN 0-375-75825-9 [46])

There is a substantial body of academic and published patents addressing derivatives trading issues. The relevant patents and patent applications found can be classified into five categories, as described below.
1. Patents that provide methods and systems to price specific types of derivatives. In this category, we can note U.S. Pat. No. 4,642,768, U.S. Pat. No. 5,799,287, JP 2001067409
2. Patents that provide methods and systems to automate the derivatives pricing process. In this category, we can note U.S. Pat. No. 6,173,276, U.S. Pat. No. 5,692,233, and patent applications US20020010667 and US20020103738
3. Patents that provide methods and systems to speed up the derivatives pricing process. In this category, we can note U.S. Pat. No. 5,940,810 and U.S. Pat. No. 6,058,377.
4. Patents that provide methods and systems to better hedge derivatives or manage the risk of derivatives books. In this category, we can note, U.S. Pat. No. 5,819,237, U.S. Pat. No. 6,122,623 and patent applications US20020065755 and WO0133486
5. Patents that provide methods and systems to more efficiently trade specific types of derivative contracts. In this category, we can note U.S. Pat. No. 4,903,201, U.S. Pat. No. 5,970,479, U.S. Pat. No. 6,421,653, U.S. Pat. No. 6,317,727 and U.S. Pat. No. 6,347,307

All those patents while presenting benefits over their prior art face limitations addressed in this invention.

In a recent article in the Journal of Finance on patenting in the field of finance methods and formulas, the author[1] found problematic the failure to cite academic research in prior art reviews of patent applications or granted patent. Our detailed description thus start by reviewing reviewing the academic literature.

[1]Josh Lerner "Where does State Street Lead? A First Look at Finance Patents, 1971-2000" THE JOURNAL OF FINANCE VOL LVII, NO 2 APRIL 2002 [45]

BRIEF SUMMARY OF THE INVENTION

This invention relates to methods, systems and computer programs to facilitate the formation trading and risk management of derivatives contracts on one or more underlying.

It provides a new framework and significant improvements in the following areas:
1. The decomposition of any derivatives contract into fundamental building block structures called basis instruments that are financial contracts in a multi-period, multi-securities market.
2. The incorporation of supply and demand price sensitivities in the pricing of derivatives contracts.
3. The incorporation of credit risk in the pricing of derivatives contracts.
4. The development of methods, systems or computer program products for the accounting of derivatives contracts in compliance with FAS 133 or IAS 39.

5. The development of methods, systems or computer program products for the pricing of derivatives contracts.
6. The development of methods, systems or computer program products for the risk management of derivatives contracts.
7. The development of methods, systems or computer program products for the trading of derivatives contracts whether in organized exchanges or in over-the-counter (OTC) markets.

BRIEF DESCRIPTION OF THE SEVERAL VIEWS OF THE DRAWINGS

FIG. 1 gives an overview of the preferred embodiments of the invention.

FIG. 2 describes the sequence of contractual agreements and cash flows in a BIC.

FIG. 3 describes the format description of derivatives contract in the DCWBSOF format and how it is compressed in the DCWOF format.

FIG. 4 describes the steps of the iterative decomposition process, how derivatives contracts and BICs are iteratively combined to yield the price of the derivative contract.

FIG. 5 describes an embodiment of the present invention in a pricing system.

FIG. 6 shows a screenshot of an embodiment of the present invention implemented in an online pricing system wherein any user specify and name their derivatives contract payout payment function (payoff function) in a functional format as well as their BICs in a functional format and system parameters such as time and space increments.

FIG. 7 shows how BICs functional format is input in an HTML page.

FIG. 8 shows how the derivatives contract in DCWBSOF or DCWOF is input in an HTML page.

FIGS. 9, 10, 11, 12 & 13 show an embodiment of the present invention in an exchange system.

The exchange trading system of FIG. 9. comprises three types of players:
  The price takers operating 1
  The market makers operating 3 and 4
  The exchange system management operating 2 and responsible for control and compliance operations, clearing and settlement verifications and more globally exchange system risk management.

1 contains an input interface 11 through which the price taker may describe a product of interest for pricing information 15 or put an order 16 on an identified product. That input interface 11 may be a keyboard, a mouse, a pad, a microphone or any sensor capable of understanding messages transmitted by human senses; 1 also contains an output interface 12 that may be a screen, a speaker, a printer, or any device transmitting signals decipherable by human senses and understandable by the human brain. 1 also contains an authentication process 13 that uses various authentication algorithms to confirm the identity of the price taker prior to authorizing any operation with the exchange system. The pricing information 15 as well as the order confirmation 17 or the trade confirmation 18 are channeled through that output interface 12 to the price taker senses. Through the input interface 11, the price taker sends information relating to the product of interest as in 19 of FIG. 1. As further specified in FIG. 2, the product of interest is specified in the form of a function f as $f(S_1^1, \ldots, S_1^m, \ldots, S_n^1 \ldots, S_n^m)$. The function $f$ may be described in a computing language that could be easily understood by price takers and translated by the server of the exchange system in 28 to be ready for decomposition in basis instruments.

2 contains compliance and control systems 27 that check and authorize operations performed by the price takers or the market makers. As further described in FIG. 3, 28 performs, if necessary, the transformation of relation (26) described in our detailed description that takes as input a function of unspecified parameters $\beta_i$ and $\Omega_i$ as well as the $S_i^j$'s and returns as output to 21, a function of solely the $S_i^j$'s. 21 further taking as input the most competitive basis instruments prices with the references of the market makers quoting them as provided by 22, uses the iterative decomposition algorithm of relations (20) to compute the price of the desired product which is then returned to 15. The basis instruments prices in 22 are taken from individual market makers quoted basis instruments prices in 25 and 26 for example and by selecting the most competitive of each of the basis instruments with the references of the quoting market maker. If the price taker now decides to put an order on the product, this indication is channeled through 16 to 21 which then sends the order confirmation through 17 to the price taker, and the references of the price taker as well as the market makers are sent to 24 for clearing and settlement. Trade Confirmations are then sent through 18 to the price taker and through 32 to each relevant market maker with information on the nature of the basis instrument contracted.

The exchange system may operate as the counterparty in each transaction either with the market makers or the price takers. In this instance, the exchange system would act as the guarantor of each obligation either to the market makers or the price takers. It would then put in place a credit management function to hedge against the risk of default of any counterparty. This could be done through traditional means such as margin requirements or through credit derivatives by allowing basis instruments based on underlyings described in our detailed description to trade and by entering into contracts in which the credit risk is shifted to the most credit worthy players. The exchange system may also decide to let each party bear the credit risk of his or her counterparty and act solely as means of exchange, but then credit exposure management would be a very complex task for each and every counterparty to handle. If an exchange system is setup to be the counterparty in each transaction and if the credit risk function is managed properly, with the exchange set to have the highest credit rating possible so as to be considered the risk-free counterparty of reference, this would give such an organized exchange a competitive advantage over OTC derivatives markets. If furthermore it decides to hedge its exposure by entering into credit derivatives contracts, this would create new markets for credit derivatives.

Another critical feature of the exchange system for computational purposes is that when the number of possible states of the selected random variables grows large and the number future periods grows as well, the computational cost to price a derivatives contract becomes at least of the order of $O(s'''')$. So an actual system would include some dimension reduction variables transformations to reduce the number of variables on which the various derivatives contracts prices as well as the various basis instruments price depend. Also, in order to reduce the number of states, some actual algorithms would sample only some limited number of states to infer the price of larger combinations of basis instruments prices.

3 and 4, which are just 2 examples of systems operated by a potentially larger number of market makers, contain an input interface 35 as in 11 and an output interface 36 as in 12. It also contains an authentication process 37 for market makers as in 13 for price takers. Each market maker selects a model and model parameters 34 that can be processed in 31 to yield the market maker's quoted basis instrument prices that are subsequently sent to 25. 34 is further detailed in FIG. 3 and shows that the model and model parameters description function is divided into a counterparty credit risk model 341, models of the stochastic process followed by the underlyings 342, models of the scaling density functions 343, and models for delimiting the range of basis instruments quoted 344, all this combined as further defined in our detailed description to yield in 31 the quoted basis instruments prices. 3 and 4 also contain in their Assets and Trading Information Database 33, an inventory of the market maker's position in all basis instruments held. Trades Confirmation and settlement information from 24 are sent to the market makers through 32 where the information formatted for the output interface. All relevant information storing is done in 33.

While the drawings of FIG. 9 only involve a single price taker, only two market makers and only a single Exchange System Management administrator, it is fairly obvious this is to ease presentation and that an actual such system may involve a larger number of price takers, market makers and exchange system management personnel.

FIG. 14. describes an embodiment of the present invention in a risk management system.

The description of the risk management system is based on our decomposition of any derivative in basis instruments and our method for obtaining the implied conditional probability density functions from market basis instruments prices. The Risk Manager communicates with the Risk Management or Decision System 6 via an input interface 68 as 51 in 5, 11 in 1 or 35 in 3 or 4, and an output system 67 as 52 in 5, 12 in 1 or 36 in 3 or 4. The Authentication Process in 65 is as 53 in 5, 13 in 1 or 37 in 3 or 4. The Risk Manager sends portfolio position requests to 66 which process them in 64, which then send a request to 63 to check the inventory of basis instruments positions held, another request may also be sent to 61 to obtain the market basis instruments prices. Using our formula [16] obtained in our detailed description to extend the Breeden Litzenberger formula, we obtain the conditional probability density function in 62, which together with the basis instruments help obtain the value of the portfolio held, compute various pro-forma or non pro-forma reports which help better apprehend the risk and opportunities of the position held. For example, value at risk scenarios can be generated with exactly market-accurate probability of occurrences directly linked to the actual costs of available hedges.

FIG. 15 & FIG. 16 show how an embodiment of the present invention enables Value At Risk (VAR) risk management.

FIG. 17 shows how a portfolio managed in a VAR framework potentially exposes to potentially unbounded losses(yl) in likely scenarios (state between xl1 and xl2) that may fall out of the confidence interval. On the contrary, an embodiment of our invention enables risk management in which a maximum worst case scenario loss can be ascertained with certainty by enabling precisely designed contracts to achieve that goal.

FIG. 18 shows how computer implemented methods may be used to reduce computational time in the specification of BICs and the resulting derivatives price computation.

FIG. 19 shows how computer implemented methods may be used to reduce computational time in the specification of derivative contracts and the resulting derivatives price computation.

FIG. 20 shows the appendix illustration describing the functional decomposition in the options format as one considers the multivariables case m>1.

DETAILED DESCRIPTION OF THE INVENTION

1 Introduction

The present invention introduces the notion of basis instruments as the building blocs for pricing or hedging any derivative security defined in the most general sense. It describes a decomposition formula that precisely shows how any derivative security is decomposed in these basis instruments. The importance of these basis instruments tools cannot be overemphasized. A top-level understanding of their relevance may start by asking the two following questions with no apparent bearing on the issue at hand:

1. Why mapping the human genome in 2000 was hailed by the medical research community as one of the major scientific achievements of the century in the field?
2. Why was Mendeleiev's (1869) description of the periodic table of elements such a foundational achievement in chemistry and physics?

In answer to the first question, we have been explained that identification of the role of each gene in our DNA will help understand the causes of most genetic diseases, facilitating tailor made cures. Although in most cases, these benefits are yet to be seen, governments and private sector have and continue to invest massively in this endeavor.

In the second case we now know for sure that because Mendeleiev's table helped scientists understand that all physical matter were just combinations of his basic elements, it became clear that all desired materials could be built by doing just such combinations. The issue shifted to economics: how to make such combinations most cost effectively? In cases where cost effective processes have been found, this has led to the development of chemical industries who have taken advantage of the opportunity and helped build the wealth of nations by satisfying our needs for all kinds of materials. Research still continues to expand to find more cost effective processes to manufacture needed end products.

In financial derivatives risk management, our identification of the basis instruments and the characteristics of each one of them can be likened to the identification of the gene as the unit element in the expression of each living being descriptive feature as well as the inventory of all possible genes. In chemistry or physics, the analogy is the atom and the inventory of all atoms given by the Mendeleiev table. Our decomposition formula is analogous to describing the genetic composition of each possible living being, once identified; in physics or chemistry, our decomposition formula could be equivalent to providing the atomic composition of each described material, whether solid, liquid or gas.

These analogies are intended to relate to the importance of the proposed innovation. A survey of published literature will help put this innovation in the proper context.

Published literature directly relevant to Definition 1 and Theorem 1 discussed later, are the contributions of Kenneth Arrow (1953, Nobel Prize 1972) and Gerard Debreu (1959, Nobel Prize 1983). Arrow and Debreu defined what are now called Arrow-Debreu primitive securities (and Arrow-Debreu state prices) as the basis elements in which all other contingent claims could be decomposed into in a single security, single future period market (but with multiple possible states). Arrow Debreu securities are simply securities that pay $1 at the end of the period if a given state occurs and nothing if any other state occurs. If there is one Arrow-Debreu security for all possible future states, then a claim contingent on future states can be decomposed into such securities. To see how this happens, one can observe that if f is a function defined on Σ, set of all possible states the variables S can take, we have the trivial identity:

$$f(S) = \sum_{s \in S} f(s) \times 1_{\{S=s\}} \quad (1)$$

where $1_{\{S=s\}}$ represents the function taking the value 1 if S is equal to s and the value 0 if S is equal to any other value.

The application, which to each payoff at a future time T that is a function $f$ of S stochastic variable known only at T, associates the current value of the contract is an homomorphism of group if state prices are taken as fixed. In the traditional risk neutral pricing framework, this can be seen in the pricing by taking expectations and the discount factor $B(t_0, t_0)$ which represents the value at $t_0$ of the security paying 1 with certainty at time $t_0$. We have:

$$E(f(S_{t_1})B(t_0, t_1)) = \quad (2)$$
$$\sum_{s \in \Sigma} E(f(s) \times 1_{\{S_{t_1}=s\}}B(t_0, t_1)) = \sum_{s \in \Sigma} f(s) \times Prob(S_{t_1} = s)B(t_0, t_1)$$

In a single period market, since every contingent claim on the value $S_{t_1}$ of the underlying S at time $t_0$ will have a payoff that can be mathematically written at time $t_0$ as a function of $S_{t_1}$, i.e $f(S_{t_1})$, identity (1) demonstrates the Arrow-Debreu result that any contingent claim, which can always be described by a function $f$, can be obtained as a sum of $f(s)$ securities paying 1 at time $t_0$ if $S_{t_1}$ is equal to a particular value s and zero if any other value is taken, with s spanning the whole range of value S may possibly take at time $t_0$. Let's further detail this concept in a simple example.

Let's suppose we are on Oct. 27, 2001. We consider the simplest case of a ticket purchased at 10 AM EST (Eastern Standard Time), Oct. 27, 2001=$t_0$ representing a bet that the New York Yankees (AL) will have won the 97th Baseball World Series against the Arizona Diamondbacks (NL) at the end of the day on Nov. 4th, 2001. If this event occurs the ticket holder will receive $1.00 at 10 AM EST on Monday Nov. 5, 2001=$t_7$, otherwise he will receive nothing. There are only two possible outcomes/states; with probability $\pi_{0,1}$ state 1 of nature, that is AL winning will be realized and with probability $\pi_{0,2}$ state 2 of nature, NL winning will be realized. We also assume fractional dollar bets can be purchased. Using daily fed funds rates reported by the federal reserve, we obtain $B(t_0, t_7)$=0.9994.

So, the NY Yankee victory bet is an Arrow-Debreu security in this state space and we denote it. Let's suppose there is market consensus on Oct. 27, 2001 that there is a 40% (=$\pi_{0,1}$) chance that the NY Yankee will win and a 60% chance that the Arizona Diamondbacks will win (=$\pi_{0,2}$).

Since there are only two possible states for the lottery ticket at time $t_7$, there remains only one Arrow-Debreu security to be described to have what is called a complete market, i.e. one in which all other contingent claims are mere linear combinations of elements of the set of primitive securities. This remaining security is $1_{\{State\ 2\}}$.

Since $B(t_0, t_7)$ is traded in the market, i.e. deposit accounts paying the fed funds rate exist, $1_{\{State\ 2\}}$ is redundant since:

$$1_{\{State\ 2\}} = 1 - 1_{\{State\ 1\}} \quad (3)$$

Since $1 can be safely replicated on Nov. 5, 2001 with $ 0.9994 on Oct. 27, 2001, this allows a static replication of on Nov. 5, 2001 by selling on Oct. 27, 2001 a bet ticket for $ 0.4 0.9994=$0.39976 adding $0.59964 to it and depositing the sum equal to $0.9994 in a safe account paying the fed funds rate. Indeed if the Diamondbacks win, the bet ticket will expire worthless on Nov. 5, 2001 so that one would receive $ 1 from the deposit paying the fed funds rate; if however, the Yankees win, the $1 taken from the deposit account will be used to pay the holder of the bet ticket sold on Oct. 27, 2001. As such the position built is exactly equivalent to buying a ticket paying $1 on Nov. 5, 2001 if the Diamondbacks win and zero otherwise.

Let's suppose now that we have a derivative security paying $f(S_{t_7})$ at time $t_7$. Since there are only two possible states, $f$ is a binary (Boolean) function and we note $f_1=f(State1)$, $f_2=f(State2)$. Using the Arrow decomposition, we postulate that holding the derivative security paying $f(S_{t_7})$ at time $t_1$ is equivalent to buying $(f_1-f_2)$ identical lottery tickets paying 1 if AL wins and putting $ 0.9994 $f_2$ in a secure deposit account paying the overnight fed fund rate of interest. Indeed, it is easy to see that if state 1 occurs at $t_1$, one receives $ $(f_1-f_2)$ for having the winning tickets and adding to that the $ $f_2$ withdrawn from the secure deposit account, one ends up with $ $f_1$. If however State 2 occurs, one receives nothing for the lottery ticket and ends up only with $f_2$ withdrawn from the secure deposit account. Thus the equivalence with the derivatives security paying $f(S_{t_7})$ at time $t_7$ is evidenced.

The problem we faced to begin with was that, since the end of the fifties and beginning of the sixties when those early works were being pioneered, little has been done to extend these Arrow-Debreu securities as primitive securities in a multi-period market where there may be many securities without making questionable assumptions:

In the early 1970's, Black, Scholes (Nobel prize 1997) and Merton (Nobel prize 1997) made the assumption that the dynamic of securities followed a pattern similar to that of a stochastic process called a geometric Brownian motion with a constant parameter called the volatility. They thus derived what is nowadays known as the Black-Scholes-Merton formula. What made this model appealing was that if its assumption held, the basis instrument from which to replicate any contingent claim on an underlying would be the underlying itself. Black, Scholes and Merton showed that a dynamic hedging strategy would be instantaneously risk free if it consisted of selling an option (or any other contingent claim) and buying the underlying in quantities equal to the derivative of the price of the option with respect to the underlying (also called delta) according to the formula they calculated. Under a most general extension of their work, the argument goes as follows:

Let's suppose the underlying follows a diffusion process, i.e.

$$dS_t = \mu(S_t, t)dt + \sigma(S_t, t)dW_t \quad (4)$$

Then if one considers a contingent claim on the security S whose price at any time t can be obtained as a function of the value of the underlying S at time t and t itself, i.e. $f(St, t)$, then, if also assume $f$ is twice differentiable as a function of $S_t$ and differentiable as a function of t, then one can apply the well known It lemma which gives:

$$df = \left(\frac{\partial f}{\partial t} + \mu(S_t, t)\frac{\partial f}{\partial S} + \frac{1}{2}\sigma^2(S_t, t)\frac{\partial^2 f}{\partial S^2}\right)dt + \sigma(S_t, t)\frac{\partial f}{\partial S}dW_t \quad (5)$$

can be rewritten, using (4) as:

$$df = \frac{\partial f}{\partial S}dS_t + \left(\frac{\partial f}{\partial t} + \frac{1}{2}\sigma^2(S_t,t)\frac{\partial^2 f}{\partial S^2}\right)dt \quad (6)$$

which means:

$$f(S_{t+\Delta t} = S, t+\Delta t) = \quad (7)$$
$$f(S_t = F) + \frac{\partial f}{\partial S}(S_t = F)(S-F) + \left(\frac{\partial f}{\partial t} + \frac{1}{2}\sigma^2(S_t,t)\frac{\partial^2 f}{\partial S^2}\right)\Delta t + \theta(\Delta t)$$

or:

$$f(S_{t+\Delta t} = S, t+\Delta t) - f(S_t = F) - \frac{\partial f}{\partial S}(S_t = F)(S-F) = \quad (8)$$
$$\left(\frac{\partial f}{\partial t} + \frac{1}{2}\sigma^2(F,t)\frac{\partial^2 f}{\partial S^2}\right)\Delta t + \theta(\Delta t)$$

that is:

$$\lim_{\Delta t \to 0} \frac{E\left[\left(f(S_{t+\Delta t} = S_t + \Delta t) - f(S_t = F, t) - \frac{\partial f}{\partial S}(S_t = F)(S-F) - \left(\frac{\partial f}{\partial t} + \frac{1}{2}\sigma^2(F,t)\frac{\partial^2 f}{\partial S^2}\right)\Delta t\right)^2\right]}{\Delta t} = 0$$

Formula (6) shows that a portfolio consisting of a long position in the derivative contract whose value is equal to $f(S_t)$ at any time t coupled with a short position in $$\frac{\partial f}{\partial S}$$

units of the underlying is solely a function of time, thus risk-free. Thus it should earn the risk-free rate of return $r_d(t)$. So if one writes $$\Pi_t(S_t) = f(t, S_t) - \frac{\partial f}{\partial S}S \text{ then } d\Pi_t(S_t) = \Pi_t(S_t)r_d(t)dt \quad (9)$$

Since $S_t$ pays a dividend at a rate named $r_f(t)$ assumed to be constant between t and t+dt, $r_f(t)\partial f/\partial S$ dt should be subtracted from the variation of $\Pi_t(S_t)$ coming from (6). Thus, $$\left(\frac{\partial f}{\partial t} + \frac{1}{2}\sigma^2(S_t,t)\frac{\partial^2 f}{\partial S^2} - r_f(t)\frac{\partial f}{\partial S}S_t\right) = r_d(t)\left(f(t,S_t) - \frac{\partial f}{\partial S}S_t\right) \quad (10)$$

In the case of a Call Option struck at K and maturing at T, it is known that $$f(S_T,T) = \text{Call}(S_T,K,T,T) = (S_T-K)^+ \quad (11)$$

If it were assumed that the underlying followed a geometric Brownian motion with constant risk-free rate r and volatility and no drift, one would have:

$$\left(\frac{\partial \text{Call}(S_t,K,t,T)}{\partial t} + \frac{1}{2}\sigma^2 S_t^2 \frac{\partial^2 \text{Call}(S_t,K,t,T)}{\partial S_t^2}\right) = \quad (12)$$
$$r\left(\text{Call}(S_t,K,t,T) - S_t\frac{\partial \text{Call}(S_t,K,t,T)}{\partial S_t}\right)$$

(12) and (10) were obtained by Black, Scholes & Merton. Recognizing in (12) an equation reducible to the heat equation well known in Physics, they were able to derive the celebrated closed form formula carrying their name:

$$\text{Call}(S_0,K,0,T) = S_0 N(d_0 + \sigma\sqrt{T}) - Ke^{-rT}N(d_0) \quad (13)$$

$$\text{with } d_0 = \frac{L_{oy}(S_0/K) + \left(r - \frac{\sigma^2}{2}\right)T}{\sigma\sqrt{T}}$$

In obtaining this result, the following assumptions were made:
(i) It was possible to trade in continuous time.
(ii) Market on the underlying was perfectly frictionless; by frictionless we mean no transaction costs, no bid/ask spreads, no restrictions on trade (legal or otherwise) such as margin requirements or short sale restrictions, and no taxes. There is infinite liquidity.
(iii) The dynamic of the underlying follows a geometric Brownian motion with constant risk-free rate of return and constant volatility.

Assumption (i) has proven impossible to realize in practice because of physical limitations and the importance of transaction costs; derivatives portfolio managers tend to rebalance their portfolio to adjust the sensitivity of their portfolio to spot changes once or twice a day.

Assumption (ii) is just not true in practice and virtually all data series for underlyings traded in open markets display skew and excess kurtosis incompatible with the geometric Brownian motion assumption of (iii). The failure of portfolio insurance in the 1987 stock market plunge, and to some extent the "normal" assumptions behind the failure of LTCM in 1998 ([46]) reveal that adhering to such assumptions can have a potentially devastating effect on the stability of the U.S. financial system. The resulting appearance in 1987 of smile and term structure of implied volatility quotes in vanilla options markets and the increased liquidity of vanilla options led to the development of a model by Dupire, Derman & Kani, Rubinstein ([25] [53]). This model is based on the assumption that vanilla options (Call/Puts) for all maturities and strikes are the basis securities from which the price of all subsequent derivatives instruments, path dependent or not, might be inferred. This model, while having theoretical appeal, has not been validated by empirical tests ([24]). In fact, practitioners price path dependent options with concerns for the Vega-convexity due to the stochasticity/uncertainty of volatility in a manner that cannot be reflected in Dupire & al, ([25])). A close analysis of the Dupire-Derman-Kani-Rubinstein model, if we position the problem in finite future states that correspond to the reality, shows that accepting their model would be equivalent to stating that a system of sn unknown would be determined by ns equations without any empirical or economic justification on the rule used to determine the remaining sn-ns equations. The most advanced models used in practice are now going back to and extending models with Poissonian jumps or stochastic volatility earlier pioneered by Merton [50] and Hull and White [40]. However, Das and Sundaram [19] have shown that the term structure patterns of these models are fundamentally inconsistent with those observed in the data. Stochastic volatility models, which fare better than jump models in data description according to Das & Sundaram, are found to load to greater incompleteness as quantified by Bertsimas, Kogan & Lo [6]. It now appears there are a wide range of new models of markets dynamics to replace Black-Scholes, all without clear undisputed winner for all circumstances. The proliferation of these models has created additional difficulties to mark non-standard derivatives to market, making it difficult to strictly abide by FAS 133 & 138 ([28], [30]) for accounting for derivatives positions in financial statements; the Financial Accounting Standards Board (FASB) introduced on Jun. 15, 2000 [30] mandatory compliance with FAS 133, the latest accounting rules for derivatives to emerge since 1984. Reporting non-standard derivatives in balance sheets and derivatives P&L on income statements at fair market value, as is requested in FAS 133, can be a daunting challenge due to lack of liquidity on these products and the lack of standardization of mark-to-market methods. In the derivatives market the recent loss by Allfirst of $691 million in foreign-exchange losses went unnoticed over a couple of years due to inappropriate mark-to-market of its derivatives positions. The existence of decomposition in basis instruments and the existence of a market for these basis instruments, as made possible by the present invention, solve the problem in a definitive way. Furthermore, FAS 133 requires that derivatives be accounted as hedges and their profit and loss (P&L) reported in the Other Comprehensive Income (OCI) section of financial statements only when it can be shown that this P&L offsets that of an existing underlying in at least 80% of the risk of fluctuations in the value of this underlying. This creates potential confusion as to how to estimate this 80% value among the wide choice of possible models. Patents applications WO 02/44847 A2 or US 2002/0107774 A1 are one of the many model dependent approaches to address the issue. The existence of a market for basis instruments would conclusively address this issue. Finally, all those models, by assuming continuous-time processes are only approximations to physically realizable phenomena, due to the existence of transaction costs. In fact, Bertsimas, Kogan & Lo's [6] quantification of this approximation show that even if lognormal assumptions were true, the approximation error may be of significant magnitude for some payoff types, further reducing the effectiveness of all the models surveyed for hedging purposes.

Moreover, in obtaining the PDE (12) or (10), two important assumptions were made which are not always true in practice:

It was assumed that the derivatives contract could be put in the form $f(S_t, t)$ It was assumed that the asset followed a diffusion process, thus we could apply It's lemma.

In practice, for many important cases, the derivatives contract's price cannot be obtained as $f(S_t, t)$ for all times t. Additionally, extensive mathematical finesse is required to derive an applicable PDE for each new derivatives contract under the diffusion process assumption. Such extensive mathematical methods can not be not readily automated. The approach to obtain the PDE for the Average rate or the Lookback option may exemplify this difficulty. See for example the PDEs compiled in Rogers & Talay [52]. When no diffusion process assumption is made it is substantially more difficult to obtain a tractable PDE. One must then resort to trees or Monte-Carlo computations for pricing purposes. More significantly, it is difficult using these methods to understand how to incorporate micro-structural issues in the pricing of derivative contracts. Our invention does enable easy incorporation of micro-structural issues when pricing derivatives.

The current approach for managing the risk of a portfolio of derivatives is by hedging the Greeks of the portfolio. The Greeks are the sensitivities of the portfolio to different market variables. Delta is the sensitivity with respect to variations in the asset price. Gamma is the sensitivity of the Delta to variations in the asset price. Vega is the sensitivity of the portfolio to variations in its Black-Scholes-Merton implied volatility. Theta is the sensitivity to time. Higher order sensitivity parameters also exist, with non-standard names. In general, hedging strategies are aimed at matching first and second order derivatives of portfolios to the various parameters. In doing so, what is implicitly assumed is that the sensitivity of portfolios of derivatives to their parameters is polynomial and of degree 2 or 3 or 4 for the most accurate hedges.

For example, one would take a portfolio $\Pi(S_t, s)$ and write $$\Pi(S, t, \sigma, r) \approx \Pi(S_0, t_0, \sigma_0, r_0) + \\ < \left( \frac{\partial \Pi(S_0, t_0, \sigma_0, r_0)}{\partial S}, \frac{\partial \Pi(S_0, t_0, \sigma_0, r_0)}{\partial t}, \frac{\partial \Pi(S_0, t_0, \sigma_0, r_0)}{\partial \sigma}, \frac{\partial \Pi(S_0, t_0, \sigma_0, r_0)}{\partial r}, \right) \\ (S - S_0, t - t_0, \sigma - \sigma_0, r - r_0) > +^t (S - S_0, t - t_0, \sigma - \sigma_0, r - r_0) \\ H(S_0, t_0, \sigma_0, r_0)(S - S_0, t - t_0, \sigma - \sigma_0, r - r_0) + \dots \qquad (14)$$

where H is the Hessian of $\Pi$ with respect to the variables $S_t$, σ, r.

and then one would consider that a perfect hedge for $\Pi(S, t, s)$ would be a portfolio matching the value at the initial point as well as the first and second order sensitivities. In reality however, the hedge is dependent on the model used to infer the dependence on the specified parameters. Additionally, the polynomial approximation derived from the Taylor expansion is of uncertain accuracy and can lead to serious problems, especially for highly non-linear pay-off options such as barrier options. Preferred embodiments of our innovation address this problem as well.

The idea of using basis elements or spanning for the pricing of derivatives continues to this date to be an active field of research in Financial Economics. For examples of recently published approaches see Madan, Carr, Geman, Yor, Bakshi [48], [13]. However, by making assumptions of continuous time hedging, brownian filtrations or semi-martingale properties of the underlying and absence of micro structural effects, these approaches not only limit the possible accuracy obtained for pricing purposes, but they create a model risk when one would attempt to use those results for hedging purposes using the selected basis (Characteristic function or Hermite polynomials as in [47], [48] for instance)

Our invention differs substantially from the approaches mentioned in the prior art papers by the fact that we focus on selecting exactly replicating basis instruments that are as close as possible to what exists on the market, i.e. spot, forwards/futures and vanilla options. Additionally, our implementation is designed for computational tractability. In the prior art papers, the authors make simplifying assumptions for mathematical tractability that are not always economically justifiable. A recurrent feature of such decomposition approaches is to seek Hilbertian bases and obtain pricing by taking the projection on a few elements of the basis without clear justification of the economic rationale of the approximations. Furthermore in those approaches, one has first to non-trivialy infer or imply the price of basis instruments from traded instruments.

In their simplest form in a two state, two periods economy, a preferred embodiment of the basis instruments we introduce could be equivalently defined in addition to the Arrow-Debreu primitive security as:

An agreement at time $t_0$ to buy at time $t_1$ a lottery ticket at the price $\$10,000.\pi_{1,1}$ if state 1 occurs and $\$10,000.\pi_{1,2}$ if state 2 occurs at time $t_1$.

When extending to n arbitrary periods, a basis instrument would be: an agreement at time $t_0$ to buy at time $t_{k-1}$ $(1 \leq k \leq n)$ a lottery ticket at the price $\$10,000\pi k-1, f_{k-1}$, where $f_{k-1}$ is a k−1 series of 1 and 2 indicating the states of winning or losing lottery tickets bought between time $t_0$ and time $t_{k-1}$.

How far into the history of these tickets wins or losses the seller will take into consideration will depend on his views of how past events affect the likelihood of future events.

Our example of the 97th baseball World Series can be used to further illustrate the concept. To win the World Series, a team needs to win four of possibly seven games. For the 97th series, the games were scheduled as:

TABLE 1

World Series

| Game | Date | Location |
| --- | --- | --- |
| Game 1 | Sat, Oct. 27 | Arizona |
| Game 2 | Sun, Oct. 28 | Arizona |
| Game 3 | Tue, Oct. 30 | NY Yankees |
| Game 4 | Wed, Oct. 31, | NY Yankees |
| Game 5 | Thu, Nov. 1 | NY Yankees |
| Game 6 | Sat, Nov. 3 | Arizona |
| Game 7 | Sun, Nov. 4 | Arizona |

We call $X_t$ the stochastic process tasking the value 1 the day after the end of each game won by the NY Yankees (AL) and the value 0 otherwise. As such $X_t$ is for t being a day after a game a bet that the Yankee will win the game of the day before. State 1 that AL wins the World Series is thus such that:

$$1_{\{State1\}} = 1_{\left\{\sum_{j=1}^{7} X_{t_j} \geq 4\right\}} = f(X_{t_1}, X_{t_2}, \ldots, X_{t_7}) \quad (15)$$

which shows that the Yankee World Series victory bet is now a path dependent derivative contract on the realizations of the stochastic process $X_t$. Let's suppose that to replicate this contract the only instruments we have are bets on each individual game and that those bets are taken at time $t_0$=Oct. 27, 2001 at 10 AM EST (Eastern Standard Time) but paid for one period before the game settlement date. It is natural to expect that as games are played, estimates of the probabilities of victory in the subsequent games change.

1.1 Notations

For $i=0 \ldots 6$ we note: $\pi_i = \pi_{i,i+1}(X_{t_{i+1}} = 1 | X_{t_i}, \ldots, X_{t_0})$ so that $\pi_{i,i+1}(X_{t_{i+1}} | X_{t_i}, \ldots, X_{t_0}) = \pi_{i,i+1} = X_{t_{i+1}} \pi_i + (1 - X_{t_{i+1}})(1 - \pi_i)$ i.e: $\pi_{i,i+1}(X_{t_{i+1}}) = (1 - \pi_i) + (2\pi_i - 1)X_{t_{i+1}}$ For any derivative contract on the stochastic process $X_t$ paying at time $t_7$ $f(X_{t_1} \ldots X_{t_7})$ we note $\pi_i^f$ the price at the time $t_i$ of the contract paying $t_7$ $f(X_{t_1} \ldots X_{t_7})$ at time $t_7$.

We suppose each team has a 60% vs. 40% probability of winning its first match in its home stadium and that this probability is increased by 10% after each game won if the next game is at home and it decreases by 10% after each game lost at home if the next game is also at home. We also assume that once a party wins 4 games, its probability of winning the remaining games if any is zero. These translate algebraically into:

$\pi_0 = 0.4$ $\pi_2 = 0.6$ $\pi_5 = 0.4 \times 1_{\{2 \leq \sum_{j=1}^{5} X_{t_j} < 4\}} + 1_{\{2 > \sum_{j=1}^{5} X_{t_j}\}}$ For $i = 1$ and 3:

$\pi_i = (0.2 X_{t_i} - 0.1) + \pi_{i-1}$

For $i = 4$ and 6:

$\pi_i = ((0.2 X_{t_i} - 0.1) + \pi_{i-1}) \times 1_{\{i-3 \leq \sum_{j=1}^{i} X_{t_j} < 4\}} + 1_{\{i-3 > \sum_{j=1}^{i} X_{t_j}\}}$ Now we introduce our 2-states multi-periods basis instruments definition.

1.2 Definition

In a single process $(X_t)$, two states (1 and 0), multi-periods market $\{t_0 < t_1 < t_{n-1} < t_n\}$ with reference currency $X_t^0$, so that $X_t^0$ is equivalent to 1, a basis instrument is defined as:

An Agreement between two parties, $\beta$ and $\Omega$ contracted at time $t_0$ and stipulating that either:

At time $t_{i-1}$, $\beta$ shall pay $\Omega$ the amount $$N(X_{t_1}, \ldots, X_{t_{i-1}}) \otimes \pi_{i-1}^{\beta 1}(X_{t_1}, \ldots, X_{t_{i-1}})$$

and at time $t_i$, $\Omega$ shall pay $\beta$ the quantity: $N(X_{t_1}, \ldots, X_{t_{i-1}}) \times X_{t_i}^1$ or At time $t_{i-1}$, $\beta$ shall pay $\Omega$ the amount $$\overline{N}(X_{t_1}, \ldots, X_{t_{i-1}}) \otimes \pi_{i-1}^{\beta 0}(X_{t_1}, \ldots, X_{t_{i-1}})$$

and at time $t_i$, $\Omega$ shall pay $\beta$ the quantity: $\overline{N}(X_{t_1}, \ldots, X_{t_{i-1}}) \times X_{t_i}^0$ When $\Omega$ pays $\beta$ the quantity $\overline{N}(X_{t_1}, \ldots, X_{t_{i-1}})$, it is an extension on what is commonly know as a forward rate agreement and will be referred to here as a zeroth order basis instrument in the reference currency $X_t^0$.

When $\Omega$ pays $\beta$ the quantity $N(X_{t_1}, \ldots, X_{t_{i-1}})$, it is an extension on what is commonly know as an Arrow-Debreu security and will be referred to here as a zeroth order basis instrument in the currency $X_t^1$.

1.3 Proposition

In a single process $(X_t)$, two states (1 and 0), multi-periods market $\{t_0 < t_1 < t_{n-1} < t_n\}$, we have the following relationships:

$\pi_n^f = (X_{t_1}, \ldots, X_{t_n})$

And for $1 \leq i \leq n$, $$\pi_{i-1}^f = (\pi_n^f(X_{t_1}, \ldots, X_{t_{i-1}}, 1) - \pi_n^f(X_{t_1}, \ldots, X_{t_{i-1}}, 0)) \otimes \pi_{i-1}^{B_{i-1}^1} + \pi_n^f(X_{t_1}, \ldots, X_{t_{i-1}}, 0) \otimes \pi_{i-1}^{B_{i-1}^0}$$

If we apply this to our World Series example, to calculate the price at t0 of an AL world series victory bet, we have:

$$f(X_{t_1}, X_{t_2}, \ldots, X_{t_7}) = 1_{\{\sum_{j=1}^{7} X_{t_j} \geq 4\}}$$

and using our formula (16) with data (15) we obtain a probability of 48.3% and therefore if there is a market where bets on the AL victory exists, a risk free arbitrage would be to buy a ticket betting an AL victory at 40% of the face value selling basis instruments replicating that victory bet at 48.3% of the face value, realizing a net profit of 8.3% of the face value.

The example above presents the concept of basis instruments and how this innovation is used for pricing and hedging any derivative security in the case of a single process, two states (1 and 0), multi-periods market in a way that is an innovation on the Arrow-Debreu primitive securities. To infer conditional probabilities of possible future occurrences from basis instruments prices, our new method is to use the relationship $$Prob(X_{t_i} = 1 | X_{t_0}, \ldots, X_{t_{i-1}}) = \frac{\pi_{i-1}^{B_{i-1}^1}}{\pi_{i-1}^{B_{i-1}^0}}$$

In the more general case of a multi-processes, multi-states, multi-periods market, in another embodiment of the invention, we will present below the more general innovation that applies.

While in a two state process, vanilla options and Arrow-Debreu primitive securities coincide, when the number of states increases, the two types of contracts become different, yet the two, with bonds and forwards added to options, remain equivalent through a bijective transformation. We choose to present our basis instruments below as extensions on vanilla European options forwards and cash instruments instead of the academic Arrow-Debreu securities as this basis, is more economically sensible and computationally allows a faster convergence to the desired payoff for most derivatives instruments using the lower order basis instruments and making the decomposition around the forward value around which probabilities of occurrences are clustered. This is also of critical importance to relate to the shortcomings of the Black Scholes Merton derivatives hedging approach. Formula (14) shows that at any trading time, a derivatives position would be hedged through cash and underlying or forwards in amounts equal to the sensitivity of the option to its underlying (or delta), but unlike Merton, there are complementary terms representing a spanning of calls and put options in proportions equal to the second derivative (or gamma) of the financial derivative with respect to the underlying. Formulas resembling (14) have been known before in a two period case, (see for example [16], appendix), however these formulas have been presented with two important limitations solved in our derivation:

It is assumed that the derivatives terminal payoff as a function of the underlying asset is twice differentiable everywhere, substantially reducing the number of real life derivatives to which the formula can be applied. It is also assumed that the asset values state space is continuous.

The formula is derived solely in a single asset, two period setting and thus merely presents variations around Arrow-Debreu.

2 General Notations and Definitions

We suppose we are in an m+1 assets economy, with n+1 trading periods $t_0 \leq t_{i-1} < t_i \ldots \leq t_n$ chosen as seen appropriate. $S_e$ taken by convention to be $S_0$ is the base currency asset and thus merely represents the unit of cash in the reference currency and $S^1, \ldots, S^m$ are risky underlyings whose values in units of $S_0$ vary across time; so, the default unit of any given number or quantity is $S_0$ and when there is no ambiguity, $S_0$ is simply one.

$E_{0,n}$ represents the m+1 underlyings economy between $t_0$ and $t_n$. $e_{0,n}$ represents an exchange system of contracts whose values is dependent on the realization of the m+1 underlyings of economy $E_{0,n}$ between $t_0$ and $t_n$. $S_j^i$ refers to the value of the underlying $S^i$ at time $t_j$. $\tilde{S}_j^i$ refers to the realized value of the underlying $S_j^i$ at time $t_j$ as opposed to the abstract reference to the parameter value symbolized by $S_j^i$.

$F_j^i$ is an arbitrarily chosen value of the underlying $S^i$ at time $t_j$. In general for the developments to be made here, this value will tend to be the forward value for the maturity $t_j$ at time $t_{j-1}$, or the value of $S_{j-1}^i$.

$$S = (S_j^i)_{\substack{1 \leq i \leq m \\ 1 \leq j \leq n}}$$

$$\tilde{S} = (\tilde{S}_j^i)_{\substack{1 \leq i \leq m \\ 1 \leq j \leq n}}$$

$$F = (F_j^i)_{\substack{1 \leq i < m \\ 1 \leq j < n}}$$

$$\tilde{S}_j = (\tilde{S}_j^i)_{1 \leq i < m}$$

$$F_j = (F_j^i)_{1 \leq i < m}$$

$X^+$ is the maximum of the real value X and zero, or Max(X, 0). If $f$ is a function defined on $|a, b|$, then the real quantities noted as $$\int_a^b f(x)dx \text{ and } \frac{\partial f}{\partial x}(x_i)$$

are subordinated to the definition of a finite set $I_x = x_0 = a < x_1 << x_s = b$ so that $$\int_a^b f(x)dx$$

is by definition equal to:

$$\sum_{i=0}^{s-1} f(x_i) \times (x_{i+1} - x_i) \text{ and } \frac{\partial f}{\partial x}(x_i)$$

is by definition equal to $$\frac{f(x_{i+1}) - f(x_i)}{x_{i+1} - x_i};$$

s may be equal to the infinity and will be truncated to a finite number only upon proof that the remaining terms are negligible within the approximation bounds sought. In general for the developments to be made here, Ix will tend to represent the actual range of values an underlying can take or any bijective transformation of this range. Since increments of an underlying value for all types of underlyings to be considered are discrete (that is there is a minimum increment value called the basis point), the cardinal of $I_x$ is always finite or denumerable;

$$\int_a^b f(x) dx$$

may also be formally noted as $$\int_a^b f(x) dx \bigg|_{I_x} \cdot \frac{\partial f}{\partial x}(x_i)$$

may also be formally noted as $$\frac{\partial f}{\partial x}(x_i) \bigg|_{I_x}$$

For any $x \in I_x$, there exists a $j \leq n$

Multiple derivations or integration signs for functions of several variables simply mean that the operation is iterated on the specified variable in the integration or derivation symbols.

$$\int_{a^k}^{b^k} \cdots \int_{a^1}^{b^1} f(x^1, \ldots, x^k) dx^1 dx^k$$

may also be formally noted as $$\int_{a^k}^{b^k} \cdots \int_{a^1}^{b^1} f(x^1, \ldots, x^k) dx^1 \ldots dx^k \bigg|_{I_{x^1}, \ldots, I_{x^k}}.$$

$$\frac{\partial^p f}{\partial x^p \ldots \partial x^1}(x_{i_1}^1, \ldots, x_{i_p}^p)$$

may also be formally noted as $$\frac{\partial^p f}{\partial x^p \ldots \partial x^1}(x_{i_1}^1, \ldots, x_{i_p}^p) \bigg|_{I_{x^1}, \ldots, I_{x^p}}.$$

The indication $I_{x^1}, \ldots, I_{x^p}$ on the integral may be omitted when the subordinated intervals partition is evident in the context or irrelevant. If x element of $I_x$ is equal to $x_j$, then $x_+$ is by definition $x_{j+1}$, $x_{++}$ is by definition $x_{j+2}$ and $x_-$ is by definition $x_{j-1}$. If j=s, $x_+$ is by definition $x_j$, $x_{++}$ is by definition $x_j$; if j=0 $x_-$ is by definition $x_j$.

If p is a real, sign(p)=+ if p>0, sign(p)=− if p<0, sign(p)= (void), if p=0. The convention $x_{sign(p)}$ is used in the result presented below. ≡ between two quantities identifies an equality between the two quantities which is true by definition. For any set A included in a larger set X, for any $x \in X$, we define the function $1_A$ as $1_A(x)=1$ if $x \in A$, $1_A(x)=0$ if not. If A is defined by a Boolean condition, A in $1_A$ may be replaced by that condition.

The key to the solutions described in the present invention as will be further detailed below is the introduction of functions of real numbers rather than just real numbers in expressing payment terms in premiums of contracts in a way that has practical meaning.

3 Basis Securities Definition and Notations

In order to make the definition more accessible we stress characteristic features of the Basis instruments as used in a preferred embodiment of the present invention and the rationale for those features;
(1) A Basis instrument Contract (BIC) is a contract and involves and identifies two parties named buyer β and seller Ω
(2) The definition of each contract comprises three dates:
The contract agreement date $t_0$, which is the date at which the binding rights and obligations on both sides of the contract are agreed upon.
The premium payment date $t_i$, with $t_i \geq t_0$, which is the date at which the party identified in the contract as the buyer β complies with its part of the agreement by paying the seller Ω an amount in units of basis currency known as the premium of the contract.
The contract expiry date also known as maturity $t_j$, with $t_j > t_i$, which is the date at which the party identified in the contract as the seller Ω complies with its part of the agreement by paying the buyer β an amount in units of basis currency defined as one of the generic form further detailed below.

This facilitates the formation of BICs between trading parties and can be implemented in a system or computer program product.

Definition 1

A basis instrument $\overline{B}_{t_0,t_i,t_j}^c(\beta, \Omega, N, (i_1, \ldots, i_k), (\delta_1, \ldots, \delta_k), (K_1, \ldots, K_k), (j_1, \ldots, j_p))$ is a security contract entered into at time $t_0$ between a buyer β and a seller Ω stipulating that:
At time $t_i$, β shall pay Ω a premium payment amount such as, $$\overline{B}_{t_0,t_i,t_j}^c(\beta, \Omega, N, (i_1, \ldots, i_k), (\delta_1, \ldots, \delta_k), (K_1, \ldots, K_k),$$
$$(j_1, \ldots, j_p))(S_1; \ldots, S_{t_i})S_{t_i}^\beta \equiv N(S_1; \ldots, S_{t_i}) \overset{\varphi}{\otimes} B_{t_0,t_i,t_j}^c((i_1, \ldots, i_k),$$
$$(\delta_1, \ldots, \delta_k), (K_1, \ldots, K_k), (j_1, \ldots, j_p))(S_1; \ldots, S_{t_i})S_{t_i}^\beta$$

units of underlying currency $S^c$.
At time $t_j$, Ω shall pay β a payout payment amount such as, $$N(S_{t_i}^{i1}, \ldots, S_{t_i}^{ik}, \ldots, S_{t_j}^{i1}, \ldots, S_{t_j}^{ik})(\delta_1(S_{t_j}^{i1} - K_1))^+ \cdots$$
$$(\delta_k(S_{t_j}^{ik} - K_k)))^+ S_{t_j}^{j1} \ldots S_{t_j}^{jp} S_{t_j}^{jd}$$

units of underlying currency $S^c$ And where φ, called the scaling density function is an application such that:

$$\overline{B}^c_{t_0,t_i,t_j}(\beta, \Omega, N, (i_1, \ldots, i_k), (\delta_1, \ldots, \delta_k), (K_1, \ldots, K_k),$$

$$(j_1, \ldots, j_p))(S_1; \ldots, S_{t_i}) \equiv N(S_{t_1}; \ldots, S_{t_i}) \overset{\varphi}{\otimes} B^c_{t_0,t_i,t_j}((i_1, \ldots, i_k),$$

$$(\delta_1, \ldots, \delta_k), (K_1, \ldots, K_k), (j_1, \ldots, j_p))(S_1; \ldots, S_{t_i})S^\beta_{t_i} =$$

$$\int_{N_0^{B^c_{t_0,t_i,t_j}((i_1,\ldots,i_k),(\delta_1,\ldots,\delta_k),(K_1,\ldots,K_k))}}^{B^c_{t_0,t_i,t_j}((i_1,\ldots,i_k),(\delta_1,\ldots,\delta_k),(K_1,\ldots,K_k)) + N(S_{t_1};\ldots,S_{t_i})} \varphi(n)$$

$$dn \times B^c_{t_0,t_i,t_j}((i_1, \ldots, i_k),$$

$$(\delta_1, \ldots, \delta_k), (K_1, \ldots, K_k), (j_1, \ldots, j_p))(S_1; \ldots, S_{t_i})S^\beta_{t_i}$$

Where $$N_0^{B^c_{t_0,t_i,t_j}((i_1,\ldots,i_k),(\delta_1,\ldots,\delta_k),(K_1,\ldots,K_k))}$$

is the inventory of the of the counterparty selling $\overline{B}_{t_0,t_i,t_j}^c(\beta, \Omega, N, (i_1, \ldots, i_k), (\delta_1, \ldots, \delta_k), (K_1, \ldots, K_k), (j_1, \ldots, j_p))$ prior to the said transaction.

$$B^c_{t_0,t_i,t_j}((i_1, \ldots, i_k), (\delta_1, \ldots, \delta_k), (K_1, \ldots, K_k),$$

$$(j_1, \ldots, j_p))(S_1; \ldots, S_{t_i}) = 1 \overset{\varphi}{\otimes} B^c_{t_0,t_i,t_j}((i_1, \ldots, i_k),$$

$$(\delta_1, \ldots, \delta_k), (K_1, \ldots, K_k), (j_1, \ldots, j_p))(S_1; \ldots, S_{t_i})$$

The set of Basis Instrument Contracts is called a BIC-Basis.

When the payout payment amount is in the format $$N(S_{t_1}^{i_1}, \ldots, S_{t_1}^{i_k}, \ldots, S_{t_i}^{i_1}, \ldots, S_{t_i}^{i_k})(\delta_1(S_{t_j}^{i_1} - K_1))^+ \cdots \\ \otimes_k (S_{t_j}^{i_k} - K_k)))^+ S_{t_j}^{j_1} \ldots S_{t_j}^{j_p} S_{t_i}^{\beta},$$

then we term it an Extended Option Format Basis Instrument Contract Payout or EOFBICP. It naturally imply the premium payout format $$\overline{B}^c_{t_0,t_i,t_j}(\beta, \Omega, N, (i_1, \ldots, i_k), (\delta_1, \ldots, \delta_k), (K_1, \ldots, K_k),$$

$$(j_1, \ldots, j_p))(S_1; \ldots, S_{t_i})S^\beta_{t_i} \equiv N(S_1; \ldots, S_{t_i}) \overset{\varphi}{\otimes} B^c_{t_0,t_i,t_j}((i_1, \ldots, i_k),$$

$$(\delta_1, \ldots, \delta_k), (K_1, \ldots, K_k), (j_1, \ldots, j_p))(S_1; \ldots, S_{t_i})S^\beta_{t_i}$$

The EOFBICP is used here to facilitate teaching of the present invention. Other payout formats can be used to create a BIC-Basis. Such format may include Extended Arrow-Debreu Format Basis Instrument Contract Payout or EADF-BICP, the Extended Fourier Transform Format Basis Instrument Contract Payout or EFTFBICP, the Extended Hermite Polynomial Format Basis Instrument Contract Payout or EHPFBICP. All those format are equivalent and from a complete set of one kind, a complete set of the other kind can be obtained through a linear transformation. In a preferred embodiment of the present invention a few examples of the linear transformation are disclosed in a matricidal form.

The scaling density function translates how the offer and demand for each basis instrument in turn affects the level of prices. This phenomenon is also known in securities markets as slippage. For $0 < p < k+1$, $K_p$ is a priori a function of $(S_{t_1}; \ldots, S_{t_i})$.

$N(S_{t_1}; \ldots, S_{t_i})$ is called the notional of the contract.

$$N(S_{t_1}; \ldots, S_{t_i}) \overset{\varphi}{\otimes} B^c_{t_0,t_i,t_j}((i_1, \ldots, i_k),$$

$$(\delta_1, \ldots, \delta_k), (K_1, \ldots, K_k), (j_1, \ldots, j_p))(S_1; \ldots, S_{t_i})S^\beta_{t_i}$$

is the premium or price of the contract.

k is the order of the basis instrument. When k=0, the basis instrument is simply noted as $\tilde{B}_{t_0,t_i,t_j}^c(N)$ and when in addition, $$\phi(B_{t_0,t_i,t_j}((i_1, \ldots, i_k),(\delta_1, \ldots, \delta_k),(K_1, \ldots, K_k), \\ (j_1, \ldots, j_p)))(N(S_1; \ldots, S_{t_i}))=N(S_1, \ldots, S_{t_i}) \\ B_{t_0,t_i,t_j}^c((i_1, \ldots, i_k),(\delta_1, \ldots, \delta_k),(K_1, \ldots, K_k), \\ (j_1, \ldots, j_p))(S_1; \ldots, S_{t_i}),$$

the basis instrument is simply noted as $B_{t_0,t_i,t_j}^c$.

When the basis instrument price at $t_j$ does not depend on $(S_1; \ldots, S_{t_i})$ as is the case for zeroth order basis instruments, the notation of the price is the same as that of the basis instrument contract.

In current markets, for most market makers, φ is a stepwise increasing function, −φ(−N)−φ(N)>0 and is called the bid/offer spread. For practical implementation purposes, in a preferred embodiment of the present invention, may be defined and input in an implicit or explicit manner. Examples of an implied input or definition are provided further below.

Recent patents have addressed the problem of financial market liquidity in the context of an electronic order-matching systems. Patents relating to derivatives, such as U.S. Pat. No. 4,903,201, disclose an electronic adaptation of current open-outcry or order matching exchanges for the trading of futures is disclosed. Another patent, U.S. Pat. No. 5,806,048, relates to the creation of open-end mutual fund derivative securities to provide enhanced liquidity and improved availability of information affecting pricing. This patent, however, does not contemplate an electronic derivatives exchange which requires the traditional hedging or replicating portfolio approach to synthesizing the financial derivatives. Similarly, U.S. Pat. No. 5,794,207 proposes an electronic means of matching buyers' bids and sellers' offers, but outside the scope of an electronic derivatives exchange which requires the traditional hedging or replicating portfolio approach and without explaining the nature of the economic price equilibria achieved through such a market process.

U.S. Pat. No. 5,845,266 and U.S. Pat. No. 6,098,051 implement order-matching and limit order book algorithms, which can be and are effectively employed in traditional "brick and mortar" exchanges. Their electronic implementation, however, primarily serves to save on transportation and telecommunication charges. No fundamental change is contemplated to market structure for which an electronic network may be essential. Second, the disclosed techniques appear to enhance liquidity at the expense of placing large informational burdens on the traders (by soliciting preferences, for example, over an entire price-quantity demand curve) and by introducing uncertainty as to the exact price at which a trade has been transacted or is "filled." On the contrary, a preferred embodiment of the present invention is to provide through the scaling density functions a functional format that reduces the size of the data to be supplied to the system and in effect eliminates the need for a trader to continually update their bids and/or offer responsive to demand. In fact, once the scaling density function has been provided for all basis instruments contracts, there is no need for further trader intervention and the trader or market maker knows very precisely for each quantity transacted at which price the transaction concluded.

What is different between this type of contract and other types of derivatives contracts is the functional nature of the premium as expressed in the definition of the contract and the introduction of the date $t_i$ as separate and posterior to $t_0$. While it is true that in most OTC contracts there is a contract date and a settlement date different from the contract date, the difference – with assuming as is done for modeling purposes that the contract date and the premium payment date are the same, is minimal and it is straightforward to make the adjustment. So, each of the dates $t_i$ and $t_j$ may actually be coupled settlement dates a few days later.

The premium is expressed as a function of the values of the fluctuating variables between time $t_0$ and time $t_i$. Enabling this extension is what makes possible the most critical sections of this invention. Moreover, the payment at time $t_j$ is expressed as units of a specific basis set of functions of the fluctuating variables at time $t_j$ with scaling units being functions of the fluctuating variables between time $t_0$ and time $t_i$. The choice of the specific functions is made so that the selected basis set is a mathematical basis of the vectorial space of functions of the fluctuating variables at time $t_j$ with the scalar units belonging to the set of values (i.e.) taken by functions of the fluctuating variables between time $t_0$ and time $t_i$. Since in a vectorial space all bases are equivalent, once one has been selected, any other basis would be equivalent to that one. As a result the claimed scope of the invention is not intended to be limited to the specific choice made herein for illustrative purposes, but rather to encompass its possible equivalent. In the specific case of the illustrative definition above, the basis is selected to be as "close" as possible to known instruments actually traded in the markets, that is bonds, forwards/futures and European vanilla calls or puts. The notion of "close" is meant in particular in the sense that if the scalar set becomes the field of real numbers, as happens at $t_i$, then we would recover classical bonds, forwards/futures and European vanilla calls or puts. When $t_j-t_i=1$ day, we would have the known overnight options, and overnight repos commonly traded in OTC markets. In doing this, we express preference for hedging purposes, over alternative existing approaches where the basis is selected to be hilbertian with respect to a defined scalar product, and merely has computational appeal for pricing purposes.

The functional nature of the premium and the scaling units is essential for the derivation of the decomposition formula from which the basis instruments derive their usefulness as hedging instruments.

3.1 Methods of Supplying BICs

As seen above there are various ways of supplying BICs depending on the structure of data available or computational consideration made, one might prefer one over the other. We show here an example of how to move between EOFBICP format, EADBICP format or EFTFBICP format.

3.1.1 Correspondence Between EOFBICP Format and EADBICP Format

We have the following result, establishing the correspondence between basis instruments prices and unit underlying-conditional probabilities that extend and generalize the Breeden-Litzenberger formula ([10]) in a multi-periods, multi-underlyings setting:

$$Prob(S_i = K_i / S_{i-1}; \ldots ; S_0) = \qquad (16)$$

$$\frac{\prod_{j=1}^{m}(K_{i_p}^p - K_{i_p-1}^p)}{N \overset{\varphi}{\otimes} B_{t_0,t_{i-1},t_i}^0} \partial_{K^1}^2 \cdots \partial_{K^m}^2 N \overset{\varphi}{\otimes} B_{t_0,t_{i-1},t_i}^0 ((1, \ldots, m),$$

$$(\delta_i^1, \ldots, \delta_i^m), (K_{i_1-1}^1, \ldots, K_{i_m-1}^m))(S_1; \cdots ; S_{i-1})$$

This formula shows that with the price of basis instruments non-necessarily linearly dependent on the notional, the conditional probabilities are also dependent on the on the notional amount.

In a discrete environment we further obtain matricial relationships. We show here how to transform conditional Arrow-Debreu state-prices into Basis instruments prices & recovering Arrow-Debreu state-prices from Basis instruments prices.

We define the conditional basis instruments prices vectore as $B_{t_{i-1},t_i}$ and the conditional state-price vector as $Pa_{t_{i-1},t_i}$:

$$B_{t_{i-1},t_i} = \begin{bmatrix} B_{t_{i-1},t_i}^0 \\ B_{t_{i-1},t_i}^0(1, h-1) \\ \vdots \\ B_{t_{i-1},t_i}^0(1, 1) \\ B_{t_{i-1},t_i}^0(-1, 0) \\ \vdots \\ B_{t_{i-1},t_i}^0(-1, l+1) \\ B_{t_{i-1},t_i}^1 \end{bmatrix} \quad Pa_{t_{i-1},t_i} = \begin{bmatrix} Pa_{t_{i-1},t_i}^0(h) \\ Pa_{t_{i-1},t_i}^0(h-1) \\ \vdots \\ Pa_{t_{i-1},t_i}^0(1) \\ Pa_{t_{i-1},t_i}^0(0) \\ \vdots \\ Pa_{t_{i-1},t_i}^0(l-1) \\ Pa_{t_{i-1},t_i}^0(l) \end{bmatrix}$$

For $k \geq h$, $B_{t_{i-1},t_i}^0(1, k) = 0$ and for $k > h$, $Pa_{t_{i-1},t_i}^0(1, k) = 0$;

For $k \leq l$, $B_{t_{i-1},t_i}^0(1, k) = 0$ and for $k < h$, $Pa_{t_{i-1},t_i}^0(1, k) = 0$;

Proposition

We have the matricial products:

$$B_{t_{i-1},t_i} = T_{t_{i-1},t_i} Pa_{t_{i-1},t_i} \text{ and } Pa_{t_{i-1},t_i}^= T_{t_{i-1},t_i}^{-1} B_{t_{i-1},t_i}$$

with:

$$T_{t_{i-1},t_i}(h, j) = 1; \; T_{t_{i-1},t_i}(l, k) = x_{t_{i-1},t_i}(j);$$

$$T_{t_{i-1},t_i}(k, j) = (x_{t_{i-1},t_i}(j) - x_{t_{i-1},t_i}(k))1_{\{j>k\}}1_{\{k<h\}}1_{\{0<k\}} +$$

$$(x_{t_{i-1},t_i}(k) - x_{t_{i-1},t_i}(j))1_{\{k>j\}}1_{\{l<k\}}1_{\{k\leq 0\}};$$

$$T_{t_{i-1},t_i}^{-1}(l, j) = \frac{\delta_j^{l+1}}{x_{t_{i-1},t_i}(l+1) - x_{t_{i-1},t_i}(l)};$$

$$T_{t_{i-1},t_i}^{-1}(l+1, j) = \frac{\delta_j^{l+2}}{x_{t_{i-1},t_i}(l+2) - x_{t_{i-1},t_i}(l+1)} -$$

$$\frac{1}{x_{t_{i-1},t_i}(l+1) - x_{t_{i-1},t_i}(l)} + \frac{\delta_j^{l+1}}{x_{t_{i-1},t_i}(l+2) - x_{t_{i-1},t_i}(l+1)};$$

for all $l + 1 < k < 0; \; 1 < k < h - 1$ $$T_{t_{i-1},t_i}^{-1}(k, j) = \frac{\delta_j^{k+1}}{x_{t_{i-1},t_i}(k+1) - x_{t_{i-1},t_i}(k)} - \frac{1}{x_{t_{i-1},t_i}(k) - x_{t_{i-1},t_i}(k-1)} +$$

$$\frac{\delta_j^k}{x_{t_{i-1},t_i}(k+1) - x_{t_{i-1},t_i}(k)} + \frac{\delta_j^{k-1}}{x_{t_{i-1},t_i}(k) - x_{t_{i-1},t_i}(k-1)};$$

-continued $$T^{-1}_{t_{i-1},t_i}(0, j) = \frac{x_{t_{i-1},t_i}(1)\delta_j^h}{x_{t_{i-1},t_i}(1) - x_{t_{i-1},t_i}(0)} + \frac{\delta_j^1}{x_{t_{i-1},t_i}(1) - x_{t_{i-1},t_i}(0)} -$$
$$\frac{1}{x_{t_{i-1},t_i}(0) - x_{t_{i-1},t_i}(-1)} + \frac{\delta_j^0}{x_{t_{i-1},t_i}(1) - x_{t_{i-1},t_i}(0)} +$$
$$\frac{\delta_j^{-1}}{x_{t_{i-1},t_i}(0) - x_{t_{i-1},t_i}(-1)} - \frac{\delta_j^1}{x_{t_{i-1},t_i}(1) - x_{t_{i-1},t_i}(0)};$$

$$T^{-1}_{t_{i-1},t_i}(1, j) = -\frac{x_{t_{i-1},t_i}(0)\delta_j^h}{x_{t_{i-1},t_i}(1) - x_{t_{i-1},t_i}(0)} + \frac{\delta_j^2}{x_{t_{i-1},t_i}(2) - x_{t_{i-1},t_i}(1)} -$$
$$\frac{1}{x_{t_{i-1},t_i}(1) - x_{t_{i-1},t_i}(0)} + \frac{\delta_j^1}{x_{t_{i-1},t_i}(2) - x_{t_{i-1},t_i}(1)} +$$
$$\frac{\delta_j^0}{x_{t_{i-1},t_i}(1) - x_{t_{i-1},t_i}(0)} + \frac{\delta_j^1}{x_{t_{i-1},t_i}(1) - x_{t_{i-1},t_i}(0)};$$

$$T^{-1}_{t_{i-1},t_i}(h-1, j) = -\frac{1}{x_{t_{i-1},t_i}(h-1) - x_{t_{i-1},t_i}(h-2)} +$$
$$\frac{\delta_j^{h-1}}{x_{t_{i-1},t_i}(h) - x_{t_{i-1},t_i}(h-1)} + \frac{\delta_j^{h-2}}{x_{t_{i-1},t_i}(h-1) - x_{t_{i-1},t_i}(h-2)};$$

$$T^{-1}_{t_{i-1},t_i}(h, j) = \frac{\delta_j^{h-1}}{x_{t_{i-1},t_i}(h) - x_{t_{i-1},t_i}(h-1)};$$

with $\delta_m^n = 1$ if n=m and $\delta_m^n = 0$ for any other value of n.

Multi-Dimensional Case

We indice T and its inverse to the basis instruments considered and apply it m times to obtain the basis instruments or the states prices of the desired dimension. The components of B and Pa in the representation above are m−1 dimensional matrices.

Writing the compression algorithm:

To obtain $P_i(n-1)$, a simple transform may help by decomposing in the basis instruments and treating the case of moments or baskets separately.

After that, based on the assumption that the $P_i(i)$ may be analytic in the dependent variables, make polynomial interpolation by arcs and selecting the next points based on a condition being met (for examples on the derivatives at the previous point).

3.1.2 Correspondence Between EOFBICP Format and EADBICP Format

Let's set $(\Omega, F, p)$ the probability space.

$$\Omega_n = \{S_0, S_1, \ldots, S_{n-1}\}$$

Let's call X the random variable with values in P. The characteristic function of X is defined as:

$$\Phi_X(z) = E(e^{izX})$$

Let's obtain all the state probabilities form the determination of $\Phi_X$. To do that, we simple assign to z, iteratively the values $0, 2\pi, \ldots, 2(n-1)\pi$ an we obtain:

$$\Phi_X(0) = 1 = E(1) = p_0 + p_1 + \ldots + p_{n-1}$$
$$\Phi_X(2\pi) = E(e^{2i\pi X}) = p_0 e^{2i\pi S_0} + p_1 e^{2i\pi S_1} + \ldots + p_{n-1} e^{2i\pi S_{n-1}}$$
$$\ldots$$
$$\Phi_X(2(n-1)\pi) =$$
$$E(e^{2i\pi(n-1)X}) = p_0 e^{2i\pi(n-1)S_0} + p_1 e^{2i\pi(n-1)S_1} + \ldots + p_{n-1} e^{2i\pi(n-1)S_{n-1}}$$

This is:

$$\begin{pmatrix} 1 \\ E(e^{2i\pi X}) \\ \ldots \\ E(e^{2i\pi(n-1)X}) \end{pmatrix} = \begin{pmatrix} 1 & \ldots & 1 \\ e^{2i\pi S_0} & \ldots & e^{2i\pi S_{n-1}} \\ (e^{2i\pi S_0})^{n-1} & \ldots & (e^{2i\pi S_{n-1}})^{n-1} \end{pmatrix} \begin{pmatrix} p_0 \\ p_1 \\ p_{n-1} \end{pmatrix}$$

Where we can note:

$$\underline{EX} = M\underline{P} \qquad (17)$$

And we can recognize in M a Vandermonde Matrix. For a matrix M, we note $M_{ij}$ its coefficient of line u and row v, so we have here: $M_{uv} = e^{2i\pi(u-1)S_{v-1}}$.

As we note $M^{-1}$ the inverse of M, we want to obtain $M^{-1}$ so:

$$\underline{P} = M^{-1}\underline{EX}$$

A simple method of solution of (17) is closely related to Lagrange's polynomial interpolation formula.

Let $P_v(x)$, $v \in [0, n-1]$, be the polynomial of degree n−1 defined by:

$$P_v(x) = \prod_{u=0, u \neq v}^{n-1} \frac{x - e^{2i\pi S_u}}{e^{2i\pi S_v} - e^{2i\pi S_u}} = \sum_{k=1}^{n} A_{v+1,k} x^{k-1}$$

We can define with the coefficients of the interpolation $A_{mk}$, $k \in [1, n]$, $m \in [1, n]$ a square matrix A of dimension n.

We have $$P_v(e^{2i\pi S_u}) = \delta_{uv} = \sum_{k=1}^{n} A_{v+1,k} e^{2i\pi S_u(k-1)} = \sum_{k=1}^{n} A_{v+1,k} M_{k,u+1}$$

for u and v in $[0, n-1]$. Since $\delta_{uv} = \delta_{u+1,v+1}$ we can replace u+1 and v+1 by u and v in $[1, n]$:

$$\sum_{k=1}^{n} A_{v,k} M_{k,u} = \delta_{uv}$$

This says exactly that $A = M^{-1}$. Therefore, the solution of (17) is just $\underline{P} = A\underline{EX}$ so we have:

$$p_v = \sum_{k=1}^{n} A_{vk} E(e^{2i\pi(k-1)X})$$

Application to Numerical Computation

A simple algorithm to solve the problem is given in [31]:

```
for k=0:n-2
   for u=n-1:k+1
      p(u)=p(u)-exp(2i\pi S[u-1]).p(u-1)
   end
end
for k=n-2:0
   for u=k+1:n-1
      p(u)=p(u)/(exp(2i\pi S[u-1])-exp(S[u-k-2]) )
   end
   for u=k:n-2
      p(u)=p(u)p-p(n+1)
   end
end
```

This algortithms requires $5n^2/2$ flops. An implementation of the algorithm that yields P can be found in Mathematical recipes in C, Second Edition [55]:

```
#include "nrutil.h"
void vander(double M[ ], double p[ ], double EX[ ], int n)
Solves the Vandermonde linear system. Input consists of
the vectors M[1..n] and EX[1..n]; the vector p[1..n] is output.
{
   int i,j,k;
   double b,s,t,xx;
   double *c;
   c=dvector(1,n);
   if (n == 1) p[1]=EX[1];
   else {
      for (i=1;i<=n;i++) c[i]=0.0;       Initialize array.
      c[n] = -M[1];                       Coefficiencts of the master poly-
      for (i=2;i<=n;i++) {                nominal are found by recursion.
         xx = -x[i];
         for (j=(n+1-i);j<=(n-1);j++) c[j] += xx*c[j+1];
         c[n] += xx;
      }
      for (i=1;i<=n;i++) {                Each subfactor in turn
         xx=M[i];
         t=b=1.0;
         s=EX[n];
         for (k=n;k>=2;k--) {             is synthetically divided,
            b=c[k]+xx*b;
            s += EX[k-1]*b;               matrix-multiplied by the right-
            t=xx*t+b;                     hand side,
         }
         p[i]=s/t;                        and supplied with a denominator.
      }
   }
   free_dvector(c,1,n);
}
{
   int n;                                 dimension of the matrix
   double* M,EX,p;
   M=dvector(1,n);                        coefficient of the Vandermonde
   EX=dvector(1,n);                       Matrix input of Laplace values
   for (int u=1;u<=n;u++){
      M[u]=exp(2i\pi S[u-1]);
      EX[u]=ValueOf E[exp(2i\pi (u-1)X];
      p[u]=0.0;
   }
   vander(M,EX,p.n);                      computation of the probabilities.
```

Regular Space Distribution of States

If we suppose that the $S_k$ are regular distributed, for example: $S_k = S_0 + k\Delta$. We have for the coefficient of our Vandermonde matrix:

$$M_{uv} = e^{2i\pi(u-1)S_{v-1}} = e^{2i\pi(u-1)S_0} e^{2i\pi(u-1)(v-1)\Delta}$$

If we define $D = \text{diag}(1, e^{2i\pi S_0}, \ldots, e^{2i\pi(n-1)S_0})$ so that $D_{uv} = \delta_{uv} p^{(u-1)S_0}$. And let's have the square matrix W defined by $W_{uv} = \omega^{(u-1)(v-1)}$ with $\omega = e^{2i\pi\Delta}$. We have:

$$W = \begin{pmatrix} 1 & \ldots & 1 & \ldots & 1 \\ \ldots & & \ldots & & \ldots \\ 1 & \ldots & \omega^{(u-1)(v-1)} & \ldots & \omega^{(u-1)(n-1)} \\ \ldots & & \ldots & & \ldots \\ 1 & \ldots & \omega^{(n-1)(v-1)} & \ldots & \omega^{(n-1)(n-1)} \end{pmatrix}$$

The u-th row and v-th column term of the product of D and W is given by:

$$(DW)_{uv} = \sum_{k=1}^{n} D_{uk} W_{kv} = e^{2i\pi(u-1)S_0} \omega^{(u-1)(v-1)} = M_{uv}$$

So we have M=DW. If we take further the unit step $\Delta$ as $$\Delta = \frac{1}{n}$$

so that $\omega$ is a n-root of unity let's note $\overline{W}$ its conjugate. Let's compute the term $(W\overline{W})_{uv}$ of row u and column v of the product of these two matrix:

$$(W\overline{W})_{uv} = \sum_{k=1}^{n} W_{uk} \overline{W}_{kv}$$

$$= \sum_{k=1}^{n} \omega^{(u-1)(v-1)} \overline{\omega}^{(k-1)(v-1)}$$

$$= \sum_{k=1}^{n} \omega^{(u-1)(k-1)} \omega^{-(k-1)(v-1)} \text{ as } \overline{\omega} = 1/\omega$$

$$= \sum_{k=1}^{n} \omega^{(u-v)(k-1)}$$

$$= \sum_{k=1}^{n} (\omega^{u-v})^{k-1}$$

$$= \begin{cases} n & \text{if } u = v \\ \frac{1-(\omega^{u-v})^n}{1-\omega^{u-v}} = 0 & \text{if } u \neq v \text{ as } (\omega^{u-v})^n = (\omega^n)^{u-v} = 1 \end{cases}$$

$$= \delta_{uv} n$$

And we obtaine o:

$$W\overline{W} = n\text{Id} \text{ and } W^{-1} = \frac{1}{n}\overline{W}$$

So:

$$M^{-1} = \frac{1}{n} \overline{W} D^{-1}$$

with $D^{-1} = \text{diag}(1, e^{-2i\pi S_0}, \ldots, e^{-2i\pi(n-1)S_0})$.

That gives a way to compute the state-prices $p_0, \ldots p_{n-1}$ in only $n^2$ operation. But we can see that the matrix $M^{-1}$ that is obtained is the matrix of the Fourier Transform of order n that means that using a Fast Fourier Transform Algorithm, we can compute the product:

$$\underline{P} = M^{-1}\Phi = \frac{1}{n}\overline{W}(D^{-1}\Phi)$$

in only O(n log(n)) operations.

If we have a distribution of $S_k$ non-regurlarly spaced where we write $\Delta_k = S_k - S_0$ but that verify the following property:

$$\forall k \in [0, n-1], \Delta_k \in \mathbb{Q}$$

Let's set $D_k \in \mathbb{Q}$ and $N_k \in \mathbb{N}$ such as $$\Delta_k = \frac{D_k}{N_k}.$$

Let's set $N = \text{lcm}_{k \in [0,n-1]}(N_k)$ where lcm is the least common multiple.

Then we can introduce a regular division $(\tilde{S}_k)_{k \in [0,N-1]}$ that fits all the states $S_k$ and we can apply the previous result as we know how to compute the missing values of the characteristic function at any point.

3.2 Incorporation of Offer and Demand Sensitivities in the Pricing, Risk Management and Trading of Derivatives Contracts A preferred embodiment of the present invention solves one issue that must be addressed in the determination of basis instruments price. The problem is that basis instruments prices fluctuations in response to offer and demand sensitivities must be such that no arbitrage opportunity is created. This is tested by making sure that state prices are positive and the sum of implied probabilities of all states is one.

Although in the definition above the sealing density function is defined in an explicit form, in many practical applications, to take into account the non arbitrage requirement the scaling density function will be formulated in an implied manner. It is an embodiment of the present invention to achieve this by introducing what we define below as weighting functions Implied Definition: Weighting Functions Definitions Let's define a discrete probability space $E = (\Omega, B, P)$ with $\Omega = 1, n$; we define a weighting function defined on $\Omega \times \mathfrak{R}^n$ as $W(i, n_i)$ such that:

$$p_i = \frac{W(i, n_i)}{\sum_{i=1}^{n} W(i, n_i)}$$

with $W(i, n_i) \geq 0$ and $$\sum_{i=1}^{n} W(i, n_i) > 0$$

to prevent negative or infinte probabilities that would create arbitrage opportunities.

Examples of Weighting Functions

To introduce this example we first establish the following proposition:

Proposition:

We define the target probabilities $(p_i^M)_{1 \leq i \leq n}$ and the base probabilities of the market m $(p_i^M)_{1 \leq i \leq n}$ for the state space under consideration with associated notional numbers $n_i^m$ such that for each i, $$p_i^m = \frac{n_i^m}{\sum_{k=1}^{n} n_k^m};$$

There exists a sequence of numbers $w_i^m$, such that for each i, $$p_i^M = \frac{w_i^m n_i^m}{\sum_{k=1}^{n} w_k^m n_k^m};$$

and for any given value of $$\sum_{k=1}^{n} w_k^m,$$

the $w_i^m$ are uniquely determined for each i

Proof:

$$p_i^M = \frac{w_i^m n_i^m}{\sum_{k=1}^{n} w_k^m n_k^m}; \frac{p_i^M}{n_i^m} = \frac{w_i^m}{\sum_{k=1}^{n} w_k^m n_k^m}; \sum_{i=1}^{n} \frac{p_i^M}{n_i^m} = \frac{\sum_{i=1}^{n} w_i^m}{\sum_{k=1}^{n} w_k^m n_k^m}$$

$$\sum_{k=1}^{n} w_k^m n_k^m = \frac{\left(\sum_{k=1}^{n} w_k^m\right)}{\left(\sum_{i=1}^{n} \frac{p_i^M}{n_i^m}\right)}; \text{We assume for instance: } \left(\sum_{k=1}^{n} w_k^m\right) = n,$$

thus: $p_i^M = w_i^m n_i^m \dfrac{\left(\sum_{k=1}^{n} \frac{p_k^M}{n_k^m}\right)}{\left(\sum_{k=1}^{n} w_k^m\right)}$; $w_i^m = \dfrac{\frac{p_i^M}{n_i^m}}{\left(\sum_{k=1}^{n} \frac{p_k^M}{n_k^m}\right)} \left(\sum_{k=1}^{n} w_k^m\right)$ $$= \frac{\frac{p_i^M}{n_i^m}}{\left(\sum_{k=1}^{n} \frac{p_k^M}{n_k^m}\right)} n$$

Thus for example, in a market where a first set of state prices $p_i^M$ for any first unit of Arrow Debreu security is postulated, a weighting function may be defined as $$W(i, n_i) = \frac{\frac{p_i^M}{n_i^m}}{\left(\sum_{k=1}^{n} \frac{p_k^M}{n_k^m}\right)} \left(\sum_{k=1}^{n} w_k^m\right) + (n_i - 1)$$

to reflect the fact that after state prices react to state price responsive to offer and demand in a manner similar to the distribution of payouts in a parimutuel game.

In a preferred embodiment of the present invention, weighting functions may be used to simply define scaling density functions of basis instruments by first transforming the input weighting functions into conditional state-prices vector and then, using after multiplication by a matrix T, the vector of basis instruments prices responsive to inventory, offer and demand for each basis instrument.

3.3 Incorporation of Credit Risk in the Pricing, Risk Management and Trading of Derivatives Contracts Another embodiment of the present invention is its ability to include most accurately credit risk sensitivities in the pricing risk management and trading of financial derivatives.

Credit risk in this setting is the risk that a Counterparty may not honor their financial commitments in full on due date and at due time.

A counterparty to a derivatives transaction typically assumes the risk that its counterparty will go bankrupt or not be able to meet its obligations at agreed upon times during the life of the derivatives contract.

Margin requirements, credit monitoring, and other contractual devices, which may be costly, are customarily employed to manage derivatives and insurance counterparty credit risk. In contrast to U.S. Pat. No. 6,317,727 B1, US and U.S. Pat. No. 6,321,212 B1, in a preferred embodiment of the present invention, for pricing and hedging purposes, credit risk in derivatives transactions is recognized as a multiplying underlying whose value in the default free reference currency and counterparty may fluctuate between 0 and 1, this has the benefit of not only facilitating addressing the concern of other methodologies, but better still, enable derivatives trading on said credit risks.

More specifically, to take this notion into account, for each contract between two parties $\Omega$ and $\beta$, we define the stochastic variable $S_t^{\beta,\Omega} \in [0, 1]$ as the percentage of a unit notional liability of N to $\beta$ that counterparty $\Omega$ meets at time t.

In the context presented here, $S_t^{\beta,\Omega}$ can simply be viewed as a new underlying, so that a commitment of $\beta$ is accurately understood as risk free units of underlying $S_t^{\beta,\Omega}$. So, by multiplying the payoff f of any derivative contract by and by defining its scaling density function, the credit risk of the transaction is automatically included. So a market will fully price credit risk for all types of payoffs if basis instruments for all stochastic variables $S_t^{\beta,\Omega}$ trade for all $\beta$ and $\Omega$. A reduction in the number of necessary variables could be achieved by introducing a default free referential counterparty ref that would be the opposite side in all transactions; in this setting, the variables of interest would be $S_t^{\beta,ref}$, with ref fixed, or simply $S_t^\beta$, with an indexation of $\beta$ such that $\beta \in \{0, \ldots, m\}$.

$\dfrac{S_{t_{i+1}}^\beta}{S_{t_i}^\beta}$ follows a beta distribution with density $$f^{a(\beta,t_i),b(\beta,t_i)}(x) = \frac{x^{a(\beta,t_i)-1}(1-x)^{b(\beta,t_i)-1}}{\text{Beta}(a(\beta,t_i), b(\beta,t_i))},$$

$0 < x < 1$, $f^{a(\beta,t_i),b(\beta,t_i)}(x) = 0$ if $|x| \geq 1$ where $\beta$ is the classical Beta Function In a preferred embodiment of the present invention, the beta family has the additional advantage of easily computed moments so that the moment generating function of $$f^{a,b}(x) \text{ is } MGf^{a,b}(n, a, b) = \prod_{i=1}^{n-1} \frac{(a+i)}{(a+b+i)}$$

and as a result calibration of the credit risk model is facilitated on a variety of input data types.

In an embodiment of the present invention, the ratios $$\frac{S_{t_{i+1}}^\beta}{S_{t_i}^\beta}$$

may be taken to be independent from one another, the beta distribution may depend upon the realized value of other inputs, where said other inputs may include different underlyings.

In yet another embodiment of the present invention the credit risk limit of a given counterparty can inferred by setting a maximum responsive to the difference between the value of the counterparty liability not inclusive of credit risk and the value of said liability inclusive of credit risk

4 General Contracts Definitions

We define as $\Pi_{0,i,n}^c(f)$[2] a so-called derivative security representing a contract entered into at time $t_0$ and paying $f$ $(S_1^1, \ldots, S_1^m, \ldots, S_n^1, \ldots, S_n^m)$ units of underlying currency $S_c$ at time tn in exchange for the payment of a premium at time $t_i$. This more general definition includes but is not limited to the one in FAS 133 pp 3-7, paragraph 6-11 and its 10(b) amendment in FAS 138. A derivatives contract defined with its payout payment function in the $f(S_1^1, \ldots, S_1^m, \ldots, S_n^1, \ldots, S_n^m)$ format is called a Derivatives Contract Without Optional Features or DCWOF.

[2]This more general definition includes but is not limited to the one in FAS 133 pp 3-7, paragraph 6-11 and its 10(b) amendment in FAS 138.

We note: $\Pi_{0,n,n}^c(f)(S_1; \ldots; S_n) = f(S_1; \ldots; S_n)$ the price at time tn of the security contract entered into at time $t_0$ and guaranteeing receipt of $f(S_1; \ldots; S_n) = f(S_1^1, \ldots, S_1^m, \ldots, S_n^1, \ldots, S_n^m)$ units of underlying currency Sc at time tn. $\Pi_{0,n,n}^c(f)$ is the trivially associated contract.

For any $i \geq 0$, we define as $\Pi_{0,i,n}^c(f)(S_1; \ldots; S_i)$ the price at time $t_i$ of the security contract entered into at time $t_0$ and guaranteeing receipt of $f(S_1^1, \ldots, S_1^m, \ldots, S_n^1, \ldots, S_n^m)$ units of underlying currency Sc at time tn; $\Pi_{0,i,n}^c(f)$ is the associated contract.

For any $i \geq 0$, we define as $\Pi_{0,i}^c(f)(S_1; \ldots; S_i)$ the price at time $t_i$ of the security contract entered into at time $t_0$ and guaranteeing receipt of $\Pi_{0,i+1}^c(f)(S_1; \ldots; S_{i+1})$ units of underlying currency $S^c$ at time $t_{i+1}$; $\Pi_{0,i}^c(f)$ is tho associated contract.

4.1 Common Examples

A few examples show how some well-known derivative contracts are translated into this formal functional process:

Vanilla Option, $$f(S_0; \ldots ; S_n) = (\delta(S_n - K_n))^+$$

Double Barrier Option, $$f(S_0; \ldots ; S_n) = (\delta(S_n - K))^+ 1_{\{L<S_n<H\}} \times \ldots \times 1_{\{L<S_1<H\}}$$

Asian Option, $$f(S_0; \ldots ; S_n) = \left(\delta\left(\frac{1}{n}\left(\sum_{k=1}^{n} S_k\right) - K\right)\right)^+$$

Volatility Swap, $$f(S_0; \ldots ; S_n) = \sqrt{\frac{252}{n-1}\sum_{k=1}^{n}\left(\text{Log}\left[\frac{S_k}{S_{k-1}}\right] - \frac{1}{n}\left(\sum_{i=1}^{n}\text{Log}\left[\frac{S_i}{S_{i-1}}\right]\right)\right)^2} - K_\nu$$

5 Theorem of Decomposition in Basis Securities

5.1 Derivation

We have the following result further detailed in appendix and valid under the notational assumptions earlier introduced for any function g of m³:

³See demonstration in appendix

Theorem: For any function g defined on a discrete space of real numbers $I_x$, with $I_x = I_{x^1} \times \ldots \times I_{x^m}$ an m-dimensional discrete space so that $I_{x^i} = \{-\infty \leq x_{I_i}^i < \ldots < x_0^i < \ldots < x_{h_i}^i \leq +\infty\}$. With the discrete definitions of derivatives and integrals earlier introduced, the following formula holds:

$$g(x^1, \ldots, x^m) = \sum_{k=0}^{m} \sum_{\substack{0 \leq i_1 < \ldots < i_k \leq m}} \sum_{\substack{0 \leq j_1 < \ldots < j_p \leq m \\ j_l \in \{1, \ldots, m\} \setminus \{i_1, \ldots, i_k\} \\ l=1, \ldots, p}} \sum_{q=0}^{p} (-1)^{q+p}$$

$$\sum_{\substack{0 \leq k_1 < \ldots < k_q \leq m \\ k_l \in \{j_1, \ldots, j_p\} \\ l=1, \ldots, q}} x_0^{k_1} \times \ldots \times x_0^{k_q} \times$$

$$\int_{I_{x^{i_1}} \times \ldots \times I_{m^{i_k}}} \left(\text{Sgn}(t^{i_1} - x_0^{i_1})(x^{i_1} - t_+^{i_1})\right)^+ \ldots$$

$$\left(\text{Sgn}(t^{i_k} - x_0^{i_k})(x^{i_k} - t_+^{i_k})\right)^+ \frac{x^{j_1} \times \ldots \times x^{j_p}}{x^{k_1} \times \ldots \times x^{k_q}} \times$$

$$\partial_{t^{i_1}}^2 \ldots \partial_{t^{i_k}}^2 \partial_{x_0^{j_1}} \ldots \partial_{x_0^{j_p}} g(x_0^1, \ldots, t^{i_1}, \ldots, t^{i_k}, \ldots, x_0^m) dt^{i_1} \ldots dt^{i_k}$$

and with Sgn(x)=1 if x≧0 otherwise Sgn(x)=−1

Thus, replacing g by $\Pi_{0,i}^c(f)(S_0; \ldots; S_i)$ above and using our definition of basis instruments, with β being the buyer and Ω the seller, we deduce that, for i>0, $$\prod_{0,i-1}^{c} (f)(S_0; \ldots; S_{i-1}) = \quad (18)$$

$$\sum_{k=0}^{m} \sum_{\substack{0 \leq i_1 < \ldots < i_k \leq m}} \sum_{\substack{0 \leq j_1 < \ldots < j_p \leq m \\ j_l \in \{1, \ldots, m\} \setminus \{i_1, \ldots, i_k\} \\ l=1, \ldots, p}} F_{i-1}^{j_1} \times \ldots \times$$

$$F_{i-1}^{i_k} \int_0^1 \int_0^1 \sum_{\substack{k_1=-1 \\ \text{Step2}}}^{1} \sum_{\substack{k_p=-1 \\ \text{Step2}}}^{1} \sum_{\substack{h_1=-1 \\ \text{Step2}}}^{1} \sum_{\substack{h_k=-1 \\ \text{Step2}}}^{1} k_1 \times \ldots \times k_p \times$$

$$(x^{i_1} x_{-1}^{i_1})^{(h_1-1)/2} \times \ldots \times (x^{i_k} x_k^{i_k})^{(h_k-1)/2} \times \partial_{j_1} \ldots$$

$$\partial_{j_p} \partial_{i_1}^2 \ldots \partial_{i_k 1}^2 \prod_{0,i}^{c} (S_0; \ldots; S_{i-1}; (F_{i-1}^1, \ldots,$$

$$(x^{i_1})^{h_1} F_{i-1}^{i_1}, \ldots, (x^{i_k})^{h_1} F_{i-1}^{i_k}, \ldots,$$

$$F_{i-1}^m)) dx^{i_1} \ldots dx^{i_k} \overset{\varphi}{\otimes} B_{0,i-1}^c ((j_1, \ldots,$$

$$j_p, i_1, \ldots, i_k), (k_1, \ldots,$$

$$k_p, -h_1, \ldots, -h_k), (F_{i-1}^{j_1}, \ldots,$$

$$F_{i-1}^{j_p}, (x_{\text{sign}(h_1)}^{i_1})^{h_1} F_{i-1}^{i_1}, \ldots,$$

$$(x_{\text{sign}(h_k)}^{i_k})^{h_k} F_{i-1}^{i_k}))(S_0; \ldots; S_{i-1})$$

$$\prod_{0,i-1}^{c} (f)(S_0; \ldots; S_{i-1}) =$$

$$\sum_{k=0}^{m} \sum_{\substack{0 \leq i_1 < \ldots < i_k \leq m}} \sum_{\substack{0 \leq j_1 < \ldots < j_p \leq m \\ j_l \in \{1, \ldots, m\} \setminus \{i_1, \ldots, i_k\} \\ l=1, \ldots, p}} \sum_{q=0}^{p} (-1)^{q+p}$$

$$\sum_{\substack{0 \leq k_1 < \ldots < k_q \leq m \\ k_l \in \{j_1, \ldots, j_p\} \\ l=1, \ldots, q}} F_i^{k_1} \times \ldots \times F_i^{k_q} \times$$

$$\int_{I_x i_1 \times \ldots \times I_x i_k} \partial_{s_i^{i_1}}^2 \ldots$$

$$\partial_{s_i^{i_k}}^2 \partial_{s_i^{j_1}} \ldots$$

$$\partial_{s_i^{j_p}} \prod_{0,i}^{c} (S_0; \ldots; S_{i-1}; (F_i^1, \ldots, t^{i_1}, \ldots,$$

$$t_i^{i_k}, \ldots, F_i^m)) dt^{i_1} \ldots dt^{i_k} \overset{\varphi}{\otimes} B_{0,i-1}^c ((i_1, \ldots,$$

$$i_k), (\text{Sgn}(t^{i_1} - x_0^{i_1}), \ldots, \text{Sgn}(t^{i_k} - x_0^{i_k})),$$

$$(F_i^1, \ldots, t_+^{i_1}, \ldots, t_+^{i_k}, \ldots, F_i^m),$$

$$(\{j_1, \ldots, j_p\} \setminus \{k_1, \ldots, k_q\}))(S_0; \ldots; S_{i-1})$$

Proceeding recursively backwards from $\Pi_{0,i,n}^c(f)(S_1; \ldots; S_n) = f(S_1; \ldots; S_n)$, we obtain $\Pi_{0,0}^c(f)$ and can deduce that $$\prod_{0,0,n}^{c} (f)(S_1; \cdots; S_n) = \sum_{i=n-1}^{0} \prod_{0,i}^{c} (f)(S_1; \cdots; S_i)$$

The theorem of static replication of derivative securities from primitive securities thus follows as:

5.2 Theorem 1 of Decomposition (Static Replication) of Derivatives

Assuming no arbitrage opportunities[4] exist, any derivative security $\Pi_{0,i,n}{}^c(f)$ representing a contract entered into at time $t_0$ and paying $f(S_1^1, \ldots, S_1^m, \ldots, S_n^1 \ldots, S_n^m)$ at time $t_n$ for a premium paid at time $t_i$ can be decomposed as a sum of basis securities as:

[4] The equivalence between absence of arbitrage and equivalent martingale measure is not assumed in this presentation because the possible existence of slippage effects and its implications for the non linearity of trading strategies break the proof of the result as detailed in [34], [35]. As a result, the whole martingale approach is not used in this presentation.

$$\prod_{0,i,n}^c (f) = \sum_{\substack{j=n-1 \\ step-1}}^{i} \prod_{0,j}^c (f) \tag{19}$$

And we also have: $\prod_{0,i,n}^c (f)(S_0; \cdots ; S_i) = \prod_{0,i}^c (f)(S_0; \cdots ; S_i)$ With:

$$\prod_{0,j}^c (f)(S_0; \cdots ; S_j) =$$

$$\sum_{k=0}^{m} \sum_{\substack{0 \le i_1 < \ldots < i_k \le m}} \sum_{\substack{0 \le j_1 < \ldots < j_p \le m \\ j_l \in \{1, \cdots, m\} \setminus \{i_2, \ldots, i_k\} \\ l=1,\cdots,p}} \sum_{q=0}^{p} (-1)^{q+p}$$

$$\sum_{\substack{0 \le k_1 < \ldots < k_q \le m \\ k_l \in \{j_1, \ldots, j_p\} \\ l=1,\cdots,q}} F_{j+1}^{k_1} \times \cdots \times F_{j+1}^{k_q} \times \int_{I_x i_1 \times \cdots \times I_x i_k} \partial_{s_{j+1}^{i_k}}^2 \cdots$$

$$\partial_{s_{j+1}^{i_k}}^2 \partial_{s_{j+1}^{j_1}} \cdots \partial_{s_{j+1}^{j_p}} \prod_{0,j+1}^c (S_0; \cdots ; S_j; (F_{j+1}^1,$$

$$\cdots, t^{i_1}, \cdots, t^{i_k}, \cdots, F_{j+1}^m))$$

$$dt^{i_1} \cdots dt^{i_k} \overset{\varphi}{\otimes} B_{0,j}^c((i_1, \cdots, i_k)$$

$$(\text{Sgn}(t^{i_1} - x_0^{i_1}), \cdots, \text{Sgn}(t^{i_k} - x_0^{i_k})),$$

$$(F_{j+1}^1, \cdots, t_+^{i_1}, \cdots, t_+^{i_k}, \cdots, F_{j+1}^m),$$

$$(\{j_1, \ldots, j_p\} \setminus \{k_1, \ldots, k_q\}))(S_0; \cdots ; S_j)$$

At the end of each trading period, the sum of all debit positions is exactly equal to the sum of all credit positions. With positions automatically netted, this means any derivative security would be statically replicated with the selected basis securities.

The first components in formula (18) are what we call zeroth order basis instruments on the basis currency and are or extend what is known as zero coupon bonds in a single future period case.

Then we have zeroth order basis instruments on underlying currencies that are or extend what is known as forwards or futures in a single future period case.

First order basis instruments are extensions on what is known as calls or puts on a single source of uncertainty in a single future period case.

Second order basis instruments are extensions on what is known as correlation options on two sources of uncertainty in a single future period case.

More generally, n-th order basis instruments involve contingencies on n sources of uncertainty.

The formula introduces those higher order terms incrementally and their premium value ends up being lower than those of lower order with similar contingencies. In some approximate approaches, terms of a higher order than a given value may be proven to be negligible.

When the method of the present invention is merely used for pricing purpose however, it may be advantageous to use a basis set that makes the best use of the more directly available information. In this case the most directly available information is the conditional density and the associated basis set is the Arrow-Debreu state-prices.

5.3 Examples

1. Our World series example is already a simple application of the definitions and formula introduced and their practical use outside the realm of financial assets and shows the broad scope of applicability of our method.
2. Standard Example We will further detail how the formula works on a vanilla option example. We will consider the case of a single underlying $S_t^1 \equiv S_t$ and the reference currency is $S_t^0 \equiv 1$. The formula above reduces to:

$$\prod_{0,j}^0 (f)(S_0; \cdots ; S_j) = \prod_{0,j+1}^0 (S_0; \cdots ; S_j; F_{j+1}) + \tag{20}$$

$$(S_j B_{t_0,t_{i-1},t_i}^1 - F_{j+1} B_{t_0,t_{i-1},t_i}^0) \times \partial \prod_{0,j+1}^0 (S_0; \cdots ; S_j; F_{j+1}) +$$

$$F_{j+1} \Bigg( \int_0^1 \partial^2 \prod_{0,j+1}^c (S_0; \cdots ; S_j; F_{j+1}/x)$$

$$B_{t_0,t_j,t_{j+1}}^0 (1, 1, F_{j+1}/x^-) \frac{dx}{xx^-} +$$

$$\int_0^1 \partial^2 \prod_{0,j+1}^0 (S_0; \cdots ; S_j; Fx) B_{t_0,t_j,t_{j+1}}^0 (1, -1, F_{j+1}x^+) dx \Bigg)$$

The derivatives of interest here is given as a vanilla call option contracted at time $t_0$ and maturing at time $t_n$. We assume there is no interest rate and that the repo or dividend rate is zero. There is no slippage and there is no credit risk, but there are n+1 trading periods $t_0, t_1, t_n$. We also assume that first order basis instruments prices are given by the Black Scholes formula $$B_{t_0,t_{i-1},t_i}^0 (1, \delta, K) = B_{t_0,t_{i-1},t_i}^0 \delta(F_{t_i} N(\delta d_1) - KN(\delta d_0))$$

$$F_{t_i} = S_{t_{i-1}} \frac{B_{t_0,t_{i-1},t_i}^1}{B_{t_0,t_{i-1},t_i}^0}$$

$$d_1 = \frac{-\text{Log}(K/F_{t_i})}{\sigma \sqrt{(t_i - t_{i-1})}} + \sigma \sqrt{(t_i - t_{i-1})}/2$$

$$d_0 = d_1 - \sigma \sqrt{(t_i - t_{i-1})}$$

$$N(x) = \int_{-\infty}^{x} \frac{e^{-t^2/2}}{\sqrt{2\pi}} dt = \frac{1}{2}\left(1 + \text{Erf}\left(\frac{x}{\sqrt{2}}\right)\right)$$

With:

$\sigma = 0.1$

-continued $i \in \{1, \cdots, n\}$ $n = 1, 2, 7$ $t_i = i/365$ $B^0_{t_0, t_{i-1}, t_i} = 1$ $B^1_{t_0, t_{i-1}, t_i} = 1$ $S_0 = 100, K = 100$ Our goal will be to calculate $\Pi_{0,0}^0(f)$ as a real number.

This example helps illustrate the impact of discrete trading against the closed form continuous trading formula. For the integral, we will take $I_x = \{0, 1/p, \ldots, i/p, \ldots, p/p=1\}$ with p=35, 70, 100. The results are provided in the following table:

TABLE 2 p = 35

| n | Algorithm result | Black Scholes Closed form continuous-time results |
|---|---|---|
| 1 | 0.208816 | 0.208816 |
| 2 | 0.29688 | 0.229531 |
| 7 | 0.528928 | 0.552471 |

TABLE 3 p = 70

| n | Algorithm result | Black Scholes Closed form continuous-time results |
|---|---|---|
| 1 | 0.208816 | 0.208816 |
| 2 | 0.295824 | 0.29531 |
| 7 | 0.533565 | 0.552471 |

These results indicate that the formula is computable and yields reasonable numbers when compared to what is known.

5.4 Theorem 2 of Compression to the Formal Form

This part addresses the issue of static replication and pricing of derivatives contracts in which multiple choices are given to the buyer and/or the seller of the contract throughout its life. This is a notoriously difficult problem as pointed out

TABLE 4 p = 100

| n | Algorithm result | Black Scholes Closed form continuous-time results |
|---|---|---|
| 1 | 0.208816 | 0.208816 |
| 2 | 0.295517 | 0.29531 |
| 7 | 0.0.535611 | 0.552471 | for example in U.S. Pat. No. 6,321,212B1, Column 4, (7).

The inventor of U.S. Pat. No. 6,321,212B1 however does not provide a conclusive solution, nor do other authors aware of the state of the art.

Our invention, in one of its simplest embodiments teaches a solution to this acknowledged problem. Other embodiments solve the problem under even more complex constraints.

Such constraints include accounting for microstructural issues, hedging strategies, etc.

This method of our invention further enables an easily reproducible, broadly applicable and computer implementable sequence to solve the problem. Further still, our invention enables and teaches even more advanced hedging strategies and other more sophisticated systems such as exchange systems for any types of derivatives.

Theorem 2 Let's suppose we are in a market exchange system $e_{0,n}$ where all possible basis instruments trade. Let's also suppose there are no arbitrage opportunities.

Let's consider $\Pi_{0,i,n}^c(f)$ a contract entered into at time $t_0$ and stipulating that at time $t_i$, the seller $\Omega$ shall pay the buyer $\beta f(S_0; \beta_0; \Omega_0; \ldots; S_n; \beta_n; \Omega_n)$ (resp. $f(S_0; \Omega_0; \beta_0; \ldots; S_{-1}; \Omega_n; \beta_n))^5$, where $\beta_j$ (resp. $\Omega_j$) is an m+1-dimensional vector of parameters choices given to the buyer $\beta$ at time $t_j$ and then $\Omega_j$ (resp. $\beta_j$) is the m+1-dimensional vector of parameters choices given to the seller $\Omega$ (resp. $\beta$) at time $t_j$. Let's suppose the conditional expectations of f for any time in the future as a function of $\beta_j$ ($\Omega_j$) $0 \leq j \leq n$ can be reduced to be functions with a maximum (resp. minimum) in the subset $\mathfrak{R}_{\beta_j}^{m+1}$ (resp. $\mathfrak{R}_{\Omega_j}^{m+1}$) of possible values of $\beta_j$ (resp. $\Omega_j$) $0 \leq j \leq n$.

[5] More entangled combinations of the order of choices given to the buyer and the seller can be inferred without any methodological change. The description outlined is merely for presentational readability.

If we have the following equality, $$N(\tilde{S}_{t_0}; \cdots \tilde{S}_{t_p}; S_{t_{p+1}}; \cdots, S_{t_i}) \overset{\varphi}{\otimes}$$

$$B^c_{t_0, t_i, t_j}((i_1, \cdots, i_k), (\delta_1, \cdots, \delta_k), (K_1, \cdots, K_k), (j_1, \cdots, j_p))$$

$$(\tilde{S}_{t_0}; \cdots \tilde{S}_{t_p}; \cdots, S_{t_i}) = N(\tilde{S}_{t_0}; \cdots \tilde{S}_{t_p}; S_{t_{p+1}}; \cdots, S_{t_i}) \overset{\varphi}{\otimes}$$

$$B^c_{t_p, t_i, t_j}((i_1, \cdots, i_k), (\delta_1, \cdots, \delta_k), (K_1, \cdots, K_k), (j_1, \cdots, j_p))$$

$$(\tilde{S}_{t_0}; \cdots \tilde{S}_{t_p}; S_{t_{p+1}}; \cdots, S_{t_i})$$

for $0 \leq p \leq i$ and for any function $N$.

which means that if the price market makers quote for basis instruments is a deterministic function of their parameters, that is the realized values of underlyings under consideration, Then $\Pi_{0,i,n}^c(f)$ can be reduced to a contract that pays a function $\bar{f}(S_0; \ldots; S_n)$ at time $t_n$.

Lemma

If we have the following equality, $$N(\tilde{S}_{t_0}; \cdots \tilde{S}_{t_p}; S_{t_{p+1}}; \cdots, S_{t_i}) \overset{\varphi}{\otimes}$$

$$B^c_{t_0, t_i, t_j}((i_1, \cdots, i_k), (\delta_1, \cdots, \delta_k), (K_1, \cdots, K_k), (j_1, \cdots, j_p))$$

$$(\tilde{S}_{t_0}; \cdots \tilde{S}_{t_p}; \cdots, S_{t_i}) = N(\tilde{S}_{t_0}; \cdots \tilde{S}_{t_p}; S_{t_{p+1}}; \cdots, S_{t_i}) \overset{\varphi}{\otimes}$$

$$B^c_{t_p, t_i, t_j}((i_1, \cdots, i_k), (\delta_1, \cdots, \delta_k), (K_1, \cdots, K_k), (j_1, \cdots, j_p))$$

$$(\tilde{S}_{t_0}; \cdots \tilde{S}_{t_p}; S_{t_{p+1}}; \cdots, S_{t_i})$$

for $0 \leq p \leq i$ and for any function N,
then, for any function $f(S_0; \ldots; S_n)$, $$\Pi_{0,i,n}^c(f)(\bar{S}_1; \ldots \tilde{S}_p; S_{p+1} \ldots S_i) = \Pi_{p,i,n}^c(f_p)(S_{p+1}; \ldots; S_i)$$

for $0 \leq p \leq i$ and where $f_p(S_{p+1}; \ldots; S_i) = \bar{f}(\bar{S}_0; \ldots \bar{S}_p; S_{p+1}; \ldots; S_i)$ Proof This is a direct consequence of the decomposition formula.

Theorem 2 proof: we take:

$$\overline{\Omega}_n = \underset{\Omega_n \in \mathcal{R}_{\Omega_n}^{m+1}}{\text{ArgMax}} \prod_{0,n,n}^{c} (-f)(S_0; \beta_0; \Omega_0; \cdots; S_n; \beta_n; \Omega_n)$$

so that $\overline{\Omega}_n$ is a function of $S_0; \beta_0; \Omega_0; \ldots; S_n; \beta_n$ $$\overline{\beta}_n = \underset{\beta_n \in \mathcal{R}_{\beta_n}^{m+1}}{\text{ArgMax}} \prod_{0,n,n}^{c} (f)(S_0; \beta_0; \Omega_0; \cdots; S_n; \beta_n; \overline{\Omega}_n)$$

is a function of $S_0; \beta_0; \Omega_0; \ldots; S_n$.

Continuing the process iteratively backwards, we have for any i=n−1 to 0:

$$\overline{\Omega}_i = \underset{\Omega_i \in \mathcal{R}_{\Omega_i}^{m+1}}{\text{ArgMax}}$$

$$\prod_{0,i,n}^{c} (-f)(S_0; \beta_0; \Omega_0; \cdots; S_i; \beta_i; \Omega_i; S_{i+1}; \overline{\beta}_{i+1}; \overline{\Omega}_{i+1}; \cdots; S_n; \overline{\beta}_n; \overline{\Omega}_n)$$

so that $\overline{\Omega}_i$ is a function of $S_0; \beta_0; \Omega_0; \ldots; S_i; \beta_i$.

$$\overline{\beta}_i = \underset{\beta_i \in \mathcal{R}_{\beta_i}^{m+1}}{\text{ArgMax}}$$

$$\prod_{0,i,n}^{c} (f)(S_0; \beta_0; \Omega_0; \cdots; S_i; \beta_i; \overline{\Omega}_i; S_{i+1}; \overline{\beta}_{i+1}; \overline{\Omega}_{i+1}; \cdots; S_n; \overline{\beta}_n; \overline{\Omega}_n)$$

so that $\overline{\beta}_i$ is a function of $S_0; \beta_0, \Omega_0; \ldots; S_i$.

In the end we have the sought after function $\overline{f}(S_0; \ldots; S_n)$ as:

$$f(S_0; \overline{\beta}_0; \overline{\Omega}_0; \ldots S_i; \overline{\beta}_i; \overline{\Omega}_i; \ldots; S_n; \overline{\beta}_n; \overline{\Omega}_n)$$

Note: If there are several choices for ArgMax, in any of the formulas above, any one of them can be taken randomly.

While the ArgMin and ArgMax in the determination of $\Omega_i$ and $\beta_i$ above may not seem at first readily tractable, there are numerous mathematical results that help reduce this function into boolean operators on the value of only a few expressions. As a result, in practice, this reverse chronological order iterative sequence may be readily implemented in a computerized processing system.

Section 5.5 below further illustrates how this practical simplification is done on the most common examples.

5.5 Examples with Optimization Feature

American Options

An American (or Bermudan) option here is defined here as the contract guaranteeing to the buyer the right to purchase (for a call) or sell (for a put) the underlying S at the strike price K at any time between $t_1$ and $t_n$.

The payoff at maturity $t_n$ can therefore be written in a functional form as:

$$f(S_0; \beta_0; \Omega_0; \cdots; S_n; \beta_n; \Omega_n) = \left( N \times \beta_1 (\delta(S_1 - K))^+ \overset{\varphi_{\beta,\Omega}}{\otimes} B_{1,1,n}^c + \right.$$

-continued $$N \times (1 - \beta_1)\beta_2(\delta(S_2 - K))^+ \overset{\varphi_{\beta,\Omega}}{\otimes} B_{2,2,n}^c + \ldots +$$

$$N \times (1 - \beta_1)\ldots(1 - \beta_{n-2})\beta_{n-1}(\delta(S_{n-1} - K))^+ \overset{\varphi_{\beta,\Omega}}{\otimes} B_{n-1,n-1,n}^c +$$

$$\left. N \times (1 - \beta_1)\ldots(1 - \beta_{n-1})(\delta(S_n - K))^+ \right)$$

with $\delta=1$ for a call and $\delta=-1$ for a put; $0 \leq \beta_i \leq 1$; N being the notional of the contract.

Applying theorem 2 and given the fact that the derivative of $f$ as a function of the is different from zero when varies between zero and one, we deduce that:

$$\overline{\beta}_i = \underset{0 \leq \beta_i \leq 1}{\text{ArgMax}} \prod_{0,i,n}^{c} (f)(S_0; \beta_0; \cdots; S_i; \beta_i, S_{i+1}; \overline{\beta}_{i+1}; \cdots; S_n; \overline{\beta}_n)$$

$$= \underset{\beta_i \in \{0,1\}}{\text{ArgMax}} \prod_{0,i,n}^{c} (f)(S_0; \beta_0; \cdots; S_i; \beta_i, S_{i+1}; \overline{\beta}_{i+1}; \cdots; S_n; \overline{\beta}_n)$$

Which can be more precisely written as:

$$\overline{\beta}_i = 1\{N \times (1 - \overline{\beta}_1)\ldots(1 - \overline{\beta}_{i-1})(\delta(\overline{S}_i - K))^+ \overset{\varphi_{\beta,\Omega}}{\otimes}$$

$$B_{i,i,n}^c \geq \prod_{i,i,n}^{c} (N \times (1 - \overline{\beta}_1)\ldots(1 - \overline{\beta}_{i-1})\overline{\beta}_{i+1}(\delta(S_{i+1} - K))^+ \otimes$$

$$B_{i,i+1,n}^c + \cdots + N \times (1 - \overline{\beta}_1)\ldots(1 - \overline{\beta}_{i-1})(1 - \overline{\beta}_{i+1})\ldots$$

$$(1 - \overline{\beta}_{n-2})\overline{\beta}_{n-1}(\delta(S_{n-1} - K))^+ \otimes B_{i,n-1,n}^c + N \times$$

$$(1 - \overline{\beta}_1)\ldots(1 - \overline{\beta}_{i-1})(1 - \overline{\beta}_{i+1})\ldots$$

$$(1 - \overline{\beta}_{n-1})(\delta(S_n - K))^+))(\overline{S}_0, \cdots, \overline{S}_i)\}$$

$$= 1\{N \times (1 - \overline{\beta}_1)\ldots(1 - \overline{\beta}_{i-1})(\delta(\overline{S}_i - K))^+ \overset{\varphi_{\beta,\Omega}}{\otimes}$$

$$B_{0,i,n}^c \geq \prod_{0,i,n}^{c} (N \times (1 - \overline{\beta}_1)\ldots(1 - \overline{\beta}_{i-1})\overline{\beta}_{i+1}(\delta(S_{i+1} - K))^+ \otimes$$

$$B_{0,i+1,n}^c + \cdots + N \times (1 - \overline{\beta}_1)\ldots(1 - \overline{\beta}_{i-1})(1 - \overline{\beta}_{i+1})\ldots$$

$$(1 - \overline{\beta}_{n-2})\overline{\beta}_{n-1}(\delta(S_{n-1} - K))^+ \otimes B_{0,n-1,n}^c + N \times$$

$$(1 - \overline{\beta}_1)\ldots(1 - \overline{\beta}_{i-1})(1 - \overline{\beta}_{i+1})\ldots$$

$$(1 - \overline{\beta}_{n-1})(\delta(S_n - K))^+))(\overline{S}_0, \cdots, \overline{S}_i)\}$$

Passport Options (One Underlying Case—Discrete translation of Hyar-Lipton-Pugachevsky definition[6] [41])

[6]Hyer, T. Liptom-Lifschitz, T and Pugachevsky, D. (1997) "Passport to success", Risk Magazine 10, No 9, pp 127-131.

A passport option is a contract giving the right to the buyer to buy or sell at anytime between $t_0$ and $t_{n-1}$ a maximum of N units of underlying S; if at time tn the sum of those trades generate a profit the buyer keeps it, if a loss is incurred, the seller pays for it.

The payoff at maturity $t_n$ can therefore be written in a functional form as:

$$f(S_0; \beta_0; \Omega_0; \ldots; S_n; \beta_n; \Omega_n) = (N(\beta_0(S_1 - S_0) + \beta_1(S_2 - S_1) + \ldots + \beta_{n-1}(S_n - S_{n-1})))^+ \text{ with for } 0 \leq i \leq n-1, |\beta_i| \leq 1$$

As can be seen, $f$ as a function of any of the $\beta_i$'s is twice continuously differentiable except at most at one point. We thus deduce $\overline{\beta}_i \in \{-1, 0, 1\}$ and more precisely:

$$\overline{\beta}_i = \text{sign}[\Pi_{i,i,n}^c((\overline{\beta}_0(\overline{S}_1 - \overline{S}_0) + \ldots + \overline{\beta}_{i-1}(\overline{S}_i - \overline{S}_{i-1}) + (S_{i+1} - \overline{S}_i) + \overline{\beta}_{i+1}(S_{i+2} - S_{i+1}) + \ldots + \overline{\beta}_{n-1}(S_n - S_{n-1}))^+ - (\overline{\beta}_0($$

$\bar{S}_1-\bar{S}_0)+\ldots+\bar{\beta}_{i-1}(\bar{S}_i-\bar{S}_{i-1})-(S_{i+1}-\bar{S}_i)+\bar{\beta}_{i+1}(S_{i+2}-\bar{S}_{i+1})+\ldots+\bar{\beta}_{n-1}(S_n-S_{n-1}))^+)(S_i,S_{i+1},\bar{\beta}_{i+1},\ldots,S_{n-1},\bar{\beta}_{n-1},S_n)]$ $\bar{\beta}_i=\text{sign}[\Pi_{0,i,n}{}^c((\bar{\beta}_0(S_1-S_0)+\ldots+\bar{\beta}_{i-1}(S_i-S_{i-1})+(S_{i+1}-S_i)+\bar{\beta}_{i+1}(S_{i+2}-S_{i+1})+\ldots+\bar{\beta}_{n-1}(S_n-S_{n-1}))^+-(\bar{\beta}_0(S_1-S_0)+\ldots+\bar{\beta}_{i-1})S_i-S_{i-1})-(S_{i+1}-S_i)+\bar{\beta}_{i+1}(S_{i+2}-S_{i+1})+\ldots+\bar{\beta}_{n-1}(S_n-S_{n-1}))^+)](S_1,\ldots,S_i)$ with sign(x)=1 if x≥0, sign(x)=−1 if x<0.

Passport Options (m underlyings case—discrete translation of Wilmott's definition[7])

[7]Hyungsok, A. Penaud, A. and Paul Wilmott, P. "Various passport options and their valuation" (1999) OCIAM Oxford University Working paper. [42] [56]

The passport with m underlyings is a contract giving the right to the buyer to buy or sell at anytime between $t_0$ and $t_{n-1}$ a maximum of N units of underlying of each of the underlyings $S^j$; if at time $t_n$ the sum of those trades generate a profit the buyer keeps it, if a loss is incurred, the seller pays for it. The payoff at maturity $t_n$ is:

$$f(S_0;\beta_0;\Omega_0;\ldots;S_n;\beta_n;\Omega_n) = N(<\beta_0,(S_1-S_0)>+<\beta_1,(S_2-S_1)>+\ldots+<\beta_{n-1},(S_n-S_{n-1})>)^+$$

with $$0\leq i\leq n-1, \text{ for } \sup_{j\in\{0,\ldots,m\}} |\beta_i^j|\leq 1.$$

Extending the analytical approach of the one underlying case to the multi-dimensional case, we deduce:

$$\bar{\beta}_i = \underset{\beta_i\in\mathfrak{R}_{\beta_i}^{m+1}}{\text{ArgMax}} \prod\nolimits_{i,i,n}^c (f(\bar{S}_0;\bar{\beta}_0;\ldots;\tilde{S}_i;\beta_i;\ldots;S_n;\bar{\beta}_n))$$

$\mathfrak{R}_{\beta_i}^{m+1}=\mathbb{Z}_3\times\ldots\times\mathbb{Z}_3)^*$ in which the * means at the exclusion of $\{0,\ldots,0\}\in\mathfrak{R}^{m+1}$ and $\mathbb{Z}_3=\{-1, 0, 1\}\subset\mathbb{Z}$ showing that to compute $\bar{\beta}$, at most $3^m-1$ evaluations of expectations and comparisons will have to be made.

Moving Window Asian option with early exercise (Hawaiian option[8])

[8]awimott.com, Technical forum (2001)

A Moving Window Asian option with early exercise is a contract in which the buyer may choose to receive at any time after the contract date $t_0$ and the maturity $t_n$, the difference between the average of the underlying S over the last p trading periods and the strike K if this difference is positive.

The payoff at maturity tn can therefore be written in a functional form as:

$$f(S_0;\beta_0;\Omega_0;\ldots;S_n;\beta_n;\Omega_n) = \frac{N}{P} \times \begin{pmatrix} \beta_1(\delta(S_1-K_1))^+\otimes B_{1,n}^0 + \\ (1-\beta_1)\beta_2(\delta(S_2-K_2))^+\otimes B_{2,n}^0+\ldots+ \\ (1-\beta_1)\ldots(1-\beta_{n-2})\beta_{n-1}(\delta(S_{n-1}-K_{n-1}))^+\otimes B_{n-1,n}^0 + \\ (1-\beta_1)\ldots(1-\beta_{n-1})(\delta(S_n-K_n))^+ \end{pmatrix}$$

with δ=1 for a call and δ=−1 for a put; $0\leq\beta_i\leq 1$; p being the number of time—series over which the average is taken.

$$K_i = p\times K - \sum_{j=i+1-p}^{i-1} S_j$$

Applying the same arguments as with the American option, we deduce, $$\bar{\beta}_i = 1_{\{\frac{N}{p}\times(1-\bar{\beta}_1)\ldots(1-\bar{\beta}_{i-1})(\delta(\tilde{S}_i-K_i))^+\otimes^{\varphi\beta,\Omega}B_{i,i,n}^c\geq}$$
$$\prod\nolimits_{i,i,n}^c (\frac{N}{p}\times(1-\bar{\beta}_1)\ldots(1-\bar{\beta}_{i-1})\bar{\beta}_{i+1}(\delta(S_{i+1}-K_{i+1}))^+\otimes B_{i,i+1,n}^c+\ldots+$$
$$\frac{N}{p}\times(1-\bar{\beta}_1)\ldots(1-\bar{\beta}_{i-1})(1-\bar{\beta}_{i+1})\ldots(1-\bar{\beta}_{n-2})\bar{\beta}_{n-1}(\delta(S_{n-1}-K_{n-1}))^+\otimes B_{i,n-1,n}^c+$$
$$\frac{N}{p}\times(1-\bar{\beta}_1)\ldots(1-\bar{\beta}_{i-1})(1-\bar{\beta}_{i+1})\ldots(1-\bar{\beta}_{n-1})(\delta(S_n-K_n))^+)(\bar{S}_0,\ldots,\tilde{S}_i)\}$$

$$= 1_{\{\frac{N}{p}\times(1-\bar{\beta}_1)\ldots(1-\bar{\beta}_{i-1})(\delta(\tilde{S}_i-K_i))^+\otimes^{\varphi\beta,\Omega}B_{0,i,n}^c\geq}$$
$$\prod\nolimits_{0,i,n}^c (\frac{N}{p}\times(1-\bar{\beta}_1)\ldots(1-\bar{\beta}_{i-1})\bar{\beta}_{i+1}(\delta(S_{i+1}-K_{i+1}))^+\otimes B_{0,i+1,n}^c+\ldots+$$
$$\frac{N}{p}\times(1-\bar{\beta}_1)\ldots(1-\bar{\beta}_{i-1})(1-\bar{\beta}_{i+1})\ldots(1-\bar{\beta}_{n-2})\bar{\beta}_{n-1}(\delta(S_{n-1}-K_{n-1}))^+\otimes B_{0,n-1,n}^c+$$
$$\frac{N}{p}\times(1-\bar{\beta}_1)\ldots(1-\bar{\beta}_{i-1})(1-\bar{\beta}_{i+1})\ldots(1-\bar{\beta}_{n-1})(\delta(S_n-K_n))^+)(\bar{S}_0,\ldots,\tilde{S}_i)\}$$

6 Applications

The methods of the present invention will be further illustrated in preferred embodiments in conjunction with three systems of practical use for trading purposes: pricing systems, derivatives exchange systems and risk management systems.

6.1 Derivatives Pricing

In pricing or decision systems, the methods of the present invention will be used as alternatives to known methods with four main practical advantages over closed form, trees, PDE, Monte Carlo:

- Flexibility in the design of any conceivable derivatives contract, even those where subsequent choices may be made by parties in the contract, that will be seamlessly priced for any specification of the dynamics of the underlyings.
- Easy incorporation of liquidity effects in the pricing of derivatives through the introduction of scaling density functions.
- Easy incorporation of credit risk through the seamless integration of underlyings representative of the counterparty credit risk.
- Deriving hedging strategies independent of model risk through the use of indicated basis instruments contracts instead of Greeks as is the current practice derived from Black-Scholes-Morton.

As far as speed is concerned, except for closed form solutions, the methods of the present invention compare to those of PDEs, Trecs or MonteCarlo and many of the speed improvement methods of regular integral may be advantageously integrated in this framework; such methods would include Simpson types of methods, Gaussian quadratures and related methods, importance sampling methods, low discrepancy methods on Sobol, Halton or other family of points.

See further details in the drawings.

6.2 Exchange Design

Many types of derivatives exchanges may be derived from the methods of the present invention. We present here an example of design that seeks to extend the current practices and derivatives contracts to achieve the uses outlined for the present invention. However the example can be readily applied in any other OTC or regulated exchange framework See further details in the drawings.

6.3 Risk Management Systems

In derivatives portfolios Risk Management, traders are given Value At Risk (VAR) and/or Greek limits to reduce portfolios exposure to adverse market conditions. Distributional assumptions used to infer VAR values as well polynomial approximations implied by Greeks use create model risks that are poorly understood in this framework.

The existence of a market for basis instruments implies assumptions-free market state price densities for which instruments exist to manage any risk one would want to hedge.

Going beyond Value At Risk, in an exchange market of basis instruments, more specifically tailored derivatives may help better manage portfolios of derivatives.

The methods of the present invention can be used to design and build more effective risk management systems. In a preferred embodiment of the present invention, such risk management systems include:

Databases of derivatives contracts positions stored in basis instruments units

Inputs feeds of market or simulated basis instruments prices

Such a system may then be connected to an exchange system as specified above and enable effective trading strategies to match the desired outcome of the risk manager.

For instance a portfolio manager with a portfolio of assets including assets derivatives with pay-offs at $f_k(S_0; S_1; \ldots; S_{n_k})$ for $k=0, p$ and wishing be hedged in a value at risk framework by purchasing the contract $$\prod_{0,i,i+j}^{c} \left( \sum_{k=0}^{p} f_k, \text{VAR}(i, i+j) \right)$$

entered into at time $t_0$ in which the assets portfolio manager would be paying at time $t_i$ the premium $$\prod_{0,i,i+j}^{c} \left( \left( \prod_{0,i}^{c} \left( \sum_{k=0}^{p} f_k(S_0; S_1; \ldots; S_{n_k}) \right) - \prod_{0,i+j}^{c} \left( \sum_{k=0}^{p} f_k(S_0; S_1; \ldots; S_{n_k}) + \text{VAR}(i, i+j) \right)^+ \right) \right)$$

and receiving at time $t_{i+j}$ the quantity $$\left( \prod_{0,i}^{c} \left( \sum_{k=0}^{p} f_k(S_0; S_1; \ldots; S_{n_k}) \right) - \prod_{0,i+j}^{c} \left( \sum_{k=0}^{p} f_k(S_0; S_1; \ldots; S_{n_k}) + \text{VAR}(i, i+j) \right)^+ \right)$$

So if we have $1-c_{VAR}(i,j)$ the confidence level associated with the amount VAR(i,i+j), then $c_{VAR}(i,j)$ is characterized by:

$$\text{VAR}(i, i+j) = \text{Min} \left\{ \begin{array}{c} s \geq 0 \text{ such that} \\ \left( E \left( 1 - \frac{\{\prod_{0,i}^{c}(\sum_{k=0}^{p} f_k(S_0; S_1; \ldots; S_{n_k}))-}{\prod_{0,i+j}^{c}(\sum_{k=0}^{p} f_k(S_0; S_1; \ldots; S_{n_k}) \geq s\}} \right) \right) \leq \\ c_{VAR}(i, j) \end{array} \right\}$$

The main drawback of the value at risk method that is resolved in another preferred embodiment of the present invention is the possibility to concentrate or hide excessively negative payoffs in states where the potential loss exceeds the computed value at risk amount. FIG. 7 shows a bettor illustration of this problem. In a risk management approach consistent with methods of the present invention, a custom portfolio payoff may be designed to provide a maximum possible loss for all possible cases. The method may them be implemented in risk management systems or risk management computer program products.

See further details in the drawings.

The method may them be implemented in risk management systems or risk management computer program products.

In yet another embodiment of the present invention derivatives accounting responsive to FAS 133 or IAS 39 is facilitated by removing uncertainty that comes with assuming a particular model to allocate profit or losses on derivatives as hedging instrument and hence their allocation an Other Comprehensive Income category. As such it is more effective than the methods disclosed in WO 02/44847 A2: Dynamic reallocation hedge accounting, US20020111891: Accounting system for dynamic state of the portfolio reporting, US20020107774: Compensatory ratio hedging. All those methods are hereby incorporated by reference.

7 Dimension & Computations Reduction through Changes of Variables

In a practical implementation, the computational time is a major concern. It may appear at first computationally intractable to implement a full-dependance for the price of the option of all the $S_0 \ldots, S_n$ because otherwise the algorithm computation time grows exponentially with the number of time increments.

In practice, however, for virtualy all known payoffs of interest or basis instrument contracts used, relatively obvious changes of variable may be made that result in the computational time ending up in the order of a power two or three of the number of time steps. We review some of them below.

The purpose of the algorithm is so to decrease the complexity of the option price dependence. It can be easily accomplished for non-path-dependant options and underlyings following a martingale, hence markovian process (process driven by brownian motions or more generally Levy processes). For example, the price of an European Vanilla (under geometric brownian motion assumptions) at time t only depends of the current value of the underlying $S_t$ and not on its past values. In those cases, we consider the option price as a function of the only current underlying value. For example, we have:

$$\Pi_{0,i,n}^{c}(f)(S_0, \ldots, S_i) = \Pi_{0,i,n}^{c}(f)(S_i)$$

With such an implementation, the computation time is almost linear in maturity [9]. But we can't apply this method to more general payoff that are path-dependant such as asian options, loop-back options, american options, etc. . . .

[9]The implementation is actually notlinear in time because the range of points to consider increases with time.

To implement this type of path-dependant option, we consider the price of the option as a function of several variables $V_i^v$: one will be the current value of the underlying and the other variables will be used to compress the path-information needed to determine the price of the option at any time. For example, we choose for:

the Arithmetic asian option: we use a two-dimension variable with $V_i^0 = S_i$ and $$V_i^1 = \frac{1}{i+1}\sum_{k=0}^{i} S_k.$$

We define the payoff function as a function of the vector: $f_n(V) = (V_n^1 - K)^+$.

the loopback option: we use a two-dimension variable with $V_i^0 = S_i$ and $V_i^1 = \max_{k=0}^{i} S_k$. We define the payoff function as a function of the vector: $f_n(V) = (V_n^1 - K)^+$.

the American option: we use a two-dimension variable with $V_i^0 = S_i$ and $V_i^1$ is used to store the information that the option has been or not exercised in the past and in the first case the profit that have been realised. That is:

$$V_i^1 = \begin{cases} 0 & \text{if the option is yet to be exercised} \\ p > 0 & \text{if the option as been exercised with a profit of \$ } p \end{cases}$$

We define the payoff function as a function of the vector: $f_n(V) = (V_n^1 - K)^+$.

the Passport Option: we use a two-dimension variable with $V_i^0 = S_i$ and $V_i^1$ is used to store the current profit of the process. That is:

$$V_i^1 = V_{i-1}^1 + \beta_i(S_i - S_{i-1})$$

We define the payoff function as a function of the vector: $f_n(V) = V_n^1$.

With this method, we need to implement the link between these variable, it means that, given the vector of variables at time $t_i$ and the value of the underlying at time $t_{i+1}$, how to determine the value of the vector of variables at time $t_{i+1}$. In the past examples, this relation is obtained as follow:

the Arithmetic asian option:

$$V_{i+1}^1 = \frac{1}{i+2}\sum_{k=0}^{i+1} S_k = \frac{i+1}{i+2}V_i^1 + \frac{1}{i+2}S_{i+1}$$

the loopback option:

$$V_{i+1}^1 = \max(V_i^1, S_{i+1})$$

the American option: at time $t_{i+1}$, we have two possibilities, either we have already exercised the option so nothing to be done, or the option is yet to exercised and we need to make the choice of exercising it. We decide that the option will be exercised if the resulting profit is higher than the future expectation of profit at maturity of this option that is the price of the European option with spot value the current value of the underlying with strike and time of maturity similar to the American option. That is, for the call particularly:

$$V_{i+1}^1 = \begin{cases} V_i^1 & \text{if } V_i^1 > 0 \\ \text{if } V_i^1 = 0 \text{ then} \begin{cases} Call_n(S_{i+1}, K) - & \text{if } Call_n(S_{i+1}, K) - \\ (S_{i+1} - K)^+ & (S_{i+1} - K)^+ > 0 \\ 0 & \text{if } Call_n(S_{i+1}, K) - \\ & (S_{i+1} - K)^+ \leq 0 \end{cases} \end{cases}$$

For the practical implementation, we first compute with our algorithm the price of the corresponding European option that gives the price of the European option at any time for any spot equal to the past values of the underlying which is exactly what we need to compute the algorithm for the American Option.

TABLE 5

American Option of spot $S_0 = 100$ and strike $K = 100$ Maturity n in days, Interest rate (r), Cost of carry (b), Basis Point & Precision.

| r | b | σ | n | bp | prec | Result | Bjerksund and Stensland[10] continuous-time Approximation | European |
|---|---|---|---|---|---|---|---|---|
| 0 | −0.1 | 0.1 | 5 | 0.05 | 5 | 0.4725 | 0.4757 | 0.4680 |
| 0 | 0 | 0.05 | 10 | 0.05 | 5 | 0.3981 | 0.3974 | 0.3981 |
| 0.1 | 0 | 0.1 | 10 | 0.1 | 5 | 0.7953 | 0.7918 | 0.7950 |
| 0.025 | −0.05 | 0.05 | 5 | 0.1 | 5 | 0.3578 | 0.3159 | 0.3084 |
| 0 | −0.1 | 0.1 | 10 | 0.05 | 4 | 0.7573 | 0.7396 | 0.7025 |
| 0.05 | 0.05 | 0.1 | 10 | 0.05 | 5 | 0.8933 | 0.8969 | 0.8983 |
| 0.05 | −0.05 | 0.1 | 10 | 0.05 | 5 | 0.7357 | 0.7046 | 0.6989 | the Passport option: at time $t_{i+1}$, we choose $\beta_{i+1}$ such as the profit $\beta_{i+1}(S_{i+1} - S_i)$ is maximum. The link between the vector at time $t_{i+1}$ and time $t_i$ is exactly the recurrent definition of $V_{i+1}^1$.

General Computational Gains Approach:

In addition to the methods described above, in general, computational gains may be achieved by the following process:

1. define $f$ in discrete space
2. extend $f$ in the continuous space with an infinitely smooth or analytic function fc that interpolate the values of $f$ in the discrete space
3. use well known theorems to obtain the value of the integral by using an approximating function of $f$ and use a smaller subset of the original discrete space to obtain the approximate value of the integral This approach eliminates the need to verify the functional regularity conditions that one considers when taking from the outset a continuous space. It results in methods, systems and computer program products that run faster because larger numbers of states can be spanned at once.

APPENDIX

Theorem

For any function g defined on a discrete space of real numbers $I_x$, with $I_x = I_{x^1} \times \ldots \times I_{x^m}$ an m-dimensional discrete space so that $I_{x^i} = \{-\infty \leq x_{l_i}^i < \ldots < x_0^i < \ldots < x_{h_i}^i \leq +\infty\}$. With the discrete definitions of derivatives and integrals earlier introduced, the following formula holds:

$$g(x^1, \ldots, x^m) =$$

$$\sum_{k=0}^{m} \sum_{\substack{0 \leq i_1 < \ldots < i_k \leq m}} \sum_{\substack{0 \leq j_1 < \ldots < j_p \leq m \\ j_1 \in \{1,\ldots,m\}\setminus\{i_1,\ldots,i_k\} \\ i=1,\ldots,p}} \sum_{q=0}^{p} (-1)^{q+p} \sum_{\substack{0 \leq k_1 < \ldots < k_q \leq m \\ k_1 \in \{j_1,\ldots,j_p\} \\ i=1,\ldots,q}} x_0^{k_1} \times \ldots \times$$

$$x_0^{k_q} \times \int_{I_{m^{i_1}} \times \ldots \times I_{m^{i_k}}} \left(\mathrm{Sgn}(t^{i_1} - x_0^{i_1})(x^{i_1} - t_+^{i_1})\right)^+ \ldots \left(\mathrm{Sgn}(t^{i_k} - x_+^{i_k})(x^{i_k} - t_+^{i_k})\right)^+$$

$$\frac{x^{j_1} \times \ldots \times x^{j_p}}{x^{k_1} \times \ldots \times x^{k_q}} \times \partial_{t^{i_1}}^2 \ldots \partial_{t^{i_k}}^2 \partial_0^{x^{j_1}} \ldots$$

$$\partial_0^{x^{j_p}} g(x_0^1, \ldots, t^{i_1}, \ldots, t^{i_k}, \ldots, x_0^m) dt^{i_1} \ldots dt^{i_k}$$

and with $\mathrm{Sgn}(x)=1$ if $x \geq 0$ otherwise $\mathrm{Sgn}(x)=-1$.

We establish the proof in a discrete setting in order to avoid making regularity assumptions that may end up not being true for cases of interest and to match real world discreteness. These cases of interest include the most common derivatives pay-off structures $(S_T - K)^+$ that is a function of $S_T$ that is not twice differentiable in that variable. Proof:

Case 1: One Variable

Let's consider l, h integers such that $l \leq 0 \leq h$ and $x_l, x_0, x_h$ is an increasing sequence of $h-l+1$ real numbers. We note $I_x = \{-\infty \leq x_l, x_0, x_h \leq +\infty\}$ and let's take $x_n \in I_x$. For any function g defined on $I_x$, If $x_n \geq x_0$, We have:

$$g(x_n) = g(x_0) + (g(x_n) - g(x_0))$$

$$g(x_n) = g(x_0) + \sum_{j=0}^{n-1} (g(x_{j+1}) - g(x_j))$$

$$g(x_n) = g(x_0) + \sum_{j=0}^{n-1} (x_{j+1} - x_j) g'(x_j)$$

Likewise, we have:

$$g'(x_j) = g'(x_0) + \sum_{k=0}^{j-1} (x_{k+1} - x_k) g''(x_k)$$

So replacing in $g(x_n)$ gives:

$$g(x_n) = g(x_0) + \sum_{j=0}^{n-1} (x_{j+1} - x_j) \left( g'(x_0) + \sum_{k=0}^{j-1} (x_{k+1} - x_k) g''(x_k) \right)$$

$$g(x_n) = g(x_0) + \sum_{j=n}^{n-1} (x_{j+1} - x_j) g'(x_0) + \sum_{j=0}^{n-1} (x_{j+1} - x_j) \sum_{k=0}^{j-1} (x_{k+1} - x_k) g''(x_k)$$

Then, inverting the order of the summation on the indices k and j gives:

$$g(x_n) = g(x_0) + (x_n - x_0) g'(x_0) + \sum_{k=0}^{n-2} \sum_{j=k+1}^{n-1} (x_{j+1} - x_j)(x_{k+1} - x_k) g''(x_k) (*)$$

$$g(x_n) = g(x_0) + (x_n - x_0) g'(x_0) + \sum_{k=0}^{n-2} (x_n - x_{k+1}) g''(x_k)(x_{k+1} - x_k)$$

$$g(x_n) = g(x_0) + (x_n - x_0) g'(x_0) + \sum_{k=0}^{n-1} (x_n - x_{k+1}) g''(x_k)(x_{k+1} - x_k)$$

thus we can rewrite:

$$g(x_n) = g(x_0) + (x_n - x_0) g'(x_0) + \int_{x_0}^{x_n} (x_n - x_+) g''(x) dx, \text{ or:}$$

$$g(x_n) = g(x_0) + (x_n - x_0) g'(x_0) + \int_{x_0}^{+\infty} (x_n - x_+)^+ g''(x) dx$$

If $x_n < x_0$, we have:

$$g(x_n) = g(x_0) + (g(x_n) - g(x_0))$$

$$g(x_n) = g(x_0) + \sum_{j=n}^{-1} (g(x_j) - g(x_{j+1}))$$

$$g(x_n) = g(x_0) + \sum_{j=n}^{-1} (x_j - x_{j+1}) g'(x_j)$$

Likewise, we have:

$$g'(x_j) = g'(x_0) + \sum_{k=j}^{-1} (x_k - x_{k+1}) g''(x_k)$$

So replacing in $g(x_n)$ gives:

$$g(x_n) = g(x_0) + \sum_{j=n}^{-1} (x_j - x_{j+1}) \left( g'(x_0) + \sum_{k=j}^{-1} (x_k - x_{k+1}) g''(x_k) \right)$$

$$g(x_n) =$$

$$g(x_0) + \sum_{j=n}^{-1} (x_j - x_{j+1}) g'(x_0) + \sum_{j=n}^{-1} (x_j - x_{j+1}) \sum_{k=j}^{-1} (x_k - x_{k+1}) g''(x_k)$$

-continued $$g(x_n) = g(x_0) + (x_n - x_0)g'(x_0) + \sum_{j=n}^{-1}(x_j - x_{j+1})\sum_{k=j}^{-1}(x_k - x_{k+1})g''(x_k)$$

Then, inverting the order of the summation on the indices k and j gives:

$$g(x_n) = g(x_0) + (x_n - x_0)g'(x_0) + \sum_{j=n}^{-1}(x_j - x_{j+1})\sum_{k=j}^{-1}(x_k - x_{k+1})g''(x_k)(*)$$

$$g(x_n) = g(x_0) + (x_n - x_0)g'(x_0) + \sum_{k=n}^{-1}(x_k - x_{k+1})g''(x_k)\sum_{j=n}^{k}(x_j - x_{j+1})$$

$$g(x_n) = g(x_0) + (x_n - x_0)g'(x_0) + \sum_{k=n}^{-1}(x_k - x_{k+1})g''(x_k)(x_n - x_{k+1})$$

So that we can write:

$$g(x_n) = g(x_0) + (x_n - x_0)g'(x_0) + \sum_{k=n}^{-1}g''(x_k)(x_{k+1} - x_n)(x_{k+1} - x_k), \text{ or:}$$

$$g(x_n) = g(x_0) + (x_n - x_0)g'(x_0) + \sum_{k=-\infty}^{-1}g''(x_k)(x_{k+1} - x_n)^+(x_{k+1} - x_k),$$

which is also:

$$g(x_n) = g(x_0) + (x_n - x_0)g'(x_0) + \int_{-\infty}^{x_0}g''(x)(x_+ - x_n)^+ dx$$

Adding the cases when $x_n \geq x_0$ and $x_n < x_0$, gives:
Lemma

For any $x \in I_x = \{-\infty \leq x_l, x_0, x_h \leq +\infty\}$, with our discrete definition of derivatives and integrals, we have:

$$g(x) =$$

$$g(x_0) + (x - x_0)g'(x_0) + \sum_{k=1}^{h-2}g''(x_k)(\text{Sgn}(x_k - x_0)(x - x_{k+1}))^+(x_{k+1} - x_k),$$

which is also:

$$g(x) = g(x_0) + (x - x_0)g'(x_0) + \int_{-\infty}^{+\infty}g''(t)(\text{Sgn}(t - x_0)(x - t_+))^+ dt$$

Case 2: m Variables m>1
a) Preliminaries
First we introduce objects and definitions customized from the theory of distributions. We consider the m-dimensional discrete space $I_x = I_{x^1} \times \ldots \times I_{x^m}$, with $I_{x^i} = \{-\infty \leq x_l^i < \ldots < x_0^i < \ldots < x_h^i \leq +\infty\}$ $\delta_{x_0}^i$ is an application such that for any application g defined on a subspace of $I_x$, $$\delta_{x_0}^i: g(x^1, \ldots, x^{i-1}, x^i, x^{i+1}, \ldots, x^m) \to g(x^1, \ldots, x^{i-1}, x_0^i,$$

$$x^{i+1}, \ldots, x^m) = <\delta_{x_0}^i, g(x^1, \ldots, x^{i-1}, x^i, x^{i+1}, \ldots, x^m)>$$

$$\delta'^i_{x_0}: g(x^1, \ldots, x^{i-1}, x^i, x^{i+1}, \ldots, x^m) \to -\partial_i g(x^1, \ldots, x^{i-1}, x_0^i, x^{i+1},$$

$$\ldots, x^m) = <\delta'^i_{x_0}, g(x^1, \ldots, x^{i-1}, x^i, x^{i+1}, \ldots, x^m)>$$

-continued $$\delta''^i_{x_0}: g(x^1, \ldots, x^{i-1}, x^i, x^{i+1}, \ldots, x^m) \to \partial_i^2 g(x^1, \ldots, x^{i-1}, x_0^i,$$

$$x^{i+1}, \ldots, x^m) = <\delta''^i_{x_0}, g(x^1, \ldots, x^{i-1}, x^i, x^{i+1}, \ldots, x^m)>$$

We also introduce the operator of composition o of the $\delta_{x_0}^i$, $\delta'^i_{x_0}$, $\delta''^i_{x_0}$'s as:

$$\delta_{x_0^j} o \delta_{x_0^i}: g(x^1, \ldots, x^{i-1}, x^i, x^{i+1}, \ldots, x^{j-1}, x^j, x^{j+1}, \ldots, x^m) \to$$

$$g(x^1, \ldots, x^{i-1}, x_0^i, x^{i+1}, \ldots, x^{j-1}, x_0^j, x^{j+1}, \ldots, x^m) = <\delta_{x_0^j} o$$

$$\delta_{x_0^i}, g(x^1, \ldots, x^{i-1}, x^i, x^{i+1}, \ldots, x^{j-1}, x^j, x^{j+1}, \ldots, x^m)>$$

$$\delta'_{x_0^i} o \delta_{x_0^j} = \delta_{x_0^j} o \delta'_{x_0^i}: g(x^1, \ldots, x^{i-1}, x^i,$$

$$x^{i+1}, \ldots, x^{j-1}, x^j, x^{j+1}, \ldots, x^m) \to$$

$$-\partial_i g(x^1, \ldots, x^{i-1}, x_0^i, x^{i+1}, \ldots, x^{j-1}, x_0^j, x^{j+1}, \ldots, x^m)$$

$$= <\delta_{x_0^j} o \delta'_{x_0^i}, g(x^1, \ldots, x^{i-1}, x^i, x^{i+1}, \ldots,$$

$$x^{j-1}, x^j, x^{j+1}, \ldots, x^m)>$$

$$\delta''_{x_0^i} o \delta_{x_0^j} = \delta_{x_0^j} o \delta''_{x_0^i}: g(x^1, \ldots, x^{i-1}, x^i, x^{i+1}, \ldots, x^{j-1},$$

$$x^j, x^{j+1}, \ldots, x^m) \to$$

$$\partial_i^2 g(x^1, \ldots, x^{i-1}, x_0^i, x^{i+1}, \ldots, x^{j-1}, x_0^j, x^{j+1}, \ldots, x^m)$$

$$= <\delta_{x_0^j} o \delta''_{x_0^i}, g(x^1, \ldots, x^{i-1}, x^i, x^{i+1}, \ldots, x^{j-1},$$

$$x^j, x^{j+1}, \ldots, x^m)>$$

So, $g(x^1, \ldots, x^m) = <\delta_{x^m} o \ldots o \delta_{x^1}, g(t^1, \ldots, t^m)>$.

From these notations, it becomes obvious that the result obtained in our lemma can be rewritten as:

$$<\delta_x, g(u)> = <\delta_{x_0}, g(u)> - (x - x_0) < \delta'_{x_0},$$

$$g(u)> + \int_{I_x}(\text{Sgn}(x - x_0)(t_+ - x))^+ <\delta''_t, g(u)> dt$$

or more conveniently, $$d\tilde{z}_x = \delta_{x_0} - (x - x_0)\delta'_{x_0} + \int_{I_x}(\text{Sgn}(x - x_0)(t_+ - x))^+ \delta''_t dt$$

b) Proof by Recurrence
Since it clearly appears that this operator is distributive with respect to the addition, we will assume that for m¿1, the following relationship holds:

$$\delta_{x^{m-1}} o \ldots o \delta_{x^1} = \sum_{k=0}^{m-1}\sum_{0 \leq i_1 < \ldots < i_k \leq m-1}\sum_{\substack{0 \leq j_1 < \ldots < j_p \leq m-1 \\ j_l \in \{1, \ldots, m-1\} \setminus \{i_1, \ldots, i_k\} \\ l=1, \ldots, p}}\sum_{q=0}^{p}(-1)^{q+p}$$

$$\sum_{\substack{0 \leq k_1 < \ldots < k_q \leq m-1 \\ k_l \in \{j_1, \ldots, j_p\} \\ l=1, \ldots, q}} x_0^{k_1} \times \ldots \times x_0^{k_q} \times$$

$$\int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots (\mathrm{Sgn}(t^{i_k}-x_0^{i_k})(x^{i_k}-t_+^{i_k}))^+$$

$$\frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$$\{s_1, \ldots, s_r\} = \{1, \ldots, m-1\} \setminus \{i_1, \ldots, i_k, j_1, \ldots, j_p\}$$

Now we must prove the formula for $\delta_{x^m} o \ldots o \delta_{x^1}$. From the one variable case we know that:

$$\delta_{x^m} = \delta_{x_0^m} - (x^m - x_0^m)\delta'_{x_0^m} + \int_{I_{x^m}} (\mathrm{Sgn}(t^m - x_0^m)(x^m - t_+^m))^+ \delta''_{t^m} dt^m$$

So, $$\delta_{x^m} o \delta_{x^{m-1}} o \ldots o \delta_{x^1} =$$

$$\left( \delta_{x_0^m} - (x^m - x_0^m)\delta'_{x_0^m} + \int_{I_{x^m}} (\mathrm{Sgn}(t^m - x_0^m)(x^m - t_+^m))^+ \delta''_{t^m} dt^m \right)$$

$$o \delta_{x^{m-1}} o \ldots o \delta_{x^1} o \delta_{x^{m-1}} o \ldots o \delta_{x^1}$$

$$\delta_{x^m} o \delta_{x^{m-1}} o \ldots o \delta_{x^1} =$$

$$\sum_{k=0}^{m-1} \sum_{\substack{0 \le i_1 < \ldots < i_k \le m-1}} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p} \sum_{\substack{0 \le k_1 < \ldots < k_q \le m-1 \\ k_l \in \{j_1, \ldots, j_p\} \\ l=1, \ldots, q}} x_0^{k_1} \times$$

$$\ldots \times x_0^{k_q} \times \int_{I_{x^{i_1}} \times I_{x^{i_k}}} (\mathrm{Sgn}(t^{i_1}-x_0^{i_1})(x^{i_1}-t_+^{i_1}))^+ \ldots$$

$$(\mathrm{Sgn}(t^{i_k}-x_0^{i_k})(x^{i_k}-t_+^{i_k}))^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}}$$

$$o \left( \begin{array}{c} \delta_{x_0^m} - (x^m - x_0^m)\delta'_{x_0^m} + \\ \int_{I_{x^m}} (\mathrm{Sgn}(t^m - x_0^m)(x^m - t_+^m))^+ \delta''_{t^m} dt^m \end{array} \right) dt^{i_1} \ldots dt^{i_k}$$

with $\{s_1, \ldots, s_r\} = \{1, \ldots, m-1\} \setminus \{i_1, \ldots, i_k, j_1, \ldots, j_p\}$ $$\delta_{x^m} o \delta_{x^{m-1}} o \ldots o \delta_{x^1} =$$

$$\sum_{k=0}^{m-1} \sum_{0 \le i_1 < \ldots < i_k \le m-1} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p}$$

$$\sum_{\substack{0 \le k_1 < \ldots < k_q \le m-1 \\ k_l \in \{j_1, \ldots, j_p\} \\ l=1, \ldots, q}} x_0^{k_1} \times \ldots \times x_0^{k_q} \times$$

$$\int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots (\mathrm{Sgn}(t^{i_k}-x_0^{i_k})(x^{i_k}-t_+^{i_k}))^+$$

$$\frac{x^{j_1} \times \ldots \times x^{j_p}}{x^{k_1} \times \ldots \times x^{k_q}} \times \ldots \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} +$$

$$\sum_{k=0}^{m-1} \sum_{0 \le i_1 < \ldots < i_k \le m-1} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p}$$

$$\sum_{\substack{0 \le k_1 < \ldots < k_q \le m-1 \\ k_l \in \{j_1, \ldots, j_p\} \\ l=1, \ldots, q}} x_0^{k_1} \times \ldots \times x_0^{k_q} \times$$

$$\int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots$$

$$(\mathrm{Sgn}(t^{i_k}-x_0^{i_k})(x^{i_k}-t_+^{i_k}))^+ \frac{x^{j_1} \times \ldots \times x^{j_p} \times x^m}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} +$$

$$\sum_{k=0}^{m-1} \sum_{0 \le i_1 < \ldots < i_k \le m-1} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p}$$

$$\sum_{\substack{0 \le k_1 < \ldots < k_q \le m-1 \\ k_l \in \{j_1, \ldots, j_p\} \\ l=1, \ldots, q}} x_0^{k_1} \times \ldots \times x_0^{k_q} \times$$

$$\int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots$$

$$(\mathrm{Sgn}(t^{i_k}-x_0^{i_k})(x^{i_k}-t_+^{i_k}))^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$\{s_1, \ldots, s_r\} = \{1, \ldots, m-1\} \setminus \{i_1, \ldots, i_k, j_1, \ldots, j_p\}$ $(I) =$ $$\sum_{k=0}^{m-1} \sum_{0 \le i_1 < \ldots < i_k \le m-1} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p} \sum_{\substack{0 \le k_1 < \ldots < k_q \le m-1 \\ k_l \in \{j_1, \ldots, j_p\} \\ l=1, \ldots, q}} x_0^{k_1} \times$$

$$\ldots \times x_0^{k_q} \times \int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots$$

$$(\mathrm{Sgn}(t^{i_k}-x_0^{i_k})(x^{i_k}-t_+^{i_k}))^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$\{s_1, \ldots, s_r\} = \{1, \ldots, m-1\} \setminus \{i_1, \ldots, i_k, j_1, \ldots, j_p\} \cup \{m\}$ $(II) =$ $$\sum_{k=0}^{m-1} \sum_{0 \le i_1 < \ldots < i_k \le m-1} \sum_{\substack{0 \le j_1 < \ldots < j_p \le m-1 \\ j_l \in \{1, \ldots, m-1\} \setminus \{i_1, \ldots, i_k\} \\ l=1, \ldots, p}} \sum_{q=0}^{p} (-1)^{q+p} \sum_{\substack{0 \le k_1 < \ldots < k_q \le m-1 \\ k_l \in \{j_1, \ldots, j_p\} \\ l=1, \ldots, q}} x_0^{k_1} \times$$

$$\ldots \times x_0^{k_q} \times \int_{I_{x^{i_1}} \times \ldots \times I_{x^{i_k}}} (\mathrm{Sgn}(t^{i_1}-x_0^{i_1})(x^{i_1}-t_+^{i_1}))^+ \ldots$$

-continued $$\left(\text{Sgn}(t^{i_k} - x_0^{i_k})(x^{i_k} - t_+^{i_k})\right)^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$$\{s_1, \ldots, s_r\} = (\{1, \ldots, m-1\} \setminus \{i_1, \ldots, i_k, j_1, \ldots, j_p\})$$

$$(III) = \sum_{k=0}^{m-1} \sum_{\substack{0 \le i_1 < \ldots < i_k \le m-1}} \sum_{\substack{0 \le j_1 < \ldots < j_p \le m-1 \\ j_1 \in \{1, \ldots, m-1\} \setminus \{i_1, \ldots, i_k\} \\ l=1, \ldots, p}} \sum_{q=0}^{p} (-1)^{q+p} \sum_{\substack{0 \le k_1 < \ldots < k_q \le m-1 \\ k_1 \in \{j_1, \ldots, j_p\} \\ l=1, \ldots, q}} x_0^{k_1} \times$$

$$\ldots \times x_0^{k_q} \times \int_{I_x i_1 \times \ldots \times I_x i_k} \left(\text{Sgn}(t^{i_1} - x_0^{i_1})(x^{i_1} - t_+^{i_1})\right)^+ \ldots$$

$$\left(\text{Sgn}(t^{i_k} - x_0^{i_k})(x^{i_k} - t_+^{i_k})\right)^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$$\{s_1, \ldots, s_r\} = (\{1, \ldots, m-1\} \setminus \{i_1, \ldots, i_k, j_1, \ldots, j_p\})$$

$$(I) = \sum_{k=0}^{m-1} \sum_{\substack{0 \le i_1 < \ldots < i_k \le m-1}} \sum_{\substack{0 \le j_1 < \ldots < j_p \le m-1 \\ j_1 \in \{1, \ldots, m-1\} \setminus \{i_1, \ldots, i_k\} \\ l=1, \ldots, p}} \sum_{q=0}^{p} (-1)^{q+p}$$

$$\sum_{\substack{0 \le k_1 < \ldots < k_q \le m-1 \\ k_1 \in \{j_1, \ldots, j_p\} \\ l=1, \ldots, q}} x_0^{k_1} \times \ldots \times x_0^{k_q} \times$$

$$\int_{I_x i_1 \times \ldots \times I_x i_k} \left(\text{Sgn}(t^{i_1} - x_0^{i_1})(x^{i_1} - t_+^{i_1})\right)^+ \ldots$$

$$\left(\text{Sgn}(t^{i_k} - x_0^{i_k})(x^{i_k} - t_+^{i_k})\right)^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$$\{s_1, \ldots, s_r\} = (\{1, \ldots, m-1\} \setminus \{i_1, \ldots, i_k, j_1, \ldots, j_p\})$$

Thus, summing (I), (II), (III), and (IV), we can easily see that can be rewritten as:

$$\delta_{x^{m-1}} o \ldots o \delta_{x^1} =$$

$$\sum_{k=0}^{m-1} \sum_{\substack{0 \le i_1 < \ldots < i_k \le m-1}} \sum_{\substack{0 \le j_1 < \ldots < j_p \le m-1 \\ j_1 \in \{1, \ldots, m-1\} \setminus \{i_1, \ldots, i_k\} \\ l=1, \ldots, p}} \sum_{q=0}^{p} (-1)^{q+p} \sum_{\substack{0 \le k_1 < \ldots < k_q \le m-1 \\ k_1 \in \{j_1, \ldots, j_p\} \\ l=1, \ldots, q}} x_0^{k_1} \times$$

$$\ldots \times x_0^{k_q} \times \int_{I_x i_1 \times \ldots \times I_x i_k} \left(\text{Sgn}(t^{i_1} - x_0^{i_1})(x^{i_1} - t_+^{i_1})\right)^+ \ldots$$

$$\left(\text{Sgn}(t^{i_k} - x_0^{i_k})(x^{i_k} - t_+^{i_k})\right)^+ \frac{x^{j_1} \times \ldots \times x^{j_p}}{x^{k_1} \times \ldots \times x^{k_q}} \times$$

$$\delta''_{t^{i_1}} o \ldots o \delta''_{t^{i_k}} o \delta'_{x_0^{j_1}} o \ldots o \delta'_{x_0^{j_p}} o \delta_{x_0^{s_1}} o \ldots o \delta_{x_0^{s_r}} dt^{i_1} \ldots dt^{i_k} \text{ with}$$

$$\{s_1, \ldots, s_r\} = \{1, \ldots, m-1\} \setminus \{i_1, \ldots, i_k, j_1, \ldots, j_p\}$$

which is the result sought to prove our formula by recurrence.

In a continuous space representation and if $f$ is twice derivable, $m=1$, $t_+$ is replaced by $t$ and we recover the well known formula derived using other tools for instance in [13].

| U.S. PATENT DOCUMENTS | | | |
|---|---|---|---|
| 4,642,768 | * Oct. 1987 | Roberts | 364/408 |
| 4,903,201 | * Feb. 1991 | Wagner | 705/37 |
| 5,029,119 | * Jul. 1991 | Konno | 395/500 |
| 5,129,035 | * Jul. 1992 | Saji et al. | 395/702 |
| 5,159,687 | * Oct. 1992 | Richburg | 395/702 |
| 5,408,638 | * Apr. 1995 | Sagawa et al | 395/500 |
| 5,444,819 | * Aug. 1995 | Negishi | 706/21 |
| 5,461,699 | * Oct. 1995 | Arbabi et al. | 706/21 |
| 5,485,601 | * Jan. 1996 | Ching | 395/500 |
| 5,557,517 | * Sep. 1996 | Daugherty III | 705/37 |
| 5,692,233 | * Nov. 1997 | Garman | 705/36 |
| 5,699,271 | * Dec. 1997 | Sagawa et al. | 395/500 |
| 5,699,310 | * Dec. 1997 | Garloff et al. | 395/701 |
| 5,799,287 | * Aug. 1998 | Dembo, et al. | 705/36 |
| 5,815,717 | * Sep. 1998 | Stack | 395/705 |
| 5,920,717 | * Jul. 1999 | Noda | 395/701 |
| 5,940,810 | * Aug. 1999 | Traub et al. | 705/36 |
| 6,016,483 | * Jan. 2000 | Rickard et al. | 705/37 |
| 6,058,377 | * May 2000 | Traub et al. | 705/36 |
| 6,098,051 | * Aug. 2000 | Lupien et al. | 705/37 |
| 6,112,189 | * Aug. 2000 | Rickard et al. | 705/37 |
| 6,173,276 | * Jan. 2001 | Kant, et al. | 706/50 |
| 6,278,981 | * Aug. 2001 | Dembo, et al. | 705/36 |

Patent Applications:

| Pub No. US 2001/ | 0011243 | A1 * Aug. 2, 2001 | Dembo, et al |
| Pub No. US 2002/ | 0010667 | A1 * Jan. 24, 2002 | Kant, et al |
| Pub No. US 2002 | 0103738 | A1 * Aug. 1, 2002 | Griebel, et al |

Foreign Patents Documents

| PCT/US00/25292 * 9/2000 | Kuruc, et al. (WO 01/33486) |
| PCT/FR00/01059 * 4/200 | Nilliotte, et al. |

REFERENCES

[1] Alexander, C. *The handbook of Risk Management and Analysis*; J. Wiley 1996.

[2] Andersen, L. Andreasen, J. and Eliezer, D. *Static Replication of Barrier Options: Some General Results*; Working Paper February 2000.

[3] Andersen, L. Andreasen, J. *Jumping Smiles*; Risk, November 1999 pp 65-68.

[4] Avellaneda, M. Friedman, C. Holmes, R. and Samperi, D. *Calibrating Volatility Surfaces via Relative Entropy Minimization*; Applied Mathematical Finance, March 1997.

[5] Baz, J. Naik, V. Pricul, D. Putyatin, V. *Selling risk at a premium*; Risk December 2000

[6] Bertsimas, D. Kogan, L. and Lo, A. *Hedging Derivatives Securities and Incomplete Markets: An epsilon-arbitrage approach*; NBER Working Paper, 1997.

[7] Bertsimas, D. Kogan, L. and Lo, A. *Journal of Financial Economics*; When is time continuous? 55(2000) pp 173-204.

[8] Bjerksund, P. Stensland, G. *Closed-form approximation of american options*; Scandinavian Journal of Management 9, 1993.

[9] Black, F. Scholes, M. *The pricing of options and Corporate Liabilities*; Journal of Political Economy 81, 1973, pp 637-659.

[10] Breeden, D. T. and Litzenberger, R. H. *Prices of State-Contingent Claims implicit in Options Prices*; Journal of Business 1978 pp 623-651.

[11] Buchen, P. W. and Kelly, M. *The Maximum Entropy Distribution of an asset inferred from Options Prices*; Journal of Financial and Quantitative Analysis Vol 31 no 1, March 1996.

[12] Carr, P. Ellis, K. and Gupta, V. *Static Hedging with Exotic Options*; The Journal of Finance, June 1998 pp 1165-1190.

[13] Carr, P. and Madan, D. *Towards a theory of volatility trading*; Working paper Jan. 30, 2002.

[14] Carr, P. Geman, H. and Madan, D. *Pricing and hedging in incomplete markets*; Journal of Financial Economics 62 (October 2001) pp 131-167.

[15] CFTC, Bill H. R. 5660 *Commodity Futures Modernization Act of 2000*; available at http://www.cftc.gov/cftc/cftclawreg.htm.

[16] Chang, P. H. K. and Melick, W. R. *Workshop on estimating and interpreting probability density functions*; Jun. 14, 1999.

[17] Chriss, N. Tsiveriotis, K. *Pricing with a Difference*; Risk February 1998.

[18] Crouhy, M. Galai, D. Mark, R. *Risk Management*; Mc Graw-Hill ISBN 0-07-135731-9.

[19] Das, S. R. and Sundaram, R. K. *Of Smiles and Smirks: A Term Structure Perspective*; Journal of Financial and Quantitative Analysis June 1999.

[20] Debreu, G. 1959. *Theory of Value: an axiomatic analysis of economic equilibrium*; Wiley, New York.

[21] Derman, E. Kani, I. Kamal, M. *Trading and hedging local volatility*; The Journal of Financial Engineering V6. No 3 pp 233-268.

[22] Derman, E. Kani, I. *Riding on a Smile*; Risk February 1994 pp 32-39.

[23] Duffie, D. *Dynamic Asset Pricing Theory*; Third Edition 2001 Princeton University Press.

[24] Dumas, B. Fleming, J and Whaley, R. E. *Implied Volatility Functions: Empirical Tests*; The Journal of Finance, December 1998 pp 2059-2103.

[25] Dupire, B. *Pricing with a Smile*; Risk, January 1994 pp 18-20.

[26] Ebor, J. M. Jones, S. P. and Soward, J. *Composing contracts: an adventure in financial engineering*; International Conference on Functional Programming, Montreal, September 2000, paper available ⊚ http://research.microsoft.com/simonpj/papers/contracts-icfp.htm.

[27] Elliot, J. R. Hunter, W. Kopp, E. P. Madan, B, D. *Pricing via Multiplicative Price Decomposition*; Journal of Financial Engineering Vol 4. No. 3 pp 247-262.

[28] Financial Accounting Standards Board Statement No. 133 *Accounting for Derivative Instruments and Hedging Activities;*

[29] Financial Accounting Standards Board Statement No. 137 *Accounting for Derivative Instruments and Hedging Activities—Deferral of the Effective Date of FASB Statement No. 133;*

[30] Financial Accounting Standards Board Statement No. 138 *Accounting for Certain Derivative Instruments and Certain Hedging Activities. An amendment of FASB Statement No. 133;*

[31] Golub and Van Loan, Matrix Computations, *Johns Hopkins University Press,* 1993.

[32] Gulko, L. *The Entropy Theory of Option Pricing*; PhD Thesis, Yale University 1998.

[33] Guo, D. *The Risk Premium of Volatility Implicit in Currency Options*; 1998 Working Paper.

[34] Harrison, M., and D. Kreps, (1979) *Martingales and Arbitrage in Multiperiod Securities Markets*; Journal of Economic Theory, 20, 381-408.

[35] Harrison, J. & Pliska, S. (1981) *Martingales and Stochastic Integrals in the Theory of Continuous Trading*; Stochastic Processes & Applications 11, 215-260.

[36] Henderson, R. J. *Event Risk and Jump diffusion in Option Pricing*; Risk, September 1999.

[37] Henderson, R. J. Jex, M and Wang, D. *Pricing Exotics under the Smile*; Risk, November 1999.

[38] Hulvej, E. *Evaluating Corporate Currency Options Strategies*; Gtnews 17 April 2001.

[39] Hobson, D. C. and Rogers, L. C. G. *Complete Models with Stochastic Volatility*; Working Paper University of Bath.

[40] Hull, J. and White, A. *The pricing of options on assets with stochastic volatilities*; Journal of Finance, 3 (1987), pp. 281-300.

[41] Hyer, T. Liptom-Lifschitz, T and Pugachevsky, D *Passport to success*; (September 1997), Risk 10, No 9, pp 127-131.

[42] Hyungsok, A. Penaud, A. and Paul Wilmott, P. *Various passport options and their valuation;* 1999) OCIAM Oxford University Working paper.

[43] Jackwerth, J. C. and Riubinstein, M. *Recovering probability Distributions from contemporaneous security prices*; Journal of Finance, December 1996 51:5 1611-1631.

[44] Kongteheu, P. *Calibration of the Volatility Surface: Application to the pricing of Volatility Swaps*; Credit Agricole Indosuez & Courant Institute of Mathematical Sciences Mathematical Finance Seminar April 1998.

[45] Lerner, J. *Where does State Street Lead? A First Look at Finance Patents, 1971 to 2000*; Journal of Finance Vol 57, no. 2 April 2002.

[46] Lowenstein, R. *When Genius Failed: The Rise and Fall of Long-Term Capital Management*; Random House September 2000.

[47] Madan, D. Milne, D. *Contingent Claims Valued and Hedged by Pricing and Investing in a Basis*; Mathematical Finance, July 1994, 4, 3, 223-24.

[48] Madan, D. Bakshi, G. *Spanning and Derivative Security Valuation*; Journal of Financial Economics 55 (2000) 205-238.

[49] Morton, R. C. (1973) *Theory of Rational Option Pricing*; Bell Journal of Economics and Management Science, spring, 141-183.

[50] Merton, R. C. 1976 *Option Pricing When Underlying Stock Returns Are Discontinuous*; Journal of Financial Economics, Vol. 3, pp. 125-144.

[51] Nachman D. C. *Spanning and completeness with options*; The review of financial studies 1989, V1, no 3 pp 311-328.

[52] Rogers L. C. G., Talay, D. *Numerical Methods in Financial Mathematics*; Cambridge University Press, 1996.

[53] Rubinstein, M. *Implied binomial trees*; Journal of Finance, 49 (3): 771-819, 1994.

[54] Taleb, N. *Dynamic Hedging: Managing vanillas and exotic options*; John Wiley 1997.

[55] William H. Press, Brian P. Flannery, Saul A. Teukolsky, William T. Vetterling, *Numerical Recipes in C: The Art of Scientific Computing* 1993.

[56] Wilmott, P. *wilmott.cam technical forum*; Technical forum (Thread started Oct. 25, 2001) Moving window Asian with early exercise.

All patent cited in this application are hereby included by reference.

While the present invention has been described in connection with preferred embodiments, it is not intended to limit the scope of the invention to the particular form set forth, but, on the contrary, it is intended to cover such alternatives, modifications, equivalents as may be included within the spirit and scope of the invention as defined in the appended claims.

What is claimed is:

1. A method for yielding a premium payment amount of a derivative contract along a multi-period timeline comprising:
   a) receiving, via a first input device linked to a computer processor, a request from a user for a premium payment amount of a derivative contract, said derivative contract having a description comprising, on the multi-period timeline, a contract agreement time, a premium payment time and a payout payment time and, said description further comprising a payout payment amount described as a function of realized values of specified underlying(s) or parameters between the premium payment time and the payout payment time;
   b) receiving, via a second input device linked to the computer processor, a premium payment amount for each marginal unit of basis instruments contracts (BICs) having the same payout payment time as the derivative contract, each said marginal unit of BICs having the same premium payment time, said premium payment time being a time that precedes the payout payment time of the derivatives contract on the multi-period timeline;
   c) decomposing, by the computer processor, the derivative contract into a portfolio of composing BICs, wherein each composing BIC comprises a quantity of marginal units of BICs having the same payout payment time as the derivative contract;
   d) computing, by the computer processor, a premium payment amount for each composing BIC based on a sum of the marginal units of BICs premium payment amounts in the quantity given by the portfolio decomposition;
   e) computing, by the computer processor, a premium payment amount of the derivatives contract based on the portfolio of composing BICs having the same payout payment time as the derivatives contract, wherein said premium payment amount of the derivatives contract is computed as a weighted sum of the premium payment amounts of the composing BICs in the portfolio based on the quantities given by the portfolio decomposition;
   f) yielding, by the computer processor, the premium payment amount of the derivatives contract for the premium payment time of the marginal units of BICs;
   g) repeating steps a), b), c), d), e) and f), where the premium payment amount of the derivative contract for the premium payment time of the marginal units of BICs is received by the first input device as a new derivatives contract with an incrementally decreased payout payment time, and wherein said repetition terminates when the premium payment time in step f) coincides with the premium payment time specified by the user in the description for the derivative contract;
   h) and transmitting, via an output device linked to the computer processor, the premium payment amount for the derivative contract yielded in step f) when step g) indicates the repetition terminates, to the user who requested the premium payment amount of the derivative contract.

2. The method of claim 1, where the BICs are supplied in a variety of payout payment formats, including the Options format, the extended Arrow Debreu format and the Fourier format.

3. The method of claim 1 used in a trading or exchange system, wherein step b) includes receiving a computed marginal premium payment amount for each unit or group of composing BICs obtained by selecting the most competitive price among those quoted by one or more market makers.

4. The method of claim 3, where the selected most competitive prices are subsequently contracted upon confirmation of a user's intent to trade the original derivatives contract.

5. The method of claim 1, wherein the premium payment amount for the marginal units of BICs received from the second input device is provided in aggregate or compressed form to reduce complexity or computing time.

6. The method of claim 1, wherein the premium payment amount transmitted via the output device is increased by an optional service margin.

7. A system for yielding a premium payment amount of a derivative contract along a multi-period timeline comprising:
   a) a first input device configured to receive a request from a user for a premium payment amount of a derivative contract, said derivative contract having a description comprising, on the multi-period timeline, a contract agreement time, a premium payment time and a payout payment time and, said description further comprising a payout payment amount described as a function of realized values of specified underlying(s) or parameters between the premium payment time and the payout payment time;
   b) a second input device configured to receive a premium payment amount for each marginal unit of basis instruments contracts (BICs) having the same payout payment time as the derivative contract, each said marginal unit of BICs having the same premium payment time, said premium payment time being a time that precedes the payout payment time of the derivatives contract on the multi-period timeline;
   c) a computer processor linked to the first input device configured to decompose the derivative contract into a portfolio of composing BICs, wherein each composing BIC comprises a quantity of marginal units of BICs having the same payout payment time as the derivative contract;
   a computer processor linked to the first input device and the second input device configured to:
   d) compute a premium payment amount for each composing BIC based on a sum of the marginal units of BICs premium payment amounts in the quantity given by the portfolio decomposition;
   e) compute a premium payment amount of the derivatives contract based on the portfolio of composing BICs having the same payout payment time as the derivatives contract, wherein said premium payment amount of the derivatives contract is computed as a weighted sum of the premium payment amounts of the composing BICs in the portfolio based on the quantities given by the portfolio decomposition,
   f) yield the premium payment amount of the derivatives contract for the premium payment time of the marginal units of BICs;
   g) repeat steps a), b), c), d), e) and f), where the premium payment amount of the derivative contract for the premium payment time of the marginal units of BICs is received by the first input device as a new derivatives contract with an incrementally decreased payout payment time, and wherein said repetition terminates when the premium payment time in step f) coincides with the premium payment time specified by the user in the description for the derivative contract;

h) and an output device linked to the computer processor configured to transmit the premium payment amount for the derivative contract yielded in step f) when step g) indicates the repetition terminates, to the user who requested the premium payment amount of the derivative contract.

8. The system of claim 7, where the BICs are supplied in a variety of payout payment formats, including the Options format, the extended Arrow Debreu format and the Fourier format.

9. The system of claim 7 used in a trading or exchange system, wherein step b) further configured to receive a computed marginal premium payment amount for each unit or group of composing BICs obtained by selecting the most competitive price among those quoted by one or more market makers.

10. The system of claim 9, where the selected most competitive prices are subsequently contracted upon confirmation of a user's intent to trade the original derivatives contract.

11. The system of claim 7, wherein the premium payment amount for the marginal units of BICs received from the second input device is provided in aggregate or compressed form to reduce complexity or computing time.

12. The system of claim 7, wherein the premium payment amount transmitted via the output device is increased by an optional service margin.

13. A computer program product for yielding a premium payment amount of a derivative contract along a multi-period timeline comprising computer readable memory having logic stored therein for execution on a computer, said logic comprising:

a) logic to receive a request from a user for a premium payment amount of a derivative contract, said derivative contract having a description comprising, on the multi-period timeline, a contract agreement time, a premium payment time and a payout payment time and, said description further comprising a payout payment amount described as a function of realized values of specified underlying(s) or parameters between the premium payment time and the payout payment time;

b) logic to receive a premium payment amount for each marginal unit of basis instruments contracts (BICs) having the same payout payment time as the derivative contract, each said marginal unit of BICs having the same premium payment time, said premium payment time being a time that precedes the payout payment time of the derivatives contract on the multi-period timeline;

c) logic to decompose the derivative contract into a portfolio of composing BICs, wherein each composing BIC comprises a quantity of marginal units of BICs having the same payout payment time as the derivative contract;

d) logic to compute a premium payment amount for each composing BIC based on a sum of the marginal units of BICs premium payment amounts in the quantity given by the portfolio decomposition;

e) logic to compute a premium payment amount of the derivatives contract based on the portfolio of composing BICs having the same payout payment time as the derivatives contract, wherein said premium payment amount of the derivatives contract is computed as a weighted sum of the premium payment amounts of the composing BICs in the portfolio based on the quantities given by the portfolio decomposition, f) logic to yield the premium payment amount of the derivatives contract for the premium payment time of the marginal units of BICs;

g) logic to repeat steps a), b), c), d), e) and f), where the premium payment amount of the derivative contract for the premium payment time of the marginal units of BICs is received by the first input device as a new derivatives contract with an incrementally decreased payout payment time, and wherein said repetition terminates when the premium payment time in step f) coincides with the premium payment time specified by the user in the description for the derivative contract;

h) and logic to transmit the premium payment amount for the derivative contract yielded in step f) when step g) indicates the repetition terminates, to the user who requested the premium payment amount of the derivative contract.

14. The computer program product of claim 13, where the BICs are supplied in a variety of payout payment formats, including the Options format, the extended Arrow Debreu format and the Fourier format.

15. The computer program product of claim 13 used in a trading or exchange system, wherein limitation b) further includes logic to receive a computed marginal premium payment amount for each unit or group of composing BICs obtained by selecting the most competitive price among those quoted by one or more market makers.

16. The computer program product of claim 15, where the selected most competitive prices are subsequently contracted upon confirmation of a user's intent to trade the original derivatives contract.

17. The computer program product of claim 13, wherein the premium payment amount for the marginal units of BICs received from the second input device is provided in aggregate or compressed form to reduce complexity or computing time.

18. The computer program product of claim 13, wherein the premium payment amount transmitted via the output device is increased by an optional service margin.

* * * * *